(12) United States Patent
Fukakusa et al.

(10) Patent No.: US 6,266,314 B1
(45) Date of Patent: Jul. 24, 2001

(54) OPTICAL PICKUP DEVICE

(75) Inventors: Masaharu Fukakusa, Kumamoto-ken; Taiichi Mori, Fukuoka-ken; Hiroshi Tanigawa; Haruhiko Kono, both of Kumamoto-ken; Mikio Tomisaki, Chikushino; Seigi Ito, Yamaga; Kazuyuki Nakashima, Fukuoka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/938,559

(22) Filed: Sep. 26, 1997

(30) Foreign Application Priority Data

| Oct. 1, 1996 | (JP) | 8-260391 |
| Oct. 23, 1996 | (JP) | 8-280481 |
| Jan. 27, 1997 | (JP) | 9-012169 |
| Feb. 17, 1997 | (JP) | 9-031621 |
| Feb. 21, 1997 | (JP) | 9-037584 |
| Mar. 6, 1997 | (JP) | 9-051330 |
| Apr. 1, 1997 | (JP) | 9-082592 |
| Apr. 2, 1997 | (JP) | 9-083623 |
| Apr. 4, 1997 | (JP) | 9-086377 |
| Apr. 4, 1997 | (JP) | 9-086379 |
| Jun. 24, 1997 | (JP) | 9-166955 |

(51) Int. Cl.$^7$ .................................................. G11B 7/00
(52) U.S. Cl. .................. 369/112; 369/44.12; 369/44.23; 369/44.37; 369/94; 369/122
(58) Field of Search .................. 369/112, 58, 44.23, 369/44.12, 103, 94, 109, 116, 122, 44.37, 44.14; 372/50, 9, 45, 97, 36

(56) References Cited

U.S. PATENT DOCUMENTS

| 5,161,040 | 11/1992 | Yokoyama et al. . |
| 5,422,905 | * 6/1995 | Andrews ................................. 372/50 |
| 5,513,121 | * 4/1996 | Sugawara et al. ................. 369/44.14 |
| 5,627,814 | * 5/1997 | Lee ........................................ 369/116 |
| 5,663,944 | * 9/1997 | Mun ..................................... 369/121 |
| 5,689,521 | * 11/1997 | Nakata ................................... 372/50 |
| 5,703,856 | 12/1997 | Hayashi et al. . |
| 5,712,841 | * 1/1998 | Ophiej et al. ......................... 369/112 |
| 5,726,436 | * 3/1998 | Oka et al. .......................... 250/201.5 |
| 5,783,818 | * 7/1998 | Manabe et al. ....................... 250/239 |
| 5,793,734 | * 8/1998 | Tsuchiya et al. .................... 369/112 |
| 5,793,790 | * 8/1998 | Doi et al. ............................... 372/50 |
| 5,864,523 | * 1/1999 | Yoshizawa ......................... 369/44.23 |
| 5,875,167 | * 2/1999 | Katayama ............................ 369/112 |

FOREIGN PATENT DOCUMENTS

| 8007321 | 1/1996 | (JP) . |
| 855363 | 2/1996 | (JP) . |

\* cited by examiner

*Primary Examiner*—Ali Neyzari
*Assistant Examiner*—Kim-Kwok Chu
(74) *Attorney, Agent, or Firm*—Stevens, Davis, Miller & Mosher, L.L.P

(57) ABSTRACT

An optical pickup device has a single light beam path in which at least one or either of a plurality of kinds of light beams (different from each other in, for example, wavelength) for respective recording densities and/or recording-medium-thicknesses proceeds toward a surface of an optical recording medium and proceeds to a light beam detector after being reflected by the surface.

48 Claims, 19 Drawing Sheets

FIG. 16
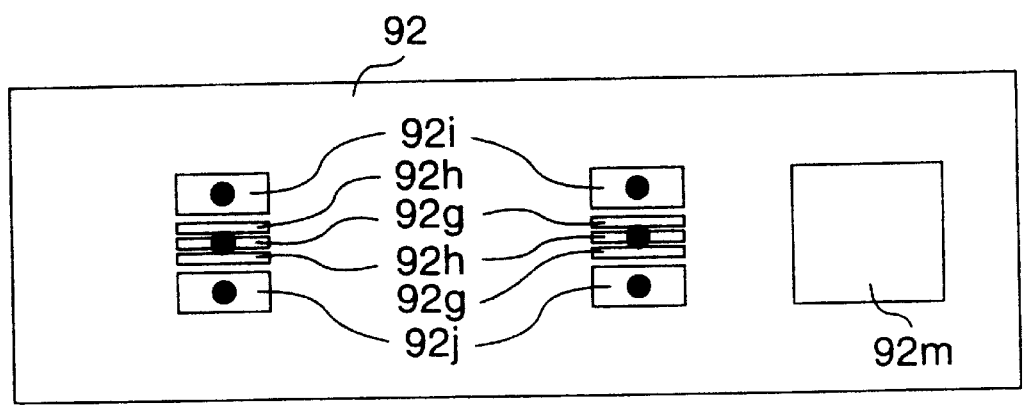
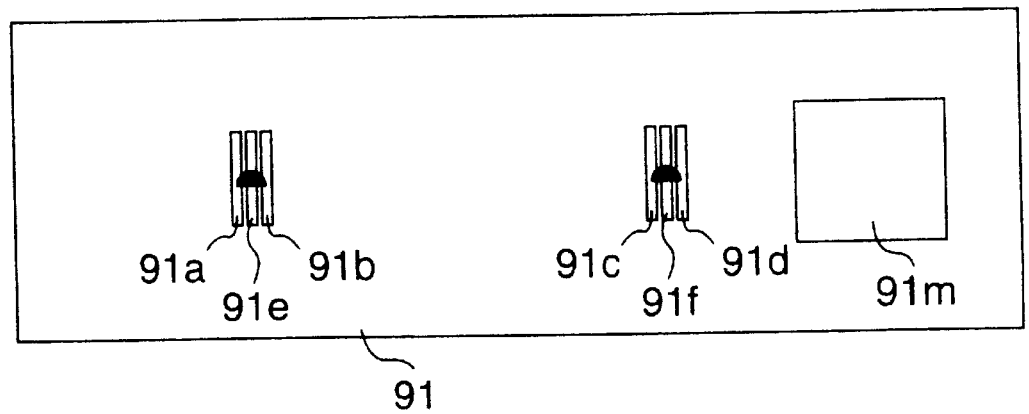

OPTICAL PICKUP DEVICE

BACKGROUND OF THE INVENTION AND RELATED ART STATEMENT

The present invention relates to an optical pickup for recording information onto an optical recording medium and/or reading out the information from the optical recording medium.

In the prior art, when information needs to be recorded onto a plurality of optical recording media different in recording density and/or medium-thickness from each other and/or to be read out from the different optical recording media, a plurality of optical systems each of which includes a light beam source, a collimator, a light beam splitter, a quarter-wave plate, and an objective lens for respective recording density and/or medium-thickness are used.

SUMMARY OF THE INVENTION

An object of the present invention is to provide an optical pickup device for recording media having recording densities and/or recording-medium-thicknesses that are different from each other, wherein a size of the optical pickup device is minimized.

An optical pickup device according to the present invention has a single light beam path in which at least one or either of a plurality of kinds of light beams (different from each other in, for example, wavelength) for the respective recording densities and/or recording-media-thicknesses proceeds toward a surface of an optical recording medium and proceeds to a light beam detector after being reflected by the surface.

Since the at least one or either of the plurality of kinds of light beams proceeds in the single light beam path in opposite directions, in other words, the single light beam path is used to pass the plurality of kinds of light beams in the opposite directions, a structure and volume between the optical recording medium and light beam emitting elements may be small to minimize the size of the optical pickup device.

BRIEF DESCRIPTION OF THE DRAWINGS

FIG. 16 is a diagram illustrating an arrangement of a light receiving means of the third embodiment according to the present invention;

FIG. 20 is a cross section of a conventional optical pickup.

DESCRIPTION OF THE PREFERRED EMBODIMENTS

[First Embodiment]

At the outset, a first embodiment of the present invention will be described below with reference to the accompanying drawings.

Figure 1:
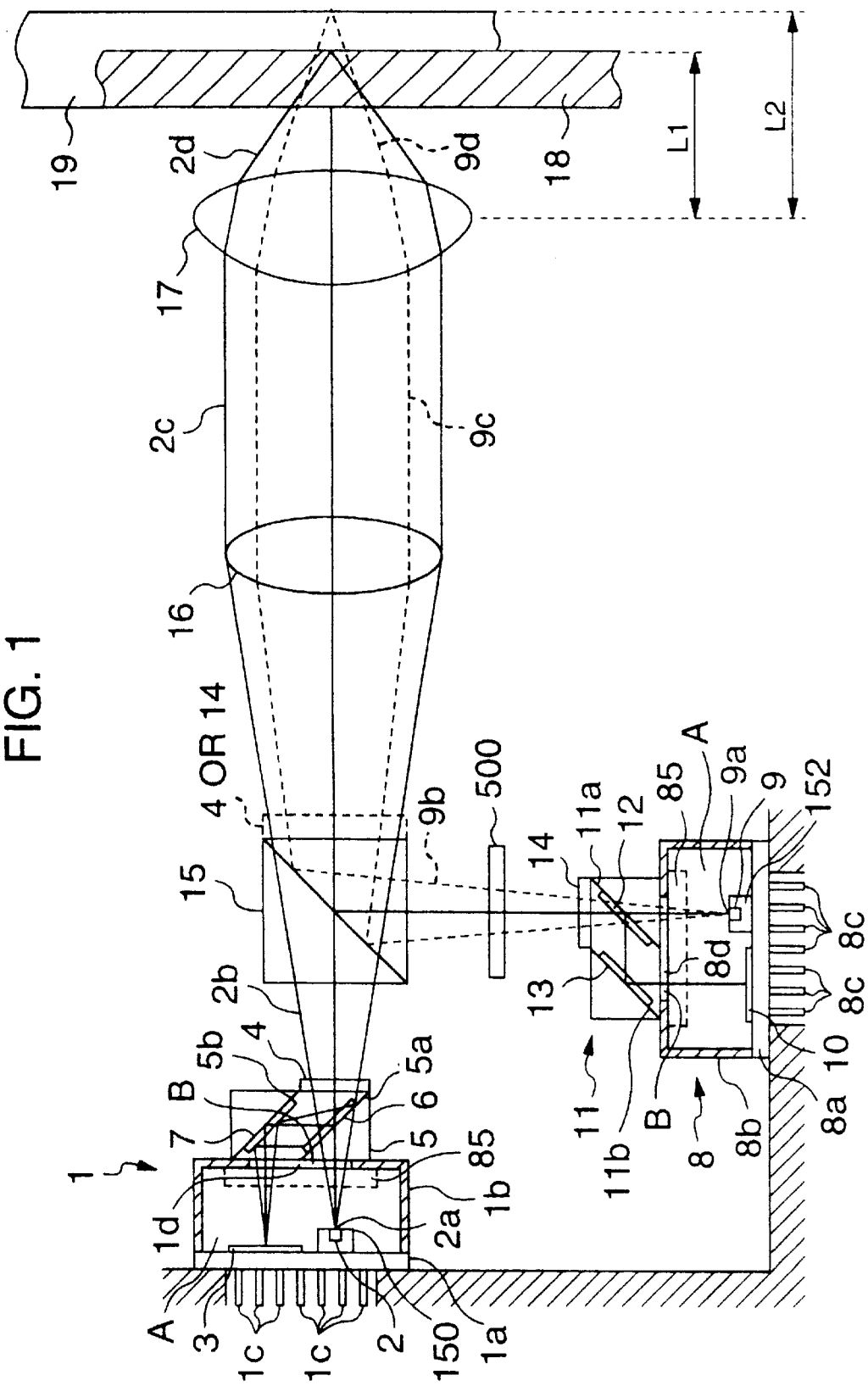
FIG. 1 is a cross section illustrating a configuration of packaging of an optical pickup and an optical path of a first embodiment according to the present invention.

Referring to FIG. 1, there is shown a cross section of a configuration of an optical pickup and an optical path of the first embodiment according to the present invention. In FIG. 1, a dotted line represents an optical path for reproducing a low-density optical disk and a solid line represents an optical path for reproducing a high-density optical disk.

In FIG. 1, a first package 1 comprises a light source 2 for emitting light for a high-density optical disk 18, a substrate portion 1a on which a light receiving means 3 or the like are mounted to receive light reflected by the high-density optical disk 18, and a sidewall portion 1b arranged so as to enclose these members. The substrate portion 1a and the sidewall portion 1b and others can be formed either integrally or separately. If they are integrally formed, an assembly process can be simplified so as to increase the productivity. As materials of the first package 1, there are metal, resin, and ceramic. Particularly, it is preferable to use the metal or ceramic in these since the heat generated in the light source 2 can be favorably discharged.

Further in the metal materials, it is preferable to use metal materials such as Cu, Al, or Fe alloy materials such as FeNi alloy or FeNiCo alloy having high thermal conductivity. This is because these materials are low-cost and have high heat dissipation effects, in addition to having an effect of a magnetic shield which cuts off noises such as electromagnetic waves from a high-frequency superposition circuit or the like. In these materials, particularly Fe, FeNi alloy, and FeNiCo alloy, have lower thermal resistance and favorable heat dissipation, so that they can dissipate efficiently to the outside the heat which is generated in the light source 2. Additionally, these materials are low-cost, and therefore it becomes possible to provide an optical pickup device at a low price.

Furthermore, the first package 1 discharges heat generated by the light source 2 to the outside by making the substrate portion 1*a* and, if necessary, the sidewall portion 1*b*, in contact with a carriage having a great thermal capacity. Accordingly, as an area of the substrate portion 1*a* in contact with the carriage becomes larger, the package 1 obtains more favorable heat dissipation effects.

Still further, in the substrate portion 1*a*, there are provided terminals 1*c* for supplying power to the light source 2 and for transmitting electric signals from the light receiving means 3 to an arithmetic circuit. These terminals 1*c* can be either pin-typed or printed-typed. In this embodiment, particularly pin-typed terminals 1*c* will be described below.

The terminals 1*c* are inserted into a plurality of holes on the substrate portion 1*a* without being electrically connected to the substrate portion 1*a* made of metal material. For the materials of the terminals 1*c*, it is preferable to use FeNiCo, FeNi, FeCr or other alloy.

As means of interrupting the electrical connection between the substrate portion 1*a* and the terminals 1*c*, preferably an insulating coating is put on portions between respective terminals 1*c* and substrate portion 1*a* in the holes, and further preferably, the coating is closed so that the air will not penetrate from these portions. As materials satisfying these requirements, it is preferable to use materials which are both insulating and impermeable such as with a hermetic seal. Particularly, it is preferable to use a hermetic seal of matched-sealing type or compressed-sealing type. This is because these materials can be prepared very easily for both of the insulating and hermetic effects in addition to being extremely low-cost, and therefore it is possible to simplify a process of mounting the terminals 1*c* on the substrate portion 1*a* and further to reduce a manufacturing cost of the optical pickup.

In addition, these types of hermetic seal can retain high hermetic and insulating effects in a wide range of temperatures, and therefore reliability of the optical pickup can be improved and a shape of the terminals can be deformed relatively at will, whereby a degree of freedom of the design can be increased.

As the light source 2, it is preferable to use a light source which has favorable coherence, directivity, and condensing effects with a single color, since a beam spot having an appropriate shape can be formed relatively easily so as to restrain an occurrence of noises. It is preferable to use various laser lights such as a solid, gas, or semiconductor laser light as those satisfying these requirements. Particularly, the semiconductor laser is very small in size and effective to make the optical pickup smaller easily, whereby it is optimum as the light source 2.

In addition, preferably the light source 2 of the semiconductor laser has preferably an 800 nm or lower oscillation wavelength, since it is possible to make easily a beam spot, to which the light from the light source converges on a record medium, to have almost a size of a pitch of a track formed on the record medium. Furthermore, if the oscillation wavelength of the light source 2 is 650 nm or lower, it is possible to form a beam spot which is so small that a record medium on which extremely high-density information is recorded can be reproduced, whereby a mass storage means can be easily achieved, and particularly, it is preferably used as the light source 2 provided for reproduction of records on a high-density optical disk.

If the light source 2 comprises a semiconductor laser, as materials which satisfy the requirement of the oscillation wavelength of approximately 800 nm or lower, there are AlGaInP, AlGaAs, ZnSe, and GaN; particularly AlGaAs is preferable in these chemical compound materials since it has easy crystal growth characteristics, and therefore it is effective to manufacture a semiconductor laser easily, which leads to high yield and high productivity. As materials which satisfy the requirement of the oscillation wavelength of 650 nm or lower, there are AlGaInP, ZnSe, and GaN. By using a semiconductor laser made of these materials as the light source 2, a diameter of the beam spot formed on the record medium can be reduced further, which makes possible to further improve the recording density, and therefore it becomes possible to reproduce a high-density optical disk.

In these materials, particularly AlGaAsP is preferable since it has a stable performance for a long period, and therefore it makes it possible to improve reliability of the light source 2.

In addition, preferably an output of the light source 2 is in a range of approximately 2 to 10 (mW) if it is dedicated to reproduction, since it makes it possible to assure a sufficient quantity of light required for reproduction and to limit energy consumption to the minimum, and further to restrain the amount of heat which is discharged from the light source 2. If the light source is used for both recording and reproduction, a great amount of energy is required to change a status of a record layer at recording, and therefore at least 25 (mW) or greater output is needed. If the output exceeds 50 mW, it becomes hard to dissipate the heat discharged from the light source 2 to the outside and therefore the light source 2 and its peripheral portion have high temperature, whereby a life of the light source 2 is significantly reduced and, in the worst case, the light source 2 may be destroyed. Accordingly, an electric circuit may cause malfunction, the light source 2 itself may cause a fluctuation of the wavelength which leads to a shift of the oscillation wavelength, or noises may be included in signals, by which the reliability of the optical pickup is significantly reduced, and therefore an output exceeding the above-noted level is not preferable.

Next, an explanation will be made for a light source mounting portion 150 on which the light source 2 is mounted.

The light source mounting portion 150 has a rectangular parallelepiped or plate shape with the light source 2 mounted on its top or side surface. The light source mounting portion 150, which is put on the substrate portion 1*a* or the sidewall portion 1*b*, dissipates the heat generated by the light source 2 in addition to holding the light source 2.

For a joint between the light source mounting portion 150 and the light source 2, taking into consideration heat conductivity, it is preferable to use a method in which the top of the light source mounting portion 150 is plated with a solder material such as Au—Sn before it is soldered at high temperature or a method in which Au—Sn, Sn—Ag, Sn—Sb, or Sn—Pb—In foil (several $\mu$m to tens of $\mu$m in thickness) is contact-bonded at high temperature.

Unless the light source 2 is mounted almost in parallel with the mounting surface of the light source mounting portion 150, it may cause an aberration of an optical system or a reduction of a bonding efficiency. Therefore, preferably the light source 2 is mounted on the light source mounting portion 150 at a predetermined position, at a predetermined height, and almost in parallel with the mounting surface when it is bonded.

Furthermore, a plane of electrodes is placed on the top of the light source mounting portion 150 so that it is electrically connected to the bottom of the light source 2. The plane of electrodes is provided for supplying power to the light source 2, and preferably a thin film of Au is used as a metal film composing the plane of electrodes from a viewpoint of conductivity and resistance properties.

The light source mounting portion 150 is preferably made of material having high heat conductivity and a linear expansion coefficient close to that of the light source 2 (approximately $6.5 \times 10^{-6}/°$ C.) from a viewpoint of the heat generated by the light source 2 or mounting on the light source 2. Specifically, it is preferable to use materials having a linear expansion coefficient of 3 to $10 \times 10^{-6}/°$ C. and heat conductivity of 100 W/mK or greater, for example, AlN, SiC, T-cBN, Cu/W, Cu/Mo, or Si, and for example, diamond particularly when the light source 2 of a high output is used and the heat conductivity must be extremely high.

If the light source 2 and the light source mounting portion 150 have the same or close values as the linear expansion coefficients, it is possible to prevent an occurrence of distortion between the light source 2 and the light source mounting portion 150, which makes it possible to prevent disadvantages that the mounted portion between the light source 2 and the light source mounting portion 150 gets out of place or that a crack is made on the light source 2.

If they are out of the above range, however, a large distortion may occur between the light source 2 and the light source mounting portion 150, which increases a possibility of causing problems that the mounted portion gets out of place between the light source 2 and the light source mounting portion 150 or that a crack is made on the light source 2.

In addition, with the heat conductivity of the light source mounting portion 150 set as high as possible, the heat generated by the light source 2 can be efficiently dissipated to the outside.

If the heat conductivity is lower than the level described above, however, it becomes hard to dissipate the heat generated by the light source 2 to the outside, and therefore the temperature of the light source 2 is increased and the wavelength of the light emitted from the light source 2 is shifted. As a result, a convergence position of the light on the record medium changes minutely, whereby a lot of noise elements are included in reproduced signals or whereby an output of the light source 2 is decreased and a record reproducing operation on the record medium cannot be normally performed. Further, the life of the light source 2 is reduced, or in the worst case, the light source 2 may be destroyed or other disadvantages can easily occur.

This embodiment uses AlN having very excellent characteristics in these two aspects.

Furthermore, it is preferable to form thin films of Ti, Pt, and Au in this order from the light source mounting portion 150 to the light source 2 on the top of the light source mounting potion 150 so that the light source mounting portion has favorable bonding effects with the light source 2. If Si is used as a material of the light source mounting portion 150, it is preferable to form an insulating layer such as $Al_2O_3$ film or a surface oxidation film on the member surface before the Ti layer is formed.

Figure 2:
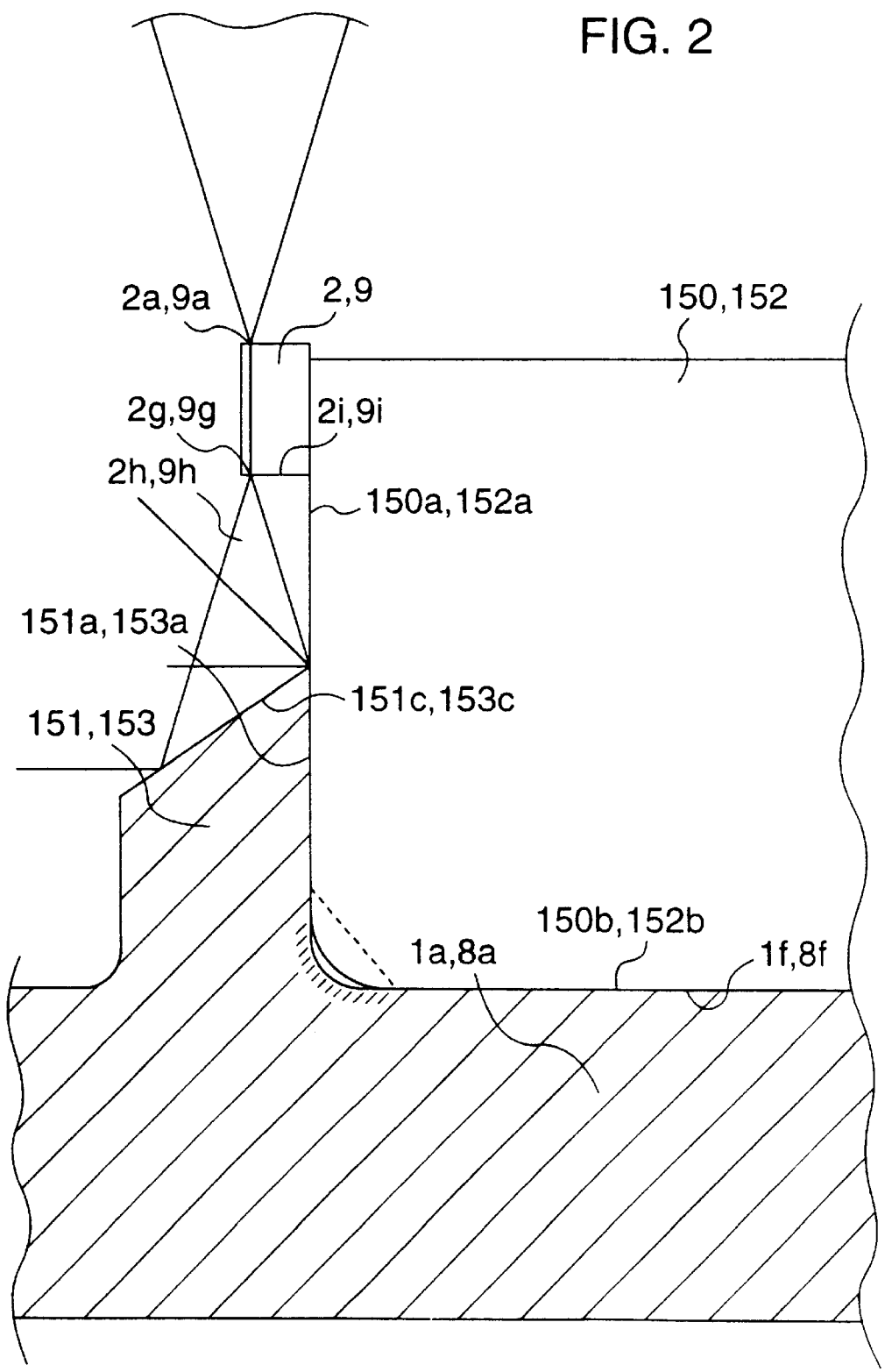
FIG. 2 is a cross section of a peripheral portion of light sources of the first embodiment according to the present invention.

Next, an arrangement of the light source mounting portion 150 on the substrate potion 1a will be described below. Referring to FIG. 2, there is shown a cross section of a peripheral portion of the light source in the first embodiment according to the present invention.

On the substrate portion 1a, a raised portion 151 having an almost rectangular parallelepiped shape is formed. By making a side portion 151a of the raised portion 151 in contact with a side portion 150a of the light source mounting portion 150, positioning of the light source mounting portion 150 can be performed. In other words, the light source mounting potion 150 is previously placed on a surface if of the substrate 1a, and the light source mounting potion 150 is bonded to the side portion 151a of the raised portion 151 which is precisely chamfered by means of a bonding material while being pressed on it.

With this configuration, the light source mounting portion 150 on which the light source 2 is mounted can be placed in a predetermined position more easily and precisely, whereby it becomes possible to achieve a high-performance optical pickup whose optical characteristics are less degraded by a deviation of the position of the light source 2.

Although the positioning of the light source mounting portion is performed by using the raised portion in this embodiment, the same effect can be obtained by arranging a recess portion on the substrate portion.

As for the bonding material used for bonding between the light source mounting portion 150 and the substrate portion 1a, it is preferable to use a metallic bonding material such as solder or an optical hardening resin which is hardened by an ultraviolet light or a visible light since they have a bonding power exceeding a level of the required value. Particularly when using a metallic bonding material, it is preferable to take measures for obtaining favorable bonding effects such as previous plating with metal for the surface if of the substrate portion 1a, the side 151a of the raised portion 151, and the bottom 150b or the side 150a of the light source mounting portion 150.

In addition, preferably an angular portion, which is formed by the bottom 150b of the light source mounting portion 150 and the side 150a which is in contact with the raised portion 151, has a predetermined radius (R) or has a corner whose sharp edge is removed.

Figure 3:
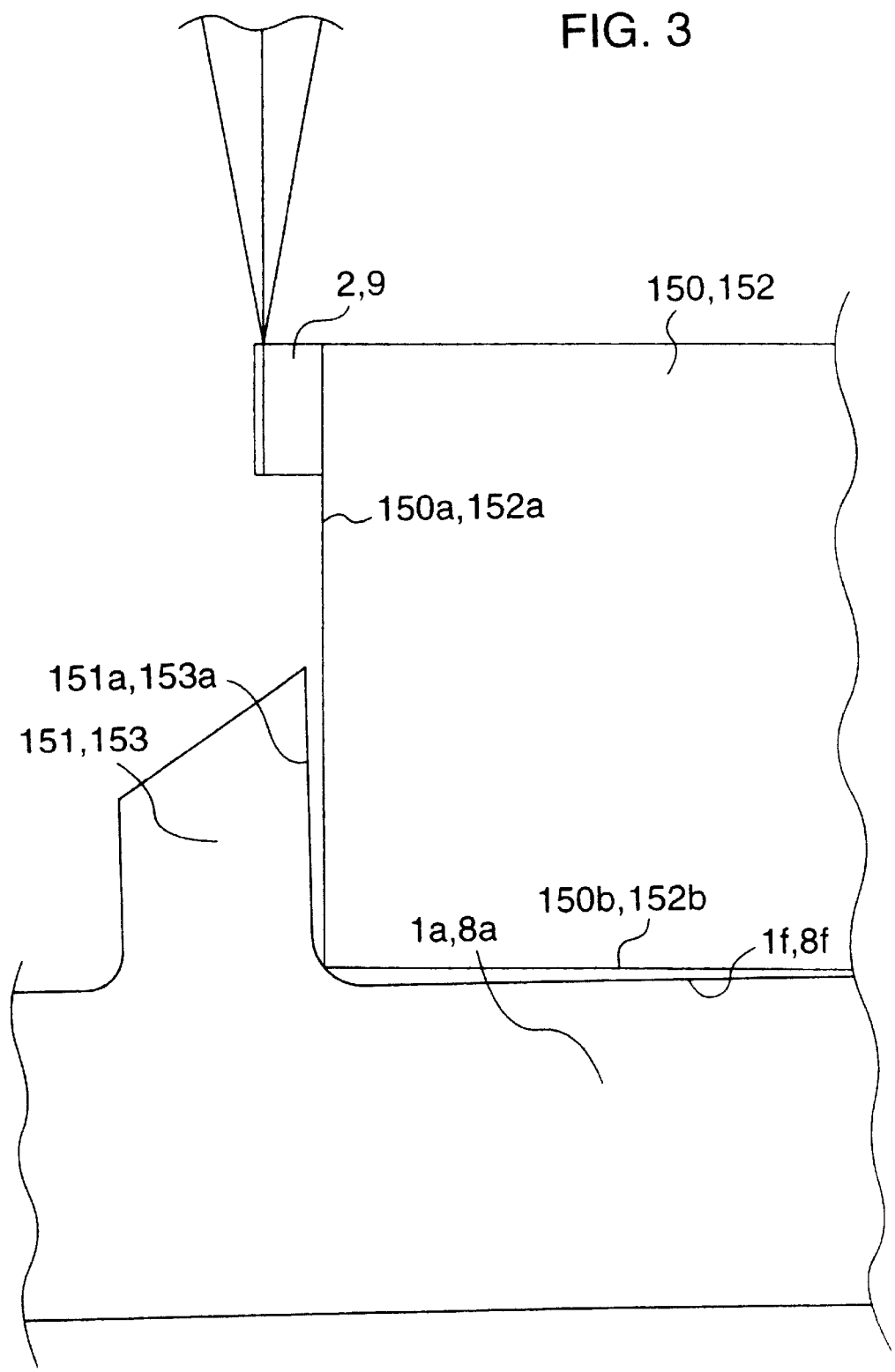
FIG. 3 is a cross section of a peripheral portion of light sources of an embodiment which is not according to the present invention.

This will be described with reference to the drawings. Referring to FIG. 3, there is shown an enlarged view of a peripheral portion of the light source in an embodiment which is not according to the present invention. As shown in FIG. 3, in general, frequently the surface 1f of the substrate 1a does not cross at right angles precisely to the side 151a of the raised portion 151. In this case, when the light source mounting portion 150 is pressed on the raised portion 151, the light source mounting portion 150 is inclined as shown in the drawing, which causes a deviation from a predetermined position of an optical axis of the light emitted from the light source 2 mounted on the light source mounting portion 150, whereby a predetermined track of the record medium is not irradiated with the light. Therefore, precise recording nor reproduction cannot be performed.

Accordingly, in this embodiment, as shown in FIG. 2, there is provided a configuration in which the angular portion, which faces the raised portion 151 of the light source mounting portion 150 and the substrate portion 1a, is rounded (represented by a solid line in the drawing) or its sharp edge of the corner is removed (represented by a dotted line in the drawing), so that the corner is not brought into contact with the non-rectangular portion formed by the surface 1f of the substrate portion 1a and the side 150a of the raised portion 151 or is adapted to fit the non-rectangular portion.

With this configuration, even if the surface 1f of the substrate portion 1a does not cross at right angles to the side 151a of the raised portion 151, the light source mounting portion 150 can be bonded with the substrate portion 1a in an accurate position, and therefore it becomes possible to achieve an optical pickup having favorable record reproduction characteristics without any deviation from a predetermined position of the optical axis of the light emitted from the light source 2 mounted on the light source mounting portion 150.

Furthermore, preferably the light source 2 mounted on the light source mounting portion 150 is formed so as to face the raised portion 151, in other words, the raised portion 151 is formed in an extending direction of a backward emitting light 2h from the light source 2. Explanation will be made below for this description.

Since the raised portion 151 is used for precise positioning of the light source mounting portion 150 as set forth above, it can be intrinsically in contact with any surface only if it is in contact with the light source mounting portion 150. It is necessary, however, to take preventive measures so as to inhibit the backward emitting light 2h from the light source 2 from being incident upon the light receiving means or optical members as stray light. In this embodiment, these measures are taken on the raised portion 151.

In this embodiment, the top 151c of the raised portion 151 is inclined relative to an end surface 2i on which a luminous point 2g of the light source 2 exists. On the top 151c, a metallic or dielectric film having a high reflectance is formed over the surface or partially so as to reflect the backward emitting light 2h from the luminous point 2 g upon the top 151c non-perpendicularly. Preferably the angle of inclination on the top 151c of the raised portion 151 to the end surface 2i is set according to an angle of diffusion of the light emitted from the light source 2.

With this configuration, the backward emitting light 2h from the light source 2 can be favorably reflected in predetermined directions and preferably it is possible to prevent the backward emitting light 2h from being incident as a stray light on the optical members or light receiving means with being reflected or diffused inside the package 1.

Although the top 151c of the raised portion 151 is formed so as to have a high reflectance, a high extinction modulus can be applied instead of the high reflectance. As a configuration for increasing the extinction modulus, there is a method of arranging an extinction film over the surface of the top 151c or on a part of it. As for the extinction film, a translucent glass or resin material, an Si or Ti film, or an Si film and a Ti film is often used in a predetermined thickness.

Furthermore, preferably the film thickness of the extinction film is changed according to the wavelength of the incident light. In this manner, also with respect to light sources having various wavelengths, the extinction film can securely absorb the light from the respective light sources.

In the configuration in which the extinction film is used, most of the energy of the absorbed light is converted to heat, and therefore it is preferable to use a material having a favorable heat dissipation and a high heat conductivity as a material of the reflection member on which the extinction film is formed. By using these materials, it becomes possible to prevent an occurrence of disadvantages that a given extinction effect cannot be obtained due to a change of an organization of the extinction film caused by an increase of the temperature of the reflection member.

With this configuration, the light from the luminous point 2g of the light source 2 is absorbed on the top 151c without being reflected almost at all, and therefore the light from the luminous point 2g hardly impinges on the optical members as a stray light, whereby it becomes possible to achieve an optical pickup having favorable signal characteristics.

Although the top 151c of the raised portion 151 is inclined relative to the end surface 2i of the light source 2 in the example of the light reflection type, it need not be inclined in this case.

In addition, the light source mounting portion 150 need not be placed if the light source 2 is formed on the same semiconductor substrate as for the light receiving elements 3 or if the light source is directly placed on the substrate.

In the opening 1d of the first package 1, there is a first optical member 5 which is bonded. The first optical member 5 serves as a guide of the light emitted from the light source 2 and reflected on the record medium to a predetermined position of the light receiving means 3. In this embodiment, an explanation will be made for a configuration in which the first optical member 5 has a plurality of inclined planes and a returning light is induced by using the optical elements formed on respective inclined planes.

The first optical member 5 contains a first inclined plane 5a and a second inclined plane 5b inside. Further, there are provided an optical path dividing means 6 comprising a half mirror and a polarizing separation (polarization beam splitter) film on the first inclined plane 5a and a reflection means 7 for guiding the incident light to the light receiving means 3 on the second inclined plane 5b. If data can be rewritten into a high-density optical disk, the optical disk must be irradiated with extremely-high energy light, and therefore the light emitted from the light source 2 must be guided to the optical disk as efficiently as possible. From this viewpoint, it is preferable to use the optical path dividing means 6 made of a polarizing separation element (polarization beam splitter), being combined with a quarter-wave(length) plate 4, since it improves an efficiency of utilizing the light and makes it possible to use a plurality of types of optical disks for recording or reproduction. In addition, preferably it makes it possible to restrain the amount of light emitted from the light source 2, whereby the life of the light source 2 can be prolonged and therefore reliability of the optical disk unit can be improved.

The quarter-wavelength plate 4 serves as a converter of the light incident with linear polarization to an elliptic polarization, and if the rotary direction of an elliptic polarization is reversed due to a reflection on the record medium, the elliptic polarization is converted to a linear polarization which crosses at right angles to the direction of the incident polarization described above.

In a position of the reflection means 7, it is preferable to arrange an optical element which satisfies an object (for example, to form a focus error signal with non-point aberration (astigmatism)). For example, if a focus error signal is formed in a knife edge method, there is provided an optical element which is capable of forming a knife edge in the position of the reflection means 7, and if a focus error signal is obtained by using a non-point aberration (astigmatism) method, there is provided an optical element which is capable of forming a non-point aberration (astigmatism) in the position of the reflection means 7. Taking into consideration that these optical elements are formed in the first optical member 5, it is preferable to apply a configuration in which the optical elements are made of hologram since it makes the optical member thinner than that with optical elements made of lens, whereby the space can be used more efficiently so as to make the first optical member 5 smaller and thinner easily.

In addition, preferably the first optical member 5 is formed in a shape of a parallel planar plate as a whole since it is effective to prevent an occurrence of aberration, whereby favorable reproduction signals or focus tracking signals can be formed. Furthermore, preferably the first optical member 5 is mounted so that its top and bottom are precisely perpendicular to the optical axis of the transmitted light since it is effective to prevent an occurrence of the non-point aberration (astigmatism) and a degradation of reproduction signals caused by an unfocused spot.

As for materials of the first optical member 5, it is preferable to use materials having a high light transmission such as glass or resin since it is effective to prevent a decrease of the quantity of light and a degradation of the optical characteristics of the light transmitted through the first optical member 5. Particularly, glass is preferable as a material of the first optical member 5 since it does not cause a birefringence and therefore the characteristics of the transmitted light can be favorably maintained. Furthermore, it is more preferable to use optical glass having a low wavelength dispersion, in other words, a high Abbe's number such as a BK-7 since it is effective to prevent an occurrence of an aberration of a spherical surface caused by a fluctuation of a wavelength.

As for a method of forming the first optical member 5, it is preferable to use a method in which a plurality of die-shaped prisms containing optical elements are linearly bonded or a method in which optical elements are formed in predetermined positions of plate components and then respective plate components are laminated to be cut out into a given shape since these methods are useful to obtain favorable productivity. Particularly the latter method is preferable since it makes it possible to obtain both high productivity and high yield.

Although the first optical member 5 is directly bonded to the sidewall 1b of the first package 1 so as to close the opening 1d arranged on the sidewall 1b in this embodiment, the first package 1 can be spaced apart from the first optical member 5. By placing them separated from each other, it becomes possible to adjust more precisely a distance between the light source 2 and the first optical member 5 which becomes a problem if the height of the package 1 is uneven, by which the optical characteristics of the light guided to the light receiving means 3 by the first optical member 5 can be favorably maintained, so that signals can be detected accurately.

Next, referring to RIG. 1, a second package 8 comprises a substrate portion 8a on which a light source 9 emitting light for a low-density optical disk and a light receiving means 10 are mounted and a sidewall portion 8b arranged so as to enclose these members. The following description of the second package 8 focuses on different points from the first package 1.

First, as materials of the second package 8, it is preferable to use metal or ceramic in the same manner as for the first package 1 since they are effective to discharge favorably the heat generated by the light source 9.

The heat conductivity of the material of the second package 8 is preferably equivalent to or smaller than that of the material of the first package 1. This is because the light source 2 for the high-density optical disk 18 often has an output which is the same as or greater than that of the light source 9 for the low-density optical disk 19, and therefore the amount of heat discharged from the light source 2 is the same as or greater than that of the light source 9. This is because, if this package is configured so that the portions for holding the light sources and for discharging heat have the same amount of heat conductivity if the amount of heat dissipation of the light source 2 is not identical with that of the light source 9, a temperature of the light source 2 becomes higher than that of the light source 9, which causes an unbalance in the operating conditions between the light sources 2 and 9, and therefore in some cases the life of the light source 2 is greatly different from that of the light source 9, whereby there is a possibility of causing disadvantages such as decreasing reliability of the optical pickup significantly.

With the heat conductivity of the material of the second package 8 being equivalent to or smaller than the heat conductivity of the material of the first package 1, it becomes possible to reduce the possibility that the temperature of the light source 2 becomes higher than that of the light source 9, and therefore differences of the operating conditions between the light source 2 and the light source 9 can be reduced, so that it is possible to prevent the above described disadvantages from being caused.

Preferably the first package 1 has a contact area different from an area where it is in contact with a carriage of the second package 8. With these different contact areas being provided, it becomes possible to discharge more heat per unit time due to the larger areas, and therefore a difference between the amounts of the generated heat can be favorably resolved though the difference cannot be absorbed by a difference of the heat conductivity between respective packages. In this embodiment, particularly there is provided a large area where the first package 1 is in contact with the carriage.

Preferably the oscillation wavelength of the light source 9 is 800 nm or lower since a beam spot which is formed by the light emitted from the light source and converging on the record medium can be easily adjusted to the similar size of the pitch of the track which is formed on the record medium. Particularly the light source 9 is allowed to have an oscillation wavelength longer than that of the light source 2. For example, when a CD is reproduced, a beam spot of a sufficient size can be formed on the low-density optical disk 19 with a wavelength of about 780 nm.

Next, an explanation will be made for a light source mounting portion 152 on which the light source 9 is to be mounted.

The light source mounting potion 152 is almost the same as the light source mounting portion 150 in its shape, mounting position, and functions, and therefore the explanation is omitted here. The amount of heat generated by the light source 9, however, is not so great in comparison with that of the light source 2 in a lot of cases, and therefore requirements of the characteristic values are not so severe as those of the light source mounting portion 150. Therefore, the light source mounting portion 152 is preferably made of a material having a linear expansion coefficient close to that of the light source 9 (approx. $6.5 \times 10^{-6}/°$ C.) and a heat conductivity which is ⅕ or greater than that of the light source mounting portion 150, taking into consideration an output ratio of the light source 2 to the light source 9. Specifically, it is preferable to use a material having a linear expansion coefficient of 3 to $10 \times 10^{-6}/°$ C. and a heat conductivity of 20 W/mK or greater. For example, as these materials, there are Mo, Cu, Fe, FeNiCo alloy, or FeNi alloy in addition to the materials described as the examples for the light source mounting portion 150. In this embodiment, the light source mounting portion 152 is made of the materials such as Cu, Mo, or the like, which are extremely low-cost in comparison with AlN which is the material of the light source mounting portion 150, and has relatively superior characteristics in the above aspects.

An area in which the light source mounting portion 152 is in contact with the substrate portion 8a or the sidewall portion 8b is preferably smaller than the area in which the light source mounting portion 150 is in contact with the substrate or sidewall portion. With this configuration, it becomes possible to conduct the heat generated by the light source 2 having a heat emitting amount generally greater than that of the light source 9 to the substrate favorably in particular. Accordingly, also when using a semiconductor laser having a low resistance to high temperatures, it is possible to prevent the temperature in use of the light source 2 from being increased to a level which is greatly higher than that of the light source 9, whereby the life of the light source 2 is not clearly shorter than that of the light source 9 as a result, and therefore the life of the optical pickup can be relatively prolonged and its reliability can be improved.

Furthermore, the light source mounting portion 152 is smaller than the light source mounting portion 150 in the first package 1, and it will be described below.

In a lot of cases, there is a difference between the required heat dissipation levels of the light source mounting potion 150 on which the light source 2 is mounted and the light source mounting potion 152 on which the light source 9 is mounted. To cope with this difference, it is an effective method to apply different shapes to them.

In other words, the light source mounting portion 150 is formed in a larger size in comparison with the size of the light source mounting portion 152 to increase the heat capacity of the light source mounting portion 150, so that the heat generated by the light source 2 is efficiently conducted to the light source mounting portion 150.

With this configuration, the heat generated by the light source 2 can be discharged through conduction to the light source mounting portion 150, and further heat dissipation caused by radiation from the surface of the light source mounting portion 150 can be utilized at a greater ratio in addition to the heat dissipation from the light source mounting portion 150 through conduction to the substrate portion 1a or the sidewall portion 1b, whereby the heat from the light source 2 having a large amount of heat emission can be discharged very efficiently.

Further, in this case, the amount of conducted heat of the light source mounting portion 150 is preferably greater than that of the light source mounting potion 152. With this configuration, it becomes possible to discharge the heat from the light source 2 having a greater output to an outside more efficiently via the light source mounting portion 150.

Accordingly, it restrains a shift of a wavelength of the light emitted from the light source 2 which is caused by an increase of a temperature of the light source 2 since the heat is accumulated around the light source 2. Furthermore, the increase of the temperature of the light source 2 can be efficiently restrained, and therefore it is possible to prevent the light source 2 from being degraded by the heat or from being destroyed, which improves the reliability of the optical pickup.

Although the light source mounting portions are discriminated by applying different shapes to them in this embodiment, it is preferable to make a difference between them in their volumes since it affects the amounts of the accumulated heat most effectively.

In addition, with the surface area of the light source mounting portion 150 being greater than the surface area of the light source mounting potion 152, an amount of radiation heat from the surface of the light source mounting portion 150 can be increased. With an amount of radiation heat per unit time from the light source mounting portion 150 being greater than an amount of radiation heat per unit time from the light source mounting portion 152, heat can be discharged to the outside efficiently from the light source mounting portion 150 through radiation, too, whereby a thermal load of the light source 2 can be reduced.

Although two light source packages are used in this embodiment, any number of light source packages can be used only if two or more packages are used. At this point, preferably the physical properties of each light source mounting portion depends on an output of the light source mounted on the light source package.

As set forth hereinabove, with the physical properties (for example, a heat capacity, a size, a volume, a surface area, etc.) of the light source mounting portion 150 on which the light source 2 is mounted being different from the physical properties of the light source mounting portion 152 on which the light source 9 is mounted, it becomes possible to discharge efficiently the heat from the light source 2 whose output is high and which is likely to have a high temperature, and therefore it is possible to prevent a shift of the oscillation wavelength caused by an increase of the temperature of the light source 2 or to prevent the light source 2 from being destroyed due to the heat.

In addition, the temperature of the light source 2 under the operation can be almost the same as that of the light source 9, in other words, the operation is not performed with only one of them having a extremely high temperature, and therefore there is not so much difference between the lives of the light sources 2 and 9, whereby the optical pickup can secure higher reliability without much variation of the life of the optical pickup.

Although the second optical member 11 has almost the same configuration as for the first optical member 5, in some cases, there is a difference of the optical elements formed on respective inclined planes between them, and it will be described below. On a first inclined plane 11a, there is provided an optical path dividing means 12 made of a half mirror and a polarizing separation (polarization beam splitter) film, and on a second inclined plane 11b, there is provided a reflection means 13 for guiding an incident light to a light receiving means 10.

At this point, a signal detection method is different between a high-density optical disk and a low-density optical disk in a lot of cases. Therefore, an arrangement of a light receiving section in the light receiving means 10 is often different from that of the light receiving section of the light receiving means 3. Accordingly, if focus error signals are formed by the reflection means 13 when a light from the optical disk is guided to the light receiving means 10, the reflection means 13 has preferably a shape different from that of the reflection means so as to form optimum signals for respective optical disks, whereby more precise signal forming and operation control can be achieved and it becomes possible to obtain a more reliable optical pickup having less malfunctions.

An arrangement of the light source mounting portion 152 in the substrate portion 8a is almost the same as that of the light source mounting potion 150 in the substrate portion 1a as shown in FIG. 2, and further in the same manner the light source 9 mounted on the light source mounting portion 152 is arranged so as to face a raised portion 153. Accordingly, an explanation of the arrangement is omitted here.

The oscillation wavelengths of the light sources 2 and 9 in this embodiment, however, are different from each other since they are used to cope with different record mediums; 630 to 660 nm for the light source 2 and 770 to 800 nm for the light source 9. Therefore, different points caused by it will be described below.

Generally in the metallic or dielectric materials used for reflecting light, a ratio of a reflected light to an incident light (a reflectance) or a ratio of an absorbed light to an incident light (an extinction modulus) often depends on a wavelength of the incident light, in other words, there is a dependence of the reflectance on the wavelength in a lot of cases. Accordingly, if the lights from the light sources 2 and 9 are reflected on a reflection member having the same configuration, there is a difference of the reflection ratio between the lights from the light source 2 and the light source 9, which leads to a possibility of causing disadvantages such as an increase of scattering due to the difference.

Therefore in this embodiment, it is preferable to use materials of a reflection film or an extinction film on a top 153c of the raised portion different from those of the top 151c. In other words, a reflection film (an extinction film) is formed on the top 151c with a material having a great reflectance (an extinction modulus) to a wavelength of the light emitted from the light source 2, and a reflection film (an extinction film) is formed on the top 153c with a material having a great reflectance (an extinction modulus) to a wavelength of the light emitted from the light source 9.

With this configuration, preferably the backward emitting lights from both light sources 2 and 9 can be reflected favorably in given directions (can be favorably absorbed), and therefore the lights are reflected and scattered inside respective packages so as to prevent the lights from being incident on the optical members and light receiving means as stray lights.

In this embodiment, the light sources 2 and 9 are different in size from each other. An explanation will be made for this point below.

In many cases, an optical output of the light source 2 is different from that of the light source 9. This is mainly because their record media for recording or reproduction are not identical and therefore the required quantities of lights are often different from each other. Accordingly, the light source 2 has a heat emitting amount different from that of the light source 9, and therefore there is a difference between their temperatures during the operation.

There are the following disadvantages which may be caused when there is a difference between the temperatures of the light sources during the operation:

A shift of an oscillation wavelength caused by a change of a temperature and a degradation of optical characteristics accompanying it, and A degradation or destruction of the light sources caused by a high temperature, i.e., a reduction of the lives of the light sources. These disadvantages reduce the life of the product and lower its reliability.

In this embodiment, so as to prevent an occurrence of these disadvantages, the light source 2 has a size, specifically, an area in which the light source 2 is in contact with another member, which is different from that of the light source 9. Since the heat generated by the light sources is discharged to respective members in contact with the light sources through conduction, for example, if an output of the light source 2 is greater than that of the light source 9, a contact area of the light source 2 larger than that of the light source 9 makes it possible to discharge more heat per unit time from the light source 2 through conduction. It is effective to prevent the light source 2 from having a temperature during operation greatly different from the temperature of the light source 9 during operation, and therefore it prevents an occurrence of the above disadvantages, which leads to longer life of the product and improved reliability so as to be preferable.

In addition, it is also effective to apply different surface areas to the light sources 2 and 9. Generally as a form of a heat transmission, there is a radiation (emission) in addition to the conduction described above. Since the amount of radiation heat per unit time or unit area depends on a temperature, a larger surface area generates a greater amount of radiation heat at the same temperature.

Accordingly, if the output of the light source 2 is greater than that of the light source 9, a surface area of the light source 2 larger than that of the light source 9 generates a greater amount of radiation heat from the light source 2 in comparison with the amount of radiation heat from the light source 9, so as to reduce the difference of the temperature between the light source 2 and the light source 9 during operation. Accordingly, this configuration is preferable since it is effective to prevent an occurrence of the above disadvantages, to lengthen the life of the product, and further to improve its reliability.

As set forth hereinabove, with light sources different in size from each other according to respective outputs of the light sources in an optical pickup including a plurality of light sources, different amounts of heat can be radiated from respective light sources, and therefore it becomes possible to minimize a difference of the temperature between the light sources during operation, which leads to prevent disadvantages such as a shift of oscillation wavelengths caused by a temperature change of the light sources, a degradation of the optical characteristics accompanying it, and a degradation or destruction of the light sources caused by a high temperature, in other words, a reduction of preduct lives of the light sources. Therefore, it is effective to lengthen the life of the product in which this type of an optical pickup is installed and to improve the reliability of the product.

Next, it is preferable to enclose the inside space surrounded by the first package 1, in other words, the space in which the light source 2 and the light receiving elements 3 are arranged. With this configuration, it becomes possible to prevent dust or moisture from being included into the inside of the package, whereby the performances of the light source 2 and the light receiving elements 3 can be maintained and it also prevents a degradation of the optical characteristics of the emitted light.

In this embodiment, the first package 1 is closed by the first optical member 5. In other words, the bottom of the first optical member 5 is bonded with an outer surface of the sidewall section 1b of the first package 1 so as to close the opening 1d provided for the first package 1. The bonding materials used here are mostly, for example, optical hardening resin, epoxy resin, or bonding resign.

It is more preferable to previously enclose N2 gas or inactive gas such as a dry air or Ar gas in the closed space since it prevents a deterioration of optical characteristics caused by sweating on the bottom of the first optical member 5 which faces the inside of the first package 1 and a degradation of the characteristics caused by oxidation of the light source 2 or the light receiving elements 3.

With this configuration in which the first optical member 5 is bonded to the sidewall portion 1b of the first package 1 by using bonding material so as to close the first package 1, a cover glass can be omitted here though it is conventionally needed only for closing this portion, and therefore a configuration of the optical pickup can be simplified so as to reduce the number of the components. In addition, manufacturing process groups of the optical pickup can be reduced to only a single process group of positioning and bonding optical members though conventionally the manufacturing requires two process groups, the positioning and bonding optical members and bonding cover member for closing the package, and therefore the manufacturing processes of the optical pickup can be simplified so as to improve productivity of the optical pickup.

Additionally, since the first optical member 5 is exposed to the outside of the first package 1, the package can be smaller in comparison with a configuration in which the first optical member is contained in the package, whereby the size of the optical pickup can be also reduced so as to increase an efficiency of utilizing the space of the optical pickup.

Furthermore, with a configuration in which optical elements are not arranged on the surface which is exposed to the outside but placed between prisms in the first optical member 5, it is possible to prevent an occurrence of disadvantages, for example, that given performances cannot be maintained since the optical elements are exposed to the surrounding air and absorbs moisture or that the characteristics are degraded due to dust on the optical elements.

At this point, an inside pressure of the first package 1 is preferably negative. It is effective to make the bonding effects favorable between the first optical member 5 and the first package 1 since a pressure is applied in such a direction that the first optical member 5 bonded to the sidewall portion 1b of the first package 1 is drawn from the outside of the first package 1 to the inside thereof.

Next, there is described below an embodiment having a further preferable configuration.

In a configuration of this embodiment, the first package 1 is not closed only by the first optical member 5 from the outside, but the opening 1d of the first package 1 is closed by a shield member 85 (indicated by a dotted line in the drawing) and the first optical member 5. In other words, the shield member 85 is arranged so as to close the opening 1d on the sidewall portion 1b of the first package 1 from the inside of the first package, and the first optical member 5 is arranged so as to close the opening 1d on the sidewall portion 1b of the first package from the outside thereof, and therefore the inside of the first package 1 is enclosed by these two members.

Now the advantages of this configuration will be described below. If the inside pressure of the first package 1 is positive, the shield member 85 bonded from the inside is pressed to the sidewall portion 1b including the bonding material, which is effective to decrease a possibility of an occurrence of a leak. If it is negative, however, the pressure is applied in such a direction that the shield member 85 is separate from the sidewall portion 1b, which increases the possibility of an occurrence of a leak due to defective bonding.

To the contrary, the first optical member 5 bonded from the outside is pressed to the sidewall portion 1b including the bonding material if the inside pressure of the first package 1 is negative as opposite to the shield member 85, which is effective to decrease the possibility of an occurrence of a leak, but if the inside pressure of the first package 1 is positive, the pressure is applied in such a direction that the first optical member 5 is separated from the sidewall portion 1b, which increases the possibility of an occurrence of a leak due to defective bonding.

In other words, with the shield member 85 and the first optical member 5 arranged so that the sidewall portion 1b of the first package 1 is put between them, a pressure is applied in such a direction that at least one of the shield member 85 and the first optical member 5 is pressed to the sidewall portion 1b whether the inside pressure of the first package 1 is positive or negative, and therefore it becomes possible to reduce occurrences of a leak caused by a difference of atmospheric pressure or defective bonding.

With this configuration, the air-tightness of the inside of the first package 1 can be improved, whereby it becomes possible to prevent an occurrence of disadvantages caused by a condition that the light source, the light receiving element, or the optical member to be arranged inside the first package 1 is exposed to the air or includes moisture, which leads to achieving an optical pickup with an extremely high reliability.

For the material of the shield member 85, it is preferable to use a material having favorable transparency such as resin or glass which does not decrease an efficiency of utilizing light. In addition, a thinner shield member is preferable to an extent that it does not cause any significant problem since it is effective to minimize an expansion of a diameter of the light.

Furthermore, the bonding power of the shield member 85 to the sidewall portion 1b is preferably different from that of the first optical member 5 to the sidewall portion 1b. Particularly, with the bonding power of the shield member 85 directly facing the inside of the first package 1 to the sidewall portion 1b being greater than that of the first optical member 5, a leak between the first optical member 5 and the sidewall portion 1b can be inhibited to extend to the inside of the first package 1 even if such a leak may occur. This is effective to largely decrease a possibility of an occurrence of a leak into the inside of the first package 1. As a means for realizing this configuration, there can be provided a method of using a bonding material having a greater bonding power for the bonding between the shield member 85 and the sidewall portion 1b in comparison with that of the bonding material used for the bonding between the first optical member 5 and the sidewall portion 1b.

Still further, preferably a difference of pressure is as small as possible between a space A enclosed by the first package 1 and the shield material 85 and a space B enclosed by the sidewall portion 1b, the shield member 85, and the first optical member 5. A pressure is always applied to the shield member 85 between the space A and the space B due to a difference of pressure between the space A and the space B. If a vibration caused by hand carriage or car mounting of the product is entered into the shield member 85 in this condition, the shield member 85 significantly vibrates or is deflected and this may change minutely an angle of incidence formed by an incident light and the shield member 85, and may further lead to a degradation of optical characteristics. From this viewpoint, the difference of the pressure (P) is preferably as small as possible between the space A and the space B. Specifically, P is preferably 0.3 (atm) or lower.

The same conditions are preferably applied to the spaces surrounded by the second package 8 and the second optical member 11.

Next, the optical path dividing means 15 is used to guide light emitted from both of the light source 2 and the light source 9 to the optical disk. Generally a half mirror or a polarizing separation (polarization beam splitter)film is used as a material of the optical path dividing means 15, and more preferably it has characteristics of transmitting the light from the light source 2 at a high ratio and of reflecting the light from the light source 9 at a high ratio. If so, a loss of the light in the optical path dividing means 15 can be limited to the minimum and therefore an efficiency of utilizing the light can be increased. The increase of the efficiency of utilizing the light is preferable since it makes it possible to limit an amount of light emitted from the light source 2 or the light source 9, whereby the life of the light source 2 or the light source 9 can be lengthened, which leads to an improvement of the reliability of an optical disk unit on which this optical pickup is mounted.

Preferably a reflection means having a wavelength selecting function is used as the optical path dividing means 15 having the above characteristics. The reflection means having this wavelength selecting function transmits light having a certain wavelength while it reflects light having another wavelength, and particularly in this embodiment, with the optical path dividing means 15 configured so as to transmit almost all the light from the light source 2 and to reflect almost all the light from the light source 9, the efficiency of utilizing the light from the light source 2 and the light source 9 can be set to the highest. Accordingly, a great load is not applied almost at all to either the light source 2 or the light source 9, and therefore the lives of the light source 2 and the light source 9 can be averaged and it favorably leads to actualizing a long life of the optical pickup.

Next, a color (chromatic) aberration correcting (compensating) means 500, which is placed between the light source 9 and the optical path dividing means 15, is used to correct a color (chromatic) aberration which may occur in a luminous flux which is emitted from the light source 9 and converges on a disk 19. As the above color (chromatic) aberration correcting (compensating) means 500, there may be a hologram having a color (chromatic) aberration correcting (compensating) means or a lens having a color (chromatic) aberration correcting (compensating) means; it is preferable to use the hologram to actualize a smaller optical pickup. This is because it is effective to lower a ratio of a volume of the color (chromatic) aberration correcting (compensating) means to the optical pickup and it further decreases the size of the optical pickup.

With this color (chromatic) aberration correcting (compensating) means 500 arranged, it is possible to correct an occurrence of a color (chromatic) aberration caused by a change of a refractive index of a glass material or the like due to a difference between a wavelength of the light emitted from the light source 2 and that of the light emitted from the light source 9, and therefore it becomes possible to resolve a problem that the light condensed by the condenser is not condensed on the record medium due to a presence of a color (chromatic) aberration. In other words, it is unnecessary to use an objective lens which is optimally-designed according to a type of the disk and a wavelength of the light source. Accordingly, without a configuration in which an objective lens is exchanged according to a type of the disk and that of the light source, only a single condenser 17 can be used to favorably condense both of the light from the light source 2 and the light from the light source 9 on a high-density optical disk 18 and a low-density optical disk 19, respectively.

Although the color (chromatic) aberration correcting (compensating) means 500 is arranged between the light source 9 and the optical path dividing means 15 in this embodiment, it may be placed between the optical path dividing means 15 and the condenser 17 as a configuration in which it does not so much affect the characteristics of the light from the light source 2 with an amount of application to the light from the light source 2 made smaller than an amount of application to the light from the light source 9. With this configuration in which the color (chromatic) aberration correcting (compensating) means 500 can be placed in any position between the light source 9 and the condenser 17, a degree of freedom in designing an optical pickup can be increased so as to actualize a smaller optical pickup easily.

Although the quarter-wavelength plate 4 and the quarter-wavelength plate 14 are mounted on the first optical member 5 and the second optical member 11, respectively, in this embodiment, they may be placed in any position between an end surface of the optical path dividing means 15 in the side of a collimator lens 16 and the optical disk, instead. With this configuration, one quarter-wavelength plate can be omitted though conventionally two quarter-wavelength plates are needed, and therefore the productivity can be enhanced and a low-cost optical pickup can be achieved. Particularly, the plate is preferably formed on the end surface of the optical path dividing means 15 in the side of the collimator lens 16 previously in the configuration since it reduces the number of processes so as to improve the productivity.

The collimator lens 16 is used to convert diffusion angles of the light emitted from the light source 2 and the light source 9 to parallel light which has been diffused light before it is incident.

The condenser 17, which is used to condense the light which has been incident and then to form a beam spot on the optical disk, is supported by a lens driving means so as to shift in a focusing or tracking direction. The collimator lens 16 is effective to increase a quantity of light which is incident on the condenser 17, and therefore an efficiency of utilizing the light is increased. Accordingly, it becomes possible to use the light source 9 at an output significantly lower than the maximum output, so as to lengthen the life of the light source 9, whereby the reliability of the optical pickup device is increased.

In this embodiment, the collimator lens 16 and the condenser 17 are designed so as to be optimum for the light source 2 and the high-density optical disk 18, and the luminous point $2a$ of the light source 2 is arranged on a focus of the collimator lens 16.

Furthermore, although the color (chromatic) aberration correcting (compensating) means 500 is provided with being separated from the light source package 8 and the optical path dividing means 15 in this embodiment, it may be formed on the light source package 8 after an adjustment of an optical axis with the light source 9 or may be monolithically integrated with the optical path dividing means 15 or directly formed on its end surface in the side of the light source package 8. It simplifies an assembly process of the optical pickup, so as to increase the productivity of the optical pickup.

Still further, instead of using the collimator lens 16, for example, the first optical member 5 and the second optical member 11 may be provided with a function of converting diffusion angles of the light. In this configuration, the collimator lens 16 need not be provided, and therefore precise positioning becomes unnecessary and the number of the components is reduced, whereby the productivity is increased.

Next, an operation of the optical pickup device having these configurations will be described with reference to the drawings.

First, the high-density optical disk 18 is installed in a spindle motor of the disk unit. Mostly the high-density optical disk 18 is made of two disk substrates each having a thickness of approximately 0.6 mm with being laminated to be formed. In this condition, the optical pickup is operated.

The luminous flux $2b$ emitted from the luminous point $2a$ of the light source 2 is transmitted through the optical path dividing means 6 on the first inclined plane $5a$ of the first optical member 5, changes its polarization direction from a linear polarization to a circular polarization at the quarter-wavelength plate 4, and is incident on the optical path dividing means 15. Then, after it is transmitted through the optical path dividing means 15 almost entirely, it is converted to a luminous flux $2c$ at the collimator lens 16 and condensed as shown by a luminous flux 2d. The condenser 17 is designed with a numerical aperture of approximately 0.6 so that it can focus light into a minute spot to an extent that data on the high-density optical disk 18 can be reproduced.

Next, by using FIG. 1, an explanation will be made for an optical path of forward light for a reproduction of the low-density optical disk 19. In this embodiment, the low-density optical disk 19 has a thickness of approximately 1.2 mm. Light 9b emitted from a luminous point 9a of the light source 9 is transmitted through the optical path dividing means 12 on the first inclined plane 11a of the second optical member 11, changes its polarization direction from a linear polarization to a circular polarization at the quarter-wavelength plate 14, and is incident on the optical path dividing means 15. Then, after it is reflected by the optical path dividing means 15 almost entirely, it is converted to a luminous flux 9c at the collimator lens 16, and then condensed as shown by a luminous flux 9d on the low-density optical disk 19 by the condenser 17.

At this point, a focal length L2 of the condenser 17 for a reproduction of the low-density optical disk 19 is set to a length longer than a focal length L1 of the condenser 17 for a reproduction of the high-density optical disk 18. A difference between the focal lengths is preferably 1.0 mm or lower, otherwise, 0.6 mm or lower since it makes it almost unnecessary to drive greatly an actuator which holds the condenser 17 at a reproduction on various types of a plurality of disks. Accordingly, the position of the focus can be easily adjusted and therefore it is possible to cope with a difference of a thickness between the substrates very favorably.

With this configuration in which light from a plurality of light sources focuses in different positions on the record media, it becomes possible to reproduce data on record media whose substrate thickness is different from each other by means of an identical optical pickup device. In other words, it becomes possible to record and reproduce data on the low-density optical disk 19 having a thickness of 1.2 mm such as a CD-ROM and data on the high-density optical disk 18 which is a single substrate having a thickness of 0.6 mm or a DVD with the double-sided lamination of the single substrate by means of an identical optical pickup device.

The focal length L1 and the focal length L2 can be changed to some extent by setting a movable range of the optical member such as the condenser 17, and therefore it is possible to reproduce data on an optical disk made of laminated high-density optical disks or on an optical disk having a plurality of record layers.

Next, an explanation will be made for an optical path up to the point at which reflected light from the high-density optical disk 18 or the low-density optical disk 19 is detected, in other words, a backward path.

First, a reproduction on the high-density optical disk 18 is described. Reflected light from the high-density optical disk 18 is transmitted through the optical path dividing means 15 along almost the same optical path as the forward path, converted by the quarter-wavelength plate 4 from the circular polarization to the linear polarization which crosses at right angles to the first polarization direction, and then incident on the optical path dividing means 6 on the first inclined plane 5a of the first optical member 5. Since the optical path dividing means 6 is made of a polarizing separation (polarization beam splitter) film in this embodiment, the incident light is reflected almost entirely and then guided to the reflection means 7. The reflection means 7 is composed of optical elements satisfying a certain object; there are provided elements for forming focus error signals here. Accordingly, the light reflected by the reflection means 7 is condensed on the light receiving means 3 while forming a focus error signal to detect a signal depending on the data recorded on the high-density optical disk 18, a track error signal, and a focus error signal.

Next, a reproduction on the low-density optical disk 19 will be described. Reflected light from the low-density optical disk 19 is reflected by the optical path dividing means 15 along almost the same optical path as the forward path, converted by the quarter-wavelength plate 14 from the circular polarization to the linear polarization which crosses at right angles to the first polarization direction, and then incident on the optical path dividing means 12 on the first inclined plane 11a of the second optical member 11. Since the optical path dividing means 12 is made of a polarizing separation (polarization beam splitter) film in this embodiment, the incident light is reflected almost entirely and then guided to the reflection means 13. The reflection means 13 is composed of optical elements satisfying a certain object; there are provided elements for forming focus error signals here. Accordingly, the light reflected by the reflection means 13 is condensed on the light receiving means 10 while forming a focus error signal to detect a signal depending on the data recorded on the low-density optical disk 19, a track error signal, and a focus error signal.

If a plurality of light sources are arranged in different positions as described above, mostly there is a great difference in a wavefront aberration which occurs in the light emitted from respective light sources and therefore it is necessary to use a lens having an aberration correcting (compensating) function effective for correcting (compensating) this wavefront aberration as a condenser, which often results in causing a necessity of using a plurality of condensers matching each luminous flux in general. In this embodiment, this problem is avoided by optimizing a distance between the luminous point 2a or 9a of the light source 2 or 9 and the collimator lens, and this point will be now described below.

Figure 4:
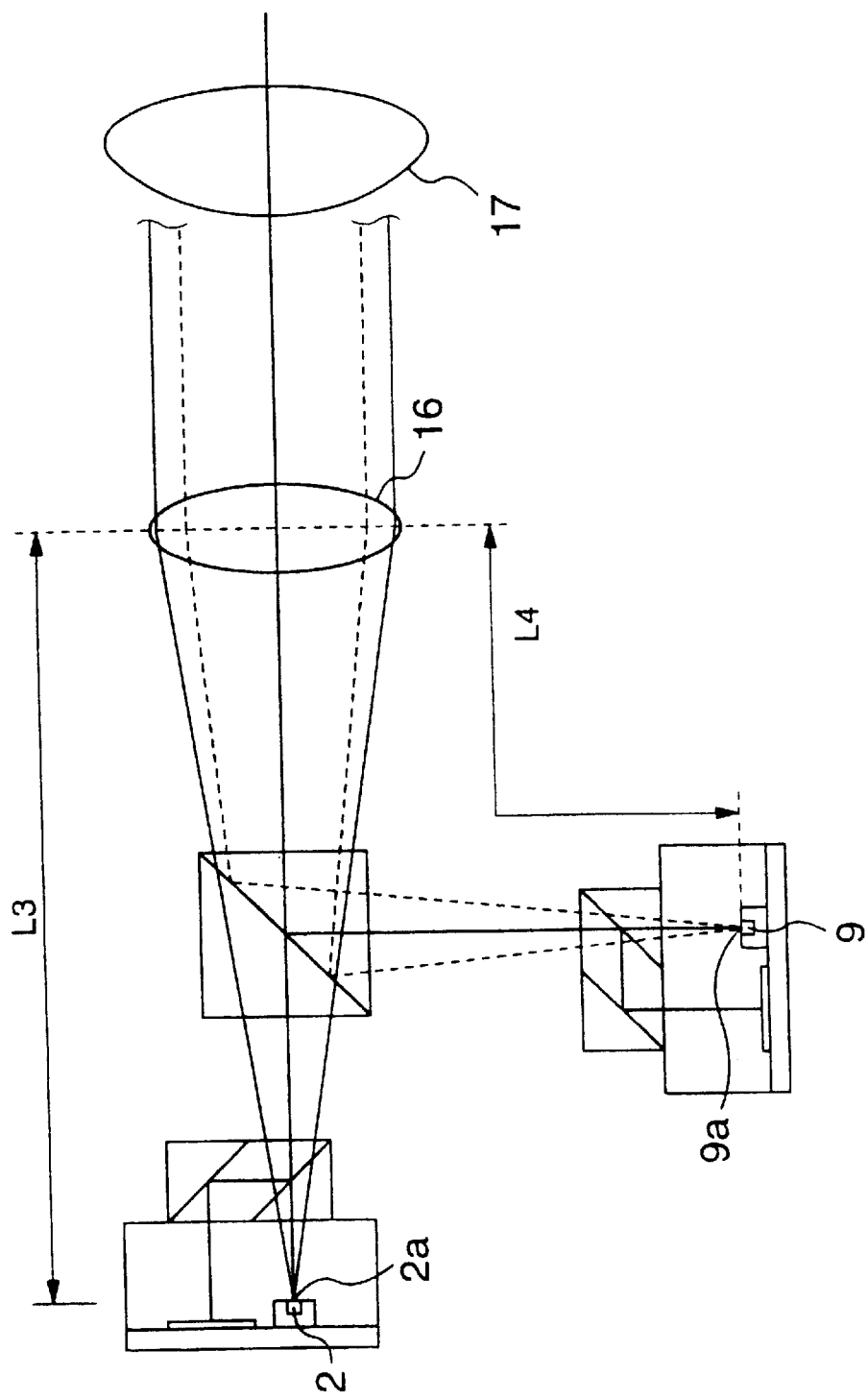
FIG. 4 is a diagram illustrating a relationship between a luminous point and a collimating lens of the first embodiment according to the present invention.

Referring to FIG. 4, there is shown a relationship between the luminous point and the collimator lens in the first embodiment. In FIG. 4, reference numeral L3 indicates an effective focal length from the collimator lens 16 to the luminous point 2a, and reference numeral L4 indicates an effective focal length from the collimator lens 16 to the luminous point 9a. Furthermore, referring to FIG. 5, there is shown a relationship between a wavefront aberration amount and a distance ratio depending on a shift amount of the condenser of the first embodiment according to the present invention. In other words, when a ratio of L3 to L4 is changed, a wavefront aberration amount which occurs at an incidence on the condenser is compared between a case in which the condenser 17 shifts by 500 $\mu$m in a tracking direction (indicated by a thick line) and a case in which it does not shift in the tracking direction at all (indicated by a thin line).

Figure 5:
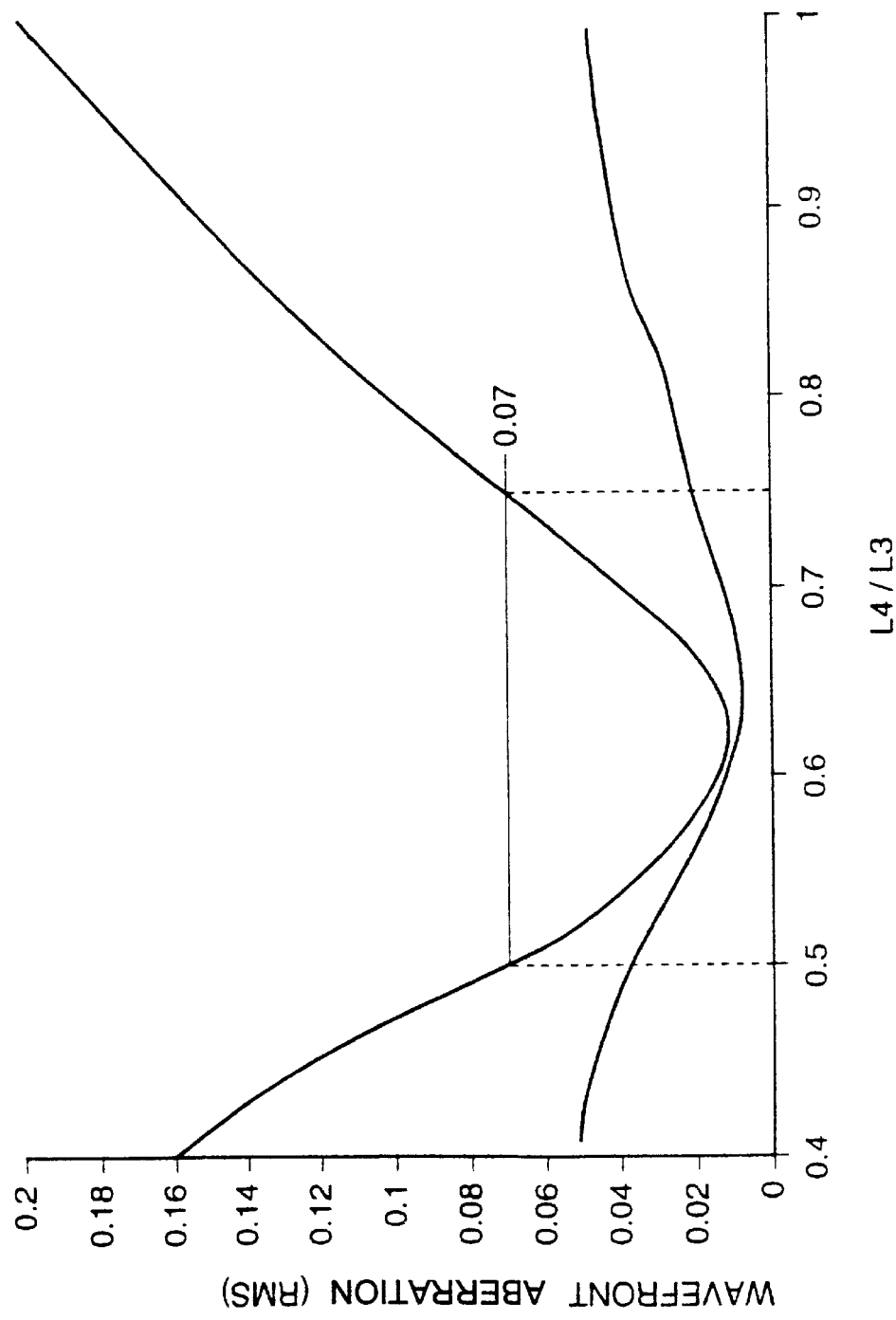
FIG. 5 is a diagram illustrating a relationship between a wavefront aberration amount and a distance ratio depending on a shift amount of a condenser of the first embodiment according to the present invention.

In general, a condenser under reproduction on an optical disk has a possibility of shifting by a maximum of 500 $\mu$m in a tracking direction. In addition, taking into consideration that it is assumed that 0.07$\lambda$ (where $\lambda$ indicates a wavelength of light) or lower of a wavefront aberration amount as an RMS value is allowed to converge light which has been incident on the condenser into the optical disk effectively, and assuming that the wavefront aberration amount is 0.07$\lambda$ or lower at the maximum shift amount (500 $\mu$m) of the condenser 17 for the light from the luminous point 9a in which the aberration amount is relatively large and the incidence conditions to the condenser 17 become severe, light from both of the luminous points will converge on the optical disk independent of the shift amount of the condenser 17 after it is incident on the condenser 17. To satisfy this condition, apparently as shown in FIG. 5, the ratio of L3 to L4 (L4÷L3=H, it is described hereinafter as H) is preferably within a range of $0.50 \leq H \leq 0.75$.

If H is within this range, it is possible to limit the amount of a wavefront aberration which may occur in the light reflected by the record medium and return, and therefore the light can be favorably incident on the light receiving means which receives the reflection light so as to achieve superior signal characteristics.

Further, if the wavefront aberration amount is $0.04\lambda$ or lower as an RMS value under the same conditions, the light incident on the condenser 17 is converged very precisely on the optical disk independently of a shift amount of the condenser 17 whether the incident light is emitted from either luminous point 2a or 9a. To satisfy this condition, apparently as shown in FIG. 5, the ratio of L3 to L4 (H) is preferably within a range of $0.53 \leq H \leq 0.70$.

With an arrangement of the optical system so that the value of H is within the above range, the wavefront aberrations in every luminous flux can be theoretical threshold or lower values in an optical pickup having a plurality of types of luminous flux in a single optical system, and therefore every luminous flux can be condensed on the optical disk by using a single condenser 17.

Accordingly, only one condenser 17 is needed for condensing, so that the number of condensers can be reduced. In addition, if a plurality of condensers are used, it is not required to arrange a plurality of optical systems corresponding to them nor lens switching means, whereby it becomes possible to make the optical pickup smaller, to increase the productivity due to a decrease of the number of the components, and further to improve the reliability of the optical pickup and to increase the operation speed due to omission of a complicated mechanism.

Figure 6:
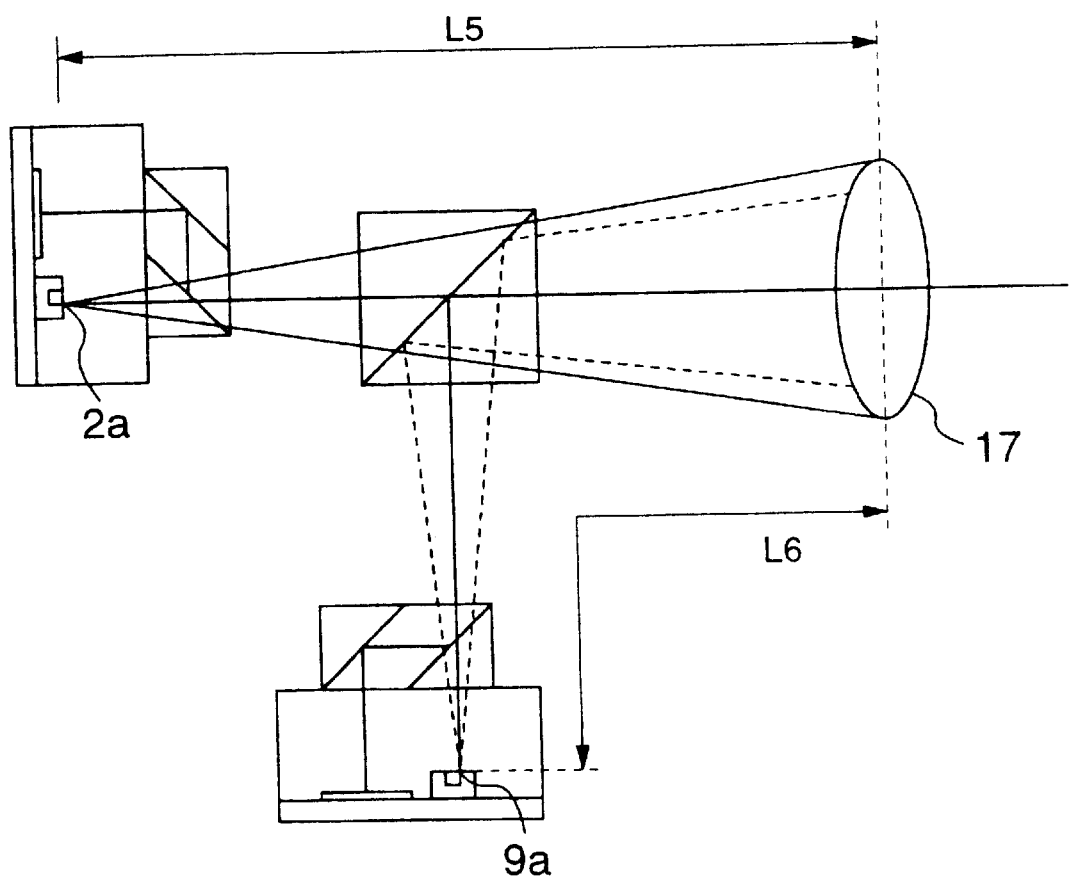
FIG. 6 is a diagram illustrating a relationship between a luminous point in a finite optical system and the condenser of the first embodiment according to the present invention.

Although an infinite optical system having the collimator lens 16 is used in this embodiment, a finite optical system without the collimator lens as shown in FIG. 6 may be also used. Referring to FIG. 6, there is shown a relationship between luminous points and a condenser in the finite optical system in the first embodiment according to the present invention. In FIG. 6, the configuration is the same as for the infinite optical system except that reference numeral L5 indicates an effective focal length from the condenser 17 to the luminous point 2a, and reference numeral L6 indicates an effective focal length from the condenser 17 to the luminous point 9a. Still further, also in an optical pickup in which one is an infinite optical system and the other is a finite optical system, the relationship can be defined in the same manner.

The above phenomenon may be caused by an extremely small spherical surface aberration as a whole since a degree of a spherical surface aberration caused by a difference of a thickness between the high-density optical disk and the low-density optical disk is the same as that of a spherical surface aberration caused by a deviation of the position of the luminous point 9a and they have inverse signs which negates the spherical surfaces each other.

Figure 19:
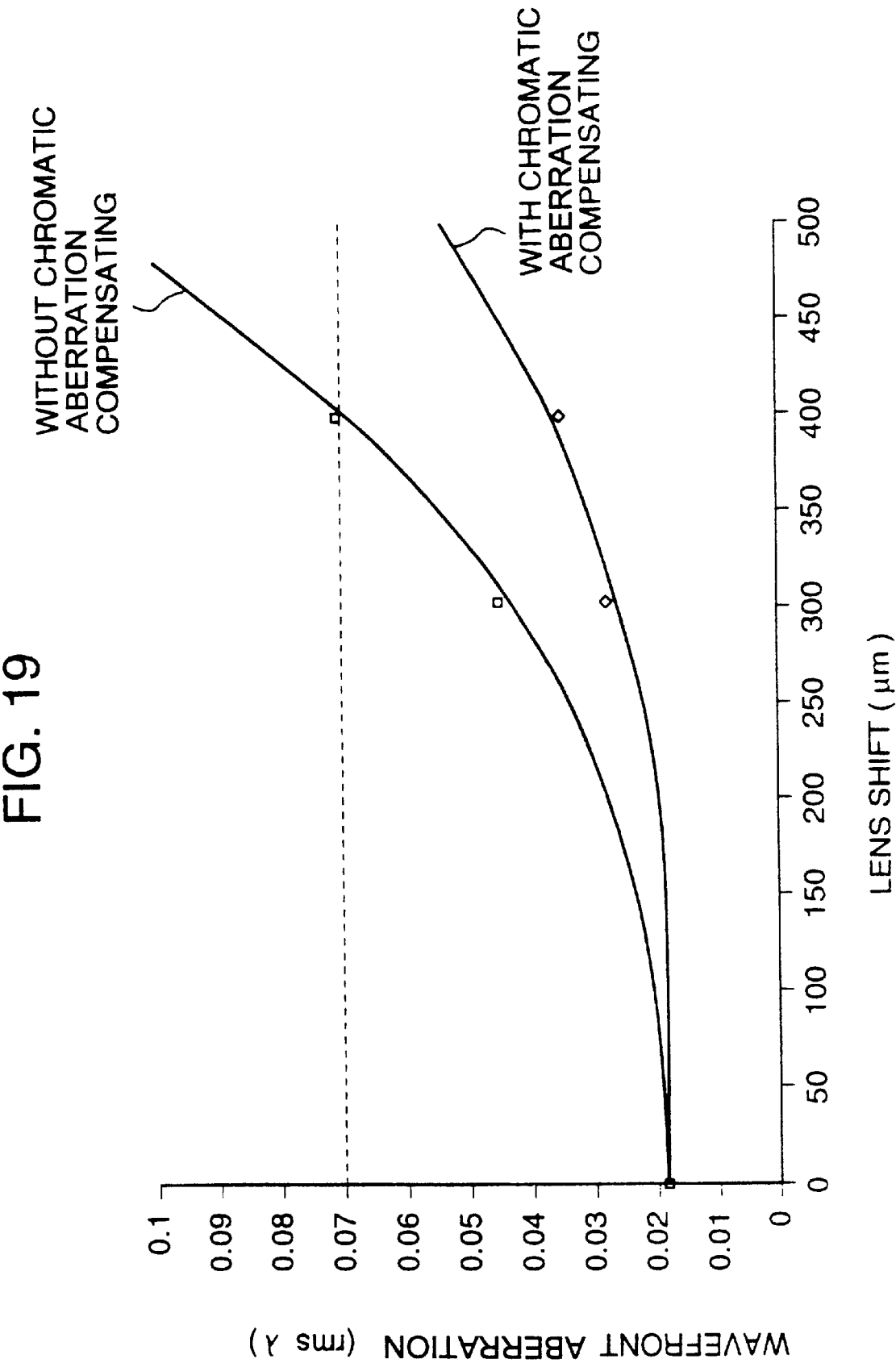
FIG. 19 is a diagram illustrating a relationship between a lens shift amount and a wavefront aberration amount depending on a presence or absence of a color aberration correcting means of the first embodiment according to the present invention.

Furthermore, referring to FIG. 19, there is shown a diagram of a relationship between a lens shift amount and a wavefront aberration amount depending on a presence or absence of a color (chromatic) aberration correction of the first embodiment according to the present invention, illustrating the wavefront aberration amount of luminous flux emitted from the light source 9 and converging on the disk 19 when the condenser 17 is shifted in the tracking direction assuming that the H value is 0.63 in a case that the color (chromatic) aberration correcting (compensating) hologram 500 is arranged between the light source 9 and the collimator lens 16 (indicated by a thick line) and in a case that it is not arranged between them (indicated by a thin line). In general, a condenser under reproduction on an optical disk has a possibility of shifting by a maximum of 500 μm in a tracking direction. To limit the wavefront aberration amount within the above tolerance in this range of the lens shift amount, as apparently shown in FIG. 19, it is required to install the color (chromatic) aberration correcting (compensating) hologram 500. The color (chromatic) aberration correcting (compensating) hologram 500 is preferably installed between the light source 9 and the optical path dividing means 15 so as not to affect the luminous flux which is emitted from the light source 2 and converges on the disk 18.

Unless the color (chromatic) aberration correcting (compensating) hologram 500 is installed, a wavefront aberration at a lens shift becomes relatively great. This is because the collimator lens 16 and the condenser 17 are designed so as to be optimum to the wavelength of the light emitted from the light source 2, and therefore a color (chromatic) aberration is generated to the luminous flux emitted from the light source 9 having a different wavelength. A color (chromatic) aberration is caused by a change of a refractive index of a glass material or the like composing the lens caused by a wavelength, which causes a change of a refraction power of the lens and a deviation of a focus position of the luminous flux transmitted through a central portion of a lens from that of the luminous flux transmitted though a peripheral portion of the lens.

Accordingly, the color (chromatic) aberration correcting (compensating) means 500 in this embodiment corrects the deviation of the focus position of the luminous flux transmitted through the central portion of the collimator lens or the condenser from that of the luminous flux transmitted through the peripheral portion of the lens, so that all the light rays transmitted through the lens converge on almost a single focus position.

In this embodiment, a correction is made for a spherical surface aberration caused by a difference of a thickness between the disks with optimizing a distance between the luminous point 9a of the light source 9 and the collimator lens 16, and a correction is made for a color (chromatic) aberration caused by a difference of a wavelength between the light sources with installing the color (chromatic) aberration correcting (compensating) means between the luminous point 9a of the light source 9 and the collimator lens 16, so that the wavefront aberrations in every luminous flux can be tolerances or lower in an optical pickup having a plurality of types of luminous flux in a single optical system, and therefore every luminous flux can be condensed on the optical disk by using a single condenser 17.

[Second Embodiment]

A second embodiment of the present invention will be described below with reference to the accompanying drawings.

Figure 7:
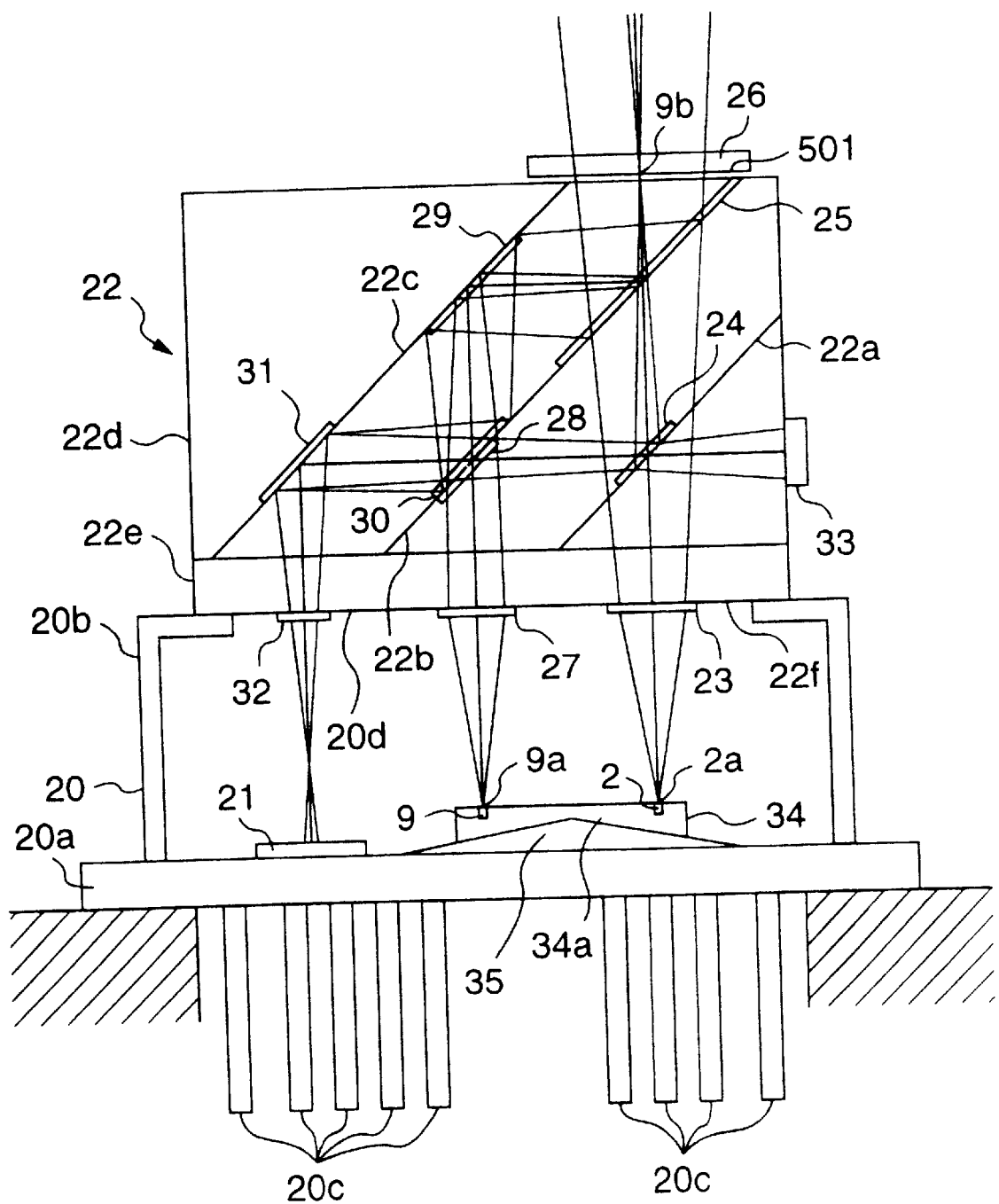
FIG. 7 is a cross section of an integrated optical head of a second embodiment according to the present invention.

Referring to FIG. 7, there is shown a cross section of an integrated optical head of a second embodiment according to the present invention.

In FIG. 7, a package 20 comprises a light source 2 for emitting light for a high-density optical disk 18 and a light source 9 for emitting light for a low-density optical disk 19, a substrate portion 20a on which a light receiving means 21 or the like are mounted to receive light reflected by a record medium, and a sidewall portion 20b arranged so as to enclose these members. The substrate portion 20a and the sidewall portion 20b and others can be formed either integrally or separately. If they are integrally formed, an assembly process can be simplified so as to increase the productivity.

Materials of the package 20 are almost the same as for the first package 1 of the first embodiment, and therefore their explanation is omitted here.

The package 20 discharges a heat generated by the light sources 2 and 9 to the outside by making the substrate portion 20a and, if necessary, the sidewall portion 20b in contact with a carriage having a great thermal capacity. Accordingly, as an area of the substrate portion 20a in contact with the carriage becomes larger, the package 20 obtains more favorable heat dissipation effects.

Still further, in the substrate portion 20a, there are provided terminals 20c for supplying power to the light sources 2 and 9 and for transmitting electric signals from the light receiving means 21 to an arithmetic circuit. These terminals 20c have almost the same configuration as for the terminals 1c described in the first embodiment, and therefore the explanation is omitted here.

There can be various combinations of the light source 2 and the light source 9 contained in the package 20, for example, 650 nm and 780 nm, 490 nm and 650 nm, or 400 nm and 650 nm. In other words, preferably a wavelength of one light source is longer and that of the other light source is shorter than it. The number of installed light sources can be either two or three.

In an opening 20d of the package 20, an optical member 22 is bonded by a bonding medium such as bonding glass or bonding resin.

As shown in the drawing, it is preferable to enclose the inside space surrounded by the package 20 and the optical member 22, in other words, the space in which the light sources 2 and 9 and the light receiving means 21 are arranged. With this configuration, it becomes possible to prevent impurity such as dust or moisture from being included into the inside of the package, whereby the performances of the light sources 2 and 9 and the light receiving means 21 can be maintained and it also prevents a degradation of the optical characteristics of the emitted light. Further, it is more preferable to previously enclose N2 gas or inactive gas such as a dry air or Ar gas in the space enclosed by the package 20 and the optical member 22 since it prevents a deterioration of optical characteristics caused by sweating on the surface of the optical member 22 or the like facing the inside of the package 20 and a degradation of the characteristics caused by oxidation of the light sources 2 and 9 or the light receiving means 21.

In addition, in comparison with a case in which the light source 2 is contained in a different package from that of the light source 9, they can have the same environment inside the package, so as to achieve the same operating conditions for the light source 2 and the light source 9. Accordingly, it is effective to prevent an occurrence of disadvantages such as a difference of a life between the light source 2 and the light source 9 caused by a difference of the operating conditions between them, whereby the reliability of the optical pickup can be enhanced.

The optical member 22 is used to guide the light emitted from the light source 2 and the light source 9 to a given optical path and to guide the returning light reflected by the high-density optical disk 18 or the low-density optical disk to the light receiving means 21.

The optical member 22 comprises a first substrate 22d including a first inclined plane 22a, a second inclined plane 22b, and a third inclined plane 22c and a second substrate 22e bonded to an end surface of the first substrate 22d in the side of the light source.

The optical member 22 is preferably formed in a shape of a parallel planar plate as a whole since it is effective to prevent an occurrence of aberration, whereby favorable reproduction signals or focus tracking signals can be formed. Furthermore, preferably the optical member 22 is mounted so that its top and bottom are precisely perpendicular to the optical axis of the transmitted light since it is effective to prevent an occurrence of the non-point aberration (astigmatism) and a degradation of reproduction signals caused by an unfocused spot.

As for materials of the optical member 22, it is preferable to use materials having a high light transmission such as glass or resin since it is effective to prevent a decrease of the quantity of light and a degradation of the optical characteristics of the light transmitted through the optical member 22. Particularly, glass is preferable as a material of the optical member 22 since it does not cause a birefringence and therefore the characteristics of the transmitted light can be favorably maintained. Furthermore, it is more preferable to use optical glass having a low wavelength dispersion, in other words, a high Abbe's number such as a BK-7 since it is effective to prevent an occurrence of an aberration of a spherical surface caused by a fluctuation of a wavelength.

At this point, the optical member 22 has a configuration in which there are respective normal vectors at almost the same angle of inclination as for the first inclined plane 22a, the second inclined plane 22b, and the third inclined plane 22c in almost the same direction. With the first inclined plane 22a, the second inclined plane 22b, and the third inclined plane 22c formed in this manner, a predetermined optical length can be achieved while decreasing the length of the first substrate 22d and therefore that of the optical member 22 in its height direction, whereby the size of the optical pickup can be reduced while the given optical characteristics are maintained. Particularly, the center of gravity of the optical head is placed in a position near an area in which the package 20 is installed when the package 20 comprising the optical member 22 is installed into a carriage, and therefore a high accuracy of installation can be achieved and a deviation of a position at bonding can be prevented at a high percentage.

In addition, various optical elements can be arranged in the positions where light is reflected on respective planes, and therefore predetermined optical characteristics can be given to the light incident on the optical member 22 when it is transmitted.

Particularly when the light from a plurality of light sources is guided to an identical optical path as described in this embodiment, preferably at least three planes are formed with being inclined in the same direction in the optical member 22, so that the light from at least one light source is reflected twice or more, whereby it becomes possible to optimize the optical characteristics of the light emitted from the light source 2 or the light source 9 before the light is transmitted from the optical member 22 by passing the light through various optical members formed on respective inclined planes.

With this configuration, a long distance can be secured from the light source 2 or the light source 9 to an emission surface of the optical member 22 and therefore to the contrary a distance between the optical member 22 and the record medium can be decreased, so that the size of the optical pickup can be reduced. In addition, it becomes possible to give optical characteristics required for irradiating the record medium in the optical member 22, and therefore it is unnecessary to arrange specially various optical members in the optical path of the light which has been emitted from the optical member 22, whereby the number of the components or an assembly cost can be reduced.

Additionally, with the first inclined plane 22a, the second inclined plane 22b, and the third inclined plane 22c having the same angle of inclination, the optical member 22 can be easily manufactured at a high precision by bonding a plurality of parallel plane plates with being combined on which given optical elements are previously formed and cutting off at a given angle, and therefore the productivity of the optical member 22 is significantly increased. Furthermore, due to the predetermined angle, an optical axis can be easily adjusted so as to reduce the time and processes required for axis adjustment.

The angle of inclination on the first inclined plane 22a, the second inclined plane 22b, and the third inclined plane 22c to incident light is preferably within the range of 30 deg to 60 deg, further preferably approximately 45 deg. The first inclined plane 22a, the second inclined plane 22b, and the third inclined plane 22c are preferably spaced apart from each other by a given distance from a viewpoint of the optical elements formed on respective inclined planes. Unless the optical elements are spaced apart from each other by a given distance, it increases a possibility of causing a disadvantage that a small quantity of light transmitted without being reflected comes into the optical path of emitted luminous flux and becomes a component of a stray light.

Assuming that L is the given distance, if the angle of inclination of the inclined planes is smaller than 30 deg, the optical member 22 is made thicker at least by a difference of the incident light position $2L/\sqrt{(3)}$ which is generated until the light is reflected on the first inclined plane 22a and is incident on the second inclined plane 22b or until it is reflected on the second inclined plane 22b and is incident on the third inclined plane 22c, and further if the angle is greater than 30 deg, a difference of an incident light position generated for securing the same distance L, and therefore, a volume of the first optical member 5 is increased by that amount, which makes it hard to reduce the size of the optical pickup.

If the angle of inclination of the inclined planes is greater than 60 deg, the volume of the optical member 22 is increased as described above, too. Therefore, downsizing of the optical pickup becomes harder.

Particularly if the angle of inclination is approximately 45 deg, it is possible to decrease a difference of the incident light position almost to zero in the light which is reflected on the first inclined plane 22a and is incident on the second inclined plane 22b and the light which is reflected on the second inclined plane 22b and is incident on the third inclined plane 22c, whereby the optical member 22 can be downsized most efficiently, and therefore favorably the size of the optical pickup can be efficiently reduced, too.

Next, various optical elements in the optical member 22 will be explained.

A diffusion angle converting (light beam diameter changing rate along beam axis adjusting) means 23, which is arranged so as to match the optical axis of the light emitted from the light source 2 on an end surface 22f of the second substrate 22e in the side of the light source, is used to decrease a diffusion (light beam diameter changing) angle of the light incident from the light source 2, in other words, to convert the optical path of the light emitted from the luminous point 2a of the light source 2 as if it were emitted from a position farther than a visual position, and it shifts the luminous point in a virtually opposite direction from the record medium so as to elongate the optical path from the light source to the record medium. The diffusion angle converting means 23 is preferably made of a diffraction grating, particularly a hologram since it can transmit light very efficiently. Particularly as a hologram, it is preferable to use one having a cross section in a shape of a staircase of four or more steps or having a serrated cross section, since the light can be used very efficiently and the quantity of light can be prevented from being decreased.

A filter 24, which has a wavelength selectivity, transmits the light guided from the light source 2 almost completely and reflects the light guided from the light source 9.

With the filter 24 formed on the first inclined plane 22a, the light guided from the light source 9 can be reflected without interrupting the light emitted from the light source 2 almost at all, and therefore the light emitted from the light source 2 and the light source 9 can be guided to the record medium at a high percentage. Accordingly, data can be recorded into or reproduced from the record medium without increasing the quantity of light emitted from the light source 2 and the light source 9, and therefore it is possible to prevent the lives of the light source 2 and the light source 9 from being reduced by an operation of the light source 2 or the light source 9 at a high power output. Furthermore, since the light source 2 and the light source 9 can be used at a low power output, an increase of a temperature of the light source 2 and the light source 9 can be restrained, and therefore the oscillation wavelength cannot easily shift at a temperature change. Accordingly, it is possible to provide a high-performance optical pickup which is capable of forming a focus more precisely.

In this embodiment, the filter 24 is also used as a diaphragm for the light from the light source 9. Although the light from both of the light source 2 and the light source 9 is allowed to be incident on a single condenser 17, an incident pupil of the condenser 17 is adjusted so as to focus on a record area of the high-density optical disk 18. Accordingly, in this embodiment, the shape and the material of the condenser 17 are adjusted so that the light from the light source 2 is condensed on the record area of the high-density optical disk 18.

To cause the light from the light source 9 to focus on a record area of the low-density optical disk 19 with this condenser 17, in this embodiment, the condenser is adjusted so that a diameter of the light emitted from the light source 9 and incident on the condenser 17 is smaller than that of the light from the light source 2. Generally, a lens has a stronger condensing application in a peripheral portion than in a central portion. Therefore, if expanded light is incident, the focus is formed in a nearer position; if light which is not expanded so much is incident, the focus is formed in a farther position. In this embodiment, the record area of the low-density optical disk 19 is arranged in a farther position than that of the high-density optical disk 18, and therefore by optimizing an incidence aperture of the light from the light source 9 to the condenser 17, the light from the light source 9 can be condensed on the record area of the low-density optical disk 19 by using the condenser 17 which is designed with being tailored to the light from the light source 2.

The incidence aperture is adjusted by the filter 24. In other words, the size of the filter 24 is adjusted so that the light reflected by the filter 24 has a given diameter on the condenser 17.

With the filter 24 having this diaphragm function, a diameter of the light emitted from the light source 9 can be precisely adjusted, and therefore a diameter of the light incident on the condenser 17 can be set to a given size, whereby the light from the light source 9 can be condensed on the record area of the low-density optical disk 19 by the condenser 17. Additionally, in comparison with a case in which the diaphragm is arranged separately, the number of the components can be decreased and further it is possible to omit the time and process for adjusting a distance between the positions of the diaphragm and the light source 9, and therefore the productivity of the optical pickup can be increased.

Furthermore, with the diaphragm arranged in this position, light which is not reflected by the filter 24 though it has been emitted from the light source 9 is directly transmitted through the first inclined plane 22a and then discharged to the outside of the optical member 22, and therefore it is possible to prevent the light from becoming stray light in the package 20 even if it is not reflected.

In addition, the filter 24 is arranged in a position where forward light toward the low-density optical disk 19 is incident though backward light reflected by the low-density optical disk 19 is not incident. With the filter 24 having the diaphragm function with being arranged in this position, for example, even if an optical axis of backward light is deviated from a predetermined position by a shift of the condenser 17, the light does not pass through the diaphragm and therefore it is possible to prevent the light originally to be incident on the light receiving means from being interrupted, which decreases the quantity of light incident on the light receiving means, and to prevent an unbalanced distribution of the quantity of light from being generated. Accordingly, more precise RF signals can be favorably obtained and focusing or tracking servo signals can also be formed more accurately.

Furthermore, the filter 24 has a favorable configuration, since it affects the light from the light source 9 though it does not affect the light from the light source 2 and therefore the diaphragm for the light from the light source 9 does not interrupt the light from the light source 2 nor does it have a bad influence upon the light from the light source 2, whereby, particularly in an optical pickup having a configuration in which a plurality of light sources are contained in a single package and light from a plurality of light sources is condensed in a given position by a single condenser, the light from a plurality of light sources can be incident at a given diameter on the condenser without a bad influence on each light.

A polarizing separation (polarization beam splitter) film 25 transmits light in a specific polarization direction and reflects light in other polarization directions. In this embodiment, the polarizing separation film 25 has a configuration so that it transmits S polarization components emitted from the light sources 2 and 9 and reflects P polarization components. With this polarizing separation film 25, transmitted light can be guided to the record medium without the quantity of the transmitted light being decreased almost at all, whereby favorably it is possible to improve the efficiency of utilizing light, which leads to achieving longer lives of light sources 2 and 9.

A color (chromatic) aberration correcting (compensating) means 501 has almost the same functions as for the color (chromatic) aberration correcting (compensating) means 500 in the first embodiment. In this embodiment, the color (chromatic) aberration correcting (compensating) means 501 is placed at an end surface of the first substrate 22d in the opposite side from the light sources so as to match the light axis of the light emitted from the light source, particularly having a function of correcting (compensating) a color (chromatic) aberration which may occur in a luminous flux which is emitted from the light source 9 and converges on a disk 19.

A quarter-wave(length) plate 26 has functions of converting incident light from a linear polarization to an elliptic polarization and of converting an elliptic polarization reflected by the record medium with its rotating direction being inverted to a linear polarization which crosses at right angles to the polarization direction of the above incidence.

A diffusion angle converting (light beam diameter changing rate along beam axis adjusting) means 27, which is arranged so as to match the optical axis of the light emitted from the light source 9 on an end surface 22f of the second substrate 22e in the side of the light source, is used to make negative a diffusion (light beam diameter changing) angle of the light incident from the light source 9, in other words, to convert the optical path of the light emitted from the luminous point 9a of the light source 9 as if it were emitted from a position nearer than a visual position, and it shifts the luminous point in a virtually approaching direction to the record medium. It apparently shifts the luminous point of the light source 9 from the luminous point 9a to the luminous point 9e, and therefore shortens the optical path from the light source 9 to the record medium. The diffusion angle converting means 27 is preferably made of a diffraction grating, particularly a hologram since it can transmit light very efficiently. Particularly as a hologram, it is preferable to use one having a cross section in a shape of a staircase of four or more steps or having a serrated cross section, since the light can be used very efficiently and the quantity of light can be prevented from being decreased.

A means for forming a plurality of beams 28 is used to reflect incident light with separating it to a plurality of types of luminous flux, and in this embodiment, it separates light passing through the diffusion angle converting means 27 into three types of luminous flux and reflects them toward the filter 24. The means for forming a plurality of beams 28 is preferably formed by a diffraction grating since a plurality of types of luminous flux can be formed efficiently. In this embodiment, it has a configuration in which three types of luminous flux, zero-dimensional light and plus or minus one-dimensional light, generated in the diffraction grating are mainly formed. An area in a given position of a track of the low-density optical disk 19 is irradiated with a plurality of types of luminous flux formed here, and then the quantities of returning light are compared with each other, so as to be subjected to a tracking method commonly called a three-beam method for tracking on the low-density optical disk 19. Therefore, unless the three-beam method is not used as a tracking method, it is preferable to arrange a reflection means simply or an optical device for generating light needed for the tracking method.

Reflection means 29 and 30 are used to reflect light which has been reflected by the polarizing separation film 25 and light which has been reflected by the reflection means 29 in given directions, respectively, and they are preferably made of a metal material having high reflectance such as Ag, Au, and Cu or of a plurality of dielectric materials having various refractive indices.

A diffusion angle converting (light beam diameter changing rate along beam axis adjusting) means 31, which is formed on the third inclined plane 22c of the first substrate 22d, changes a diffusion (light beam diameter changing) angle of light in the luminous flux reflected by the reflection means 30, in other words, light reflected by the low-density optical disk 19 from a diffusion direction to a convergence direction and reflects directly light in a convergence direction, in other words, the luminous flux reflected by the high-density optical disk 18.

The diffusion angle converting means 31 is preferably made of a diffraction grating, particularly a reflection-type hologram since it can transmit light very efficiently. Particularly as the reflection-type hologram, it is preferable to use one having a cross section in a shape of a staircase of four or more steps or having a serrated cross section since the light can be used very efficiently and the quantity of light can be prevented from being decreased.

In this embodiment, the reflection-type hologram 31 is formed to reflect most of the luminous flux composed of light emitted from the light source 2 as zero-dimensional light and to diffract most of the luminous flux composed of light emitted from the light source 9 to plus one-dimensional light. With this configuration, it is possible to avoid a problem that it is hard to detect RF signals or to form focusing or tracking signals due to a divergence of the luminous flux from the light source 9 on the light receiving means 21 caused by a forward (from the record medium) shift of the luminous point of the light emitted from the light source 9, and therefore a high-performance optical pickup can be actualized so as to form precise signals reliably.

A signal formation means 32, which is placed on an end surface of the second substrate 22e in the side of the light sources, has a configuration so as to guide the light guided from the diffusion angle converting means 31 into a predetermined position of the light receiving means 21 and to give predetermined characteristics to the incident luminous flux to form focusing or tracking signals.

A light receiving means 33, which is placed on a side of the first substrate 22d at almost the same height as for the filter 24 or the means for forming a plurality of beams 28, controls outputs of the light source 2 and the light source 9 by receiving reflected light without passing through the filter 24 in the light emitted from the light source 2 and transmitted light without being reflected by the filter 24 in the light emitted from the light source 9 and then returning the signals as feedback to power supply control circuits of the light source 2 and the light source 9.

With this configuration to guide both of a part of forward emitted light emitted from the light source 2 and then guided to the record medium and a part of forward emitted light emitted from the light source 9 and then guided to the record medium to the light receiving means 33, the same light receiving means 33 is used for monitoring in both of operations of the high-density optical disk 18 and the low-density optical disk 19. In other words, only one light receiving means is needed for monitoring, and therefore the number of components can be reduced.

In addition, with the light receiving means 33 integrated with an optical head containing the plurality of light sources 2 and 9 and the light receiving means 21, a space for an arrangement of the light receiving means 33 can be omitted from the optical pickup, so as to downsize the optical pickup. Furthermore, the light receiving means 33 can be positioned to the light sources 2 and 9 easily and very precisely, and therefore productivity of the optical pickup can be increased and a quantity of output light from the light sources can be controlled accurately.

Furthermore, only by installing the optical head for which positioning is completed among respective members into the carriage with adjustments of flyer and rotation directions, a positioning process at an optical pickup assembly can be largely simplified, and therefore productivity of the optical pickup can be significantly increased.

Next, an explanation will be made for why the optical member 22 is formed by two components, the first substrate 22d and the second substrate 22e. The first substrate 22d has a plurality of inclined planes, on which various optical elements are arranged in parallel positions. Accordingly, various optical elements on the first substrate are arranged being inclined to the optical axis of the incident light. Therefore, if an optical element having a high dependence on angles such as a hologram is formed on the first substrate 22d, a tolerance by angles is increased unless positioning is performed at an extremely high precision, which leads to a very high possibility of degrading characteristics of light toward the record medium. It also leads to degrading signal characteristics, which unfavorably results in a cause of decreasing the performance of the optical pickup device. Accordingly, in this embodiment, the diffusion angle converting means 23 and 27 which seem to be highly dependent of angles are formed on the second substrate 22e which is formed separately from the first substrate 22d, so that the diffusion angle converting means 23 and 27 are placed almost perpendicularly to the optical axis of the light emitted from the light source 2 and the light source 9, respectively.

With this arrangement, it is possible to prevent the characteristics of light guided to the record medium from being degraded almost completely, so as to provide a high-performance optical pickup device with less degradation of signal characteristics favorably.

Various optical elements arranged on the second substrate 22e are preferably formed only on one side of the second substrate 22e.

This is because these optical elements are formed in a physical or chemical method such as etching via a mask in a given shape, and therefore a single-side formation is effective to reduce the number of masks and the number of etching times, whereby the number of processes can be decreased, too. In addition, it does not need to turn back a master of the substrate 22e, and therefore it is possible to omit a plurality of times of positioning. Therefore, productivity can be greatly increased and a manufacturing cost be reduced.

In this embodiment, the diffusion angle converting means 23 and 27 and the signal formation means 32 are formed on the end surface 22f of the second substrate 22e in the side of the light sources.

Further in this embodiment, the light sources 2 and 9 are placed so as to be opposite to the second substrate 22e. In other words, in this configuration, the light emitted from the light sources 2 and 9 is incident on the surface 22f of the second substrate 22e and converted to luminous flux having given characteristics by various optical elements formed on the optical member 22 so as to be guided to the record medium.

With this configuration, the light sources 2 and 9 can be positioned with the surface 22f of the second substrate 22e in the side of the light sources being considered as a reference area. In other words, the plurality of light sources can be positioned with a single reference area, whereby the light sources 2 and 9 can be positioned to various optical elements formed on the optical member 22 more precisely, and therefore it becomes possible to prevent a degradation of optical characteristics caused by a deviation of the positions of the light sources 2 and 9 to various optical elements on the optical member 22. In addition, the positioning between the light source 2 and the light source 9 can be easily performed due to the single reference area.

Accordingly, there is almost no deviation of positions between light sources or between a light source and an optical element, so as to achieve a very reliable optical pickup having favorable optical characteristics.

In this embodiment, a distance between the surface 22f opposite to the light sources of the second substrate 22e and the light source 2 is equal to that between the surface 22f and the light source 9. With the light sources 2 and 9 arranged in this relationship, the light sources 2 and 9 can be fixed to, for example, an identical parallel plane member with being put on it, and therefore the height precision of the light sources 2 and 9 can be easily secured. Accordingly, it is possible to prevent a degradation of optical characteristics caused by relatively lower height precision, so as to achieve an optical pickup having favorable record or reproduction characteristics.

Further in this embodiment, the light source mounting portion 34 has a rectangular parallelepiped or plate shape with the light sources 2 and 9 mounted on its top or side. The light source mounting potion 34, which is put on the substrate portion 20a or the sidewall portion 20b as a separate member or a part of the substrate portion 20a or the sidewall portion 20b, dissipates the heat generated by the light sources 2 and 9 in addition to holding the light sources 2 and 9.

With this configuration in which the plurality of the light sources are mounted on the same light source mounting portion, the light sources 2 and 9 can be previously fixed in a predetermined relationship of positions to the light source mounting portion 34, and therefore in assembling the optical head, positioning between the optical member 22 and the light sources 2 and 9 can be performed easily and precisely, so as to increase productivity of the optical head. In addition, this limits an occurrence of a deviation of the positions between the light sources 2 and 9 and the optical member 22, so as to achieve an optical pickup having superior optical characteristics.

Furthermore, with the light sources 2 and 9 arranged on the same surface of the light source mounting portion 34, the light sources 2 and 9 can be installed on the light source mounting portion 34 more easily, and in comparison with a configuration in which they are arranged on different surfaces, the light sources 2 and 9 can be easily connected to electrodes for supplying power to them or ground with wiring. In addition, relative positioning between the light sources 2 and 9 can also be performed easily and precisely.

Still further, although areas in the light source mounting portion on which the light sources are mounted must be chamfered at an extremely high precision, only one area is to be chamfered by arranging the plurality of the light sources on the same area, whereby the manufacturing processes can be reduced and therefore the productivity can be increased in addition to a decrease of a production cost.

Materials of the light source mounting portion 34 are almost the same as for the light source mounting portions 150 and 152 in the first embodiment, and the explanation is omitted here.

Figure 8:
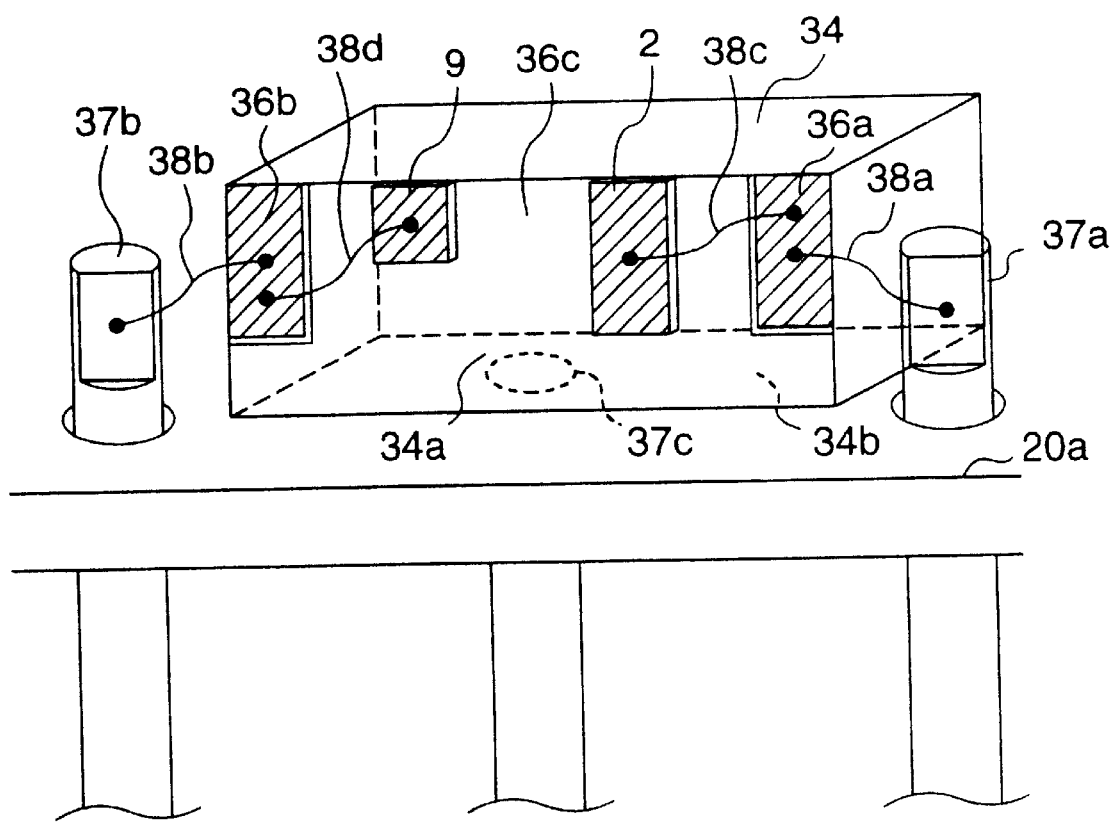
FIG. 8 is an enlarged view of a neighborhood of light sources of the second embodiment according to the present invention.

Next, an explanation will be made for a method of supplying power to the light sources 2 and 9 with reference to the accompanying drawings. Referring to FIG. 8, there is shown an enlarged view of a neighborhood of light sources of the second embodiment according to the present invention. The light sources 2 and 9 are arranged almost in parallel on an end surface 34a of the light source mounting portion 34 and electrodes 36a, 36b, and 36c are also placed on it. The electrode 36a is used for supplying power to the light source 2, the electrode 36b is for supplying power to the light source 9, and the electrode 36c is used as a ground of the light sources 2 and 9.

A single terminal 37a out of the plurality of terminals 20c on the package 20 is used to supply power to the light source 2, another terminal 37b out of remaining terminals 20c is used to supply power to the light source 9, and still another terminal 37c out of further remaining terminals 20c is used as a ground.

The terminal 37a and the electrode 36a are electrically connected with each other via a connecting member 38a such as wire bonding, and further the electrode 36a is electrically connected to the top of the light source 2 via a connecting member 38c such as wire bonding in the same manner. Additionally, the terminal 37b and the electrode 36b are electrically connected with each other via a connecting member 38b such as wire bonding, and further the electrode 36b is electrically connected to the top of the light source 9 via a connecting member 38d such as wire bonding in the same manner. Further, the electrode 36c is formed from the end surface 34a of the light source mounting portion 34 to the bottom 34b facing the substrate portion 20a, so as to have a configuration in which the electrode 36c is electrically connected to the terminal 37c automatically by bonding the substrate portion 20a to the light source mounting portion 34 by means of solder or a bonding material having conductivity such as conductive resin.

With the electrodes 36a and 36b, which are power supply points to the light sources 2 and 9, placed on the same plane in this manner, the connection between the electrode 36a and the terminal 37a can be performed simultaneously with the connection between the electrode 36b and the terminal 37b without rotating the light source mounting portion 34, and therefore workability and productivity can be improved in connecting processes. In addition, with forming a plane almost in parallel with an end surface on which electrodes 36a and 36b are placed at the points to which the terminals 37a and 37b are connected and bonding this plane to the electrodes, respectively, angles of the bonded plane need not be adjusted so as to improve workability at bonding as well as reliability at bonding. If these planes are formed in almost the same plane, a moving distance of the bonding device can be minimized at the bonding so as to further improve an efficiency of the work.

Preferably the light sources 2 and 9 are also formed on the same plane as for the electrodes 36a and 36b, whereby the connection between the electrodes and the light sources can be performed more easily, and therefore assembling workability of the optical pickup can be further improved.

The electrodes 36a and 36b are preferably formed on end portions of the end surface 34a of the light source mounting portion 34, respectively. This configuration makes it possible to minimize both of the distances of the connections between the terminal 37a and the electrode 36a and between the terminal 37b and the electrode 36b, and therefore it is possible to prevent an occurrence of disadvantages such as a short-circuit caused by connecting members 38a and 38b brought in contact with other members having conductivity, a broken connecting member which is too long, or an electrode or a terminal coming off a bonded site.

Figure 9:
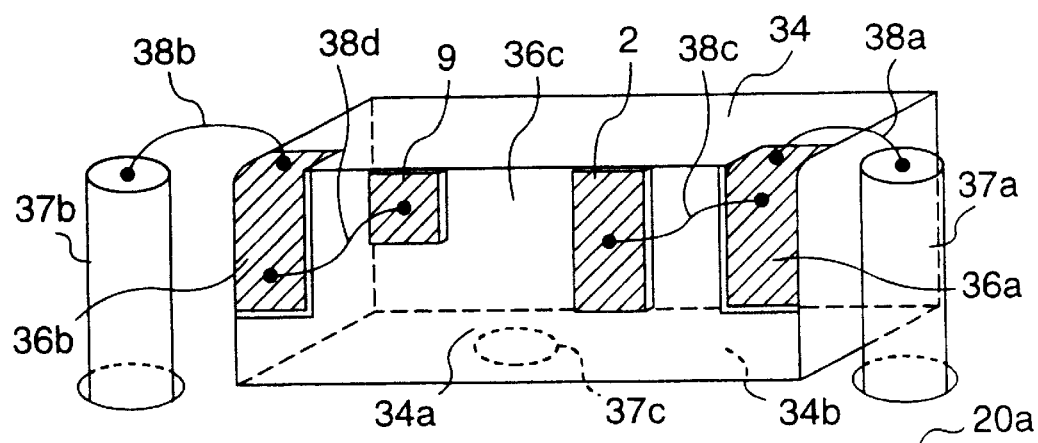
FIG. 9 is an enlarged view of a neighborhood of the light sources of the second embodiment according to the present invention.

Although the electrodes 36a and 36b and the light sources 2 and 9 are arranged on the same plane in this embodiment, the electrodes may be formed on two planes. For example, as shown in FIG. 9, the electrodes are formed on two planes, the top 34c of the light source mounting portion 34 and the end surface 34a thereof, a part on the top of the terminal 37a is connected with a part on the top 34c of the electrode 36a via the connecting member 38a, and a part on the top of the terminal 37b is connected with a part on the top 34c of the electrode 36b via the connecting member 38a. This configuration makes it possible to decrease the number of the connection points existing on the same plane, which prevents disadvantages almost completely such as damaging the connecting member 38c by mistake when installing the connecting member 38a, and therefore a yield of the optical pickup can be improved. The angular portions of the light source mounting portion on which the electrodes are mounted over the two planes are preferably rounded at a predetermined radius (R), since it prevents the electrodes from being damaged by the angular portions so as to maintain a reliable electric contact of the electrodes formed on the respective planes. In the same manner, it is preferable to round the angular portions of the end surface 34a on which the electrode 36c is formed and the bottom 34b.

Next, for a backward emitting light of the light sources 2 and 9, a reflection, a light absorption, or a scattering member is arranged in the same manner as for the light sources 2 and 9 in the first embodiment. Either one reflection member can be installed in each of the light source 2 and the light source 9, or totally one reflection member can be installed for a plurality of light sources.

Figure 10:
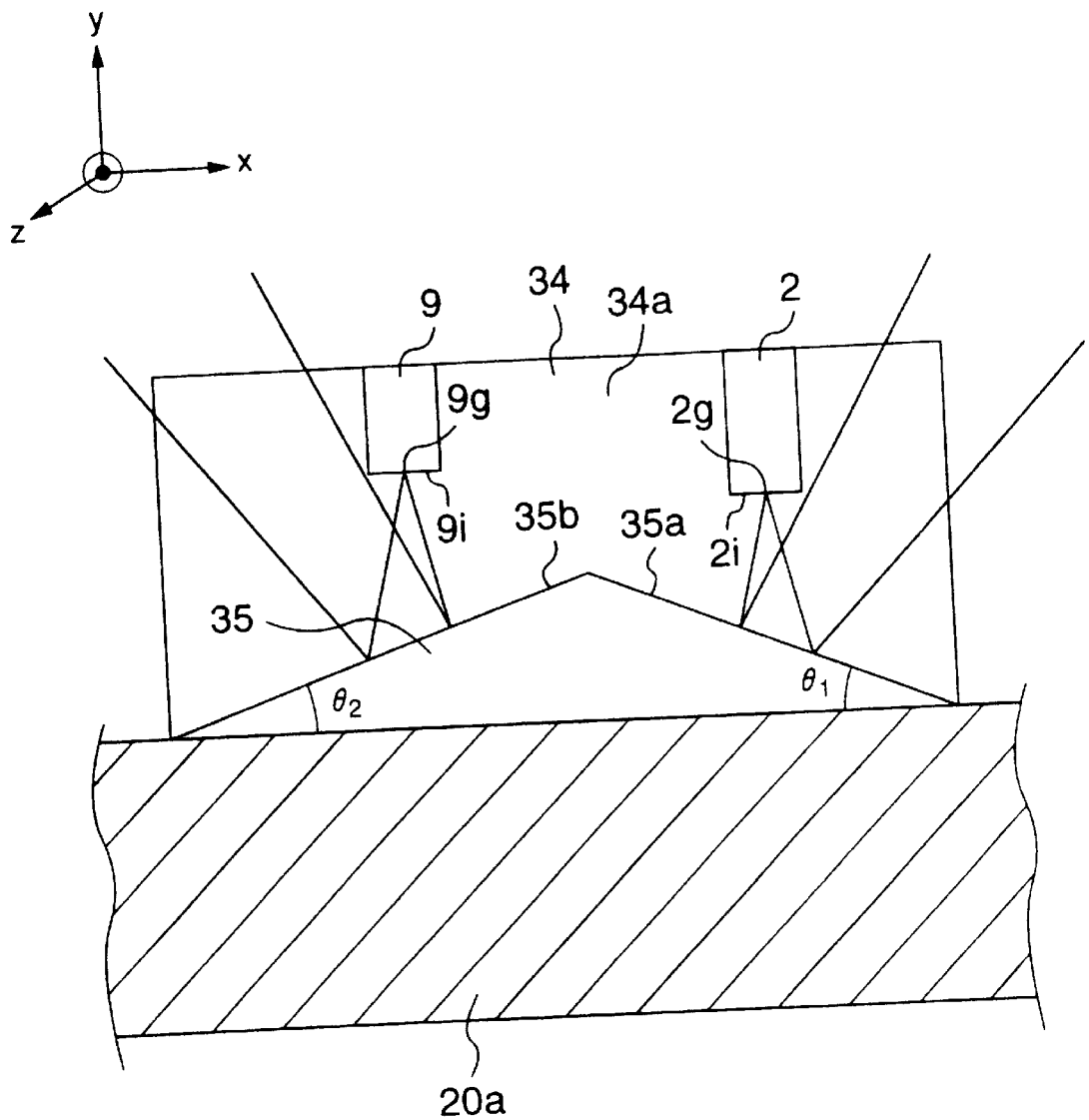
FIG. 10 is an enlarged view of a neighborhood of the light sources of the second embodiment according to the present invention.

Referring to FIG. 10, there is shown an enlarged view of a neighborhood of the light sources of the second embodiment according to the present invention.

A reflection member 35 is mounted on the substrate 20a of the package 20; a plane 35a opposite to the end surface 2i on which the luminous point 2g of the light source 2 is present is arranged being inclined toward the side of the light source 2, and a plane 35b opposite to an end surface 9i on which the luminous point 9g of the light source 9 is present is arranged being inclined toward the side of the light source 9.

As a material of the reflection member 35, it is preferable to use a metallic material having a high reflectance or to form the reflection member 35 with a low-cost material having a low reflectance before forming a metallic or dielectric film having a high reflectance over the planes 35a and 35b or only on a portion on which light is incident.

The angles of inclination of the planes 35a and 35b of the reflection member 35 are preferably set according to the diffusion angles of the light emitted from the light source 2 and the light source 9. In other words, for example, if a degree of the diffusion angle of the light emitted from the light source 2 is greater than that of the diffusion angle of the light emitted from the light source 9, an angle of inclination (1 of the plane 35a which is greater than an angle of inclination (2 of the plane 35b makes it possible to prevent not only light from the light source 9 having a low diffusion angle but also light from the light source 2 having a high diffusion from being included into a predetermined optical path of the optical member 22 or the light receiving elements, whereby an occurrence of stray light can be significantly limited, so as to achieve an optical pickup having favorable signal characteristics.

Both of the angle of inclination of the plane 35a and the angle of inclination of the plane 35b set to ⊖2 makes it possible to limit the number of the settings of the inclined planes to a single time to form both planes in a manufacturing process of the reflection member 35 while restraining an occurrence of stray light significantly, and therefore it is possible to improve the productivity and to reduce the cost due to the simplified manufacturing process.

Furthermore, the angles of inclination are preferably set, taking into consideration also distances between the light source 2 and the reflective surface 35a and between the light source 9 and the reflective surface 35b.

Although the planes 35a and 35b of the reflection member 35 are inclined in an xy direction in FIG. 10 in this embodiment, they may be inclined in a yz direction toward the opposite direction of the light source mounting portion 34.

With this configuration, the inclined planes can be arranged on a single surface of the reflection member 35, so as to increase the productivity of the reflection member 35.

Although the planes 35a and 35b of the reflection member 35 are formed so as to have high reflectance, a high extinction modulus may be applied instead of the high reflectance in the same manner as for the first embodiment.

Further, it is most preferable to have a configuration in which the light reflected by the planes 35a and 35b is discharged to the outside of the package 20 from an opening other than the opening 20d on the sidewall portion 20b of the package 20. This configuration makes it possible to discharge the backward emitting light from the light sources 2 and 9 to the outside of the package 20 almost completely, so as to significantly decrease the possibility of an occurrence of stray light caused by the backward emitting light. In this embodiment, the opening is preferably covered by a transparent member such as glass or resin, since it is effective to prevent a degradation caused by the light sources or the light receiving elements in contact with an air or moisture.

Although the backward emitting light from the light source 2 or 9 is reflected or absorbed by the reflection member 35 in this embodiment, there may be used a configuration in which, instead of the reflection member 35, cutouts are arranged so as to have predetermined angles of inclination to the end surfaces 2i and 9i of the light sources 2 and 9 in portions opposite to the light sources 2 and 9 of the substrate portion 20a so that the light from the light sources 2 and 9 is reflected or absorbed by a reflective or light absorbent surface placed in the cutout portions. With this configuration, the reflective or light absorbent surface can be arranged in the substrate portion 20a, and therefore the reflection member 35 can be omitted so as to decrease the number of the components and to simplify assembling processes of the optical pickup.

Further, with the light absorbent surface arranged on the surface of the substrate portion 20a which is opposite to the light sources without cutouts on the substrate portion 20a, backward emitting light from the light sources 2 and 9 can be absorbed, whereby stray light can be restrained. In this configuration, both of the reflection member 35 and the cutouts of the substrate portion 20a need not be arranged, and therefore the manufacturing process of the substrate portion 20a can be simplified and the number of the components be decreased, which leads to increasing the productivity of the optical pickup and to lowering the cost easily.

As set forth hereinabove, with the configuration in which light from the plurality of the light sources contained in an identical package is caused to be incident on the optical member having the plurality of the optical elements so as to be guided to almost the same optical path, the optical elements or other components can be condensed to a single unit though they are conventionally arranged for each light source, and therefore the entire optical pickup can be significantly downsized in comparison with the optical pickup whose respective light sources are arranged separately and the positioning between respective optical members and respective light sources is unnecessary, whereby the productivity is greatly increased and further installation errors between the respective optical elements can be decreased to the minimum, and therefore favorable optical characteristics can be achieved and a loss of light caused by installation errors between respective optical elements can be minimized, by which an optical pickup having a favorable efficiency of utilizing light can be obtained. Furthermore, it does not need to form a plurality of optical systems corresponding to a plurality of the light sources, respectively, by using an optical member, whereby it is possible to increase the productivity due to a decrease of the number of the components and to simplify the positioning of the components.

With the configuration in which light from two light sources is guided to an identical path in the optical member 22 bonded to the package 20, it requires less members for a unification into a single optical path in comparison with a configuration in which they are unified outside the optical head, and therefore the number of the components can be decreased and the processes required for positioning between the light sources and these members be omitted, so as to achieve an optical pickup having a favorable productivity. Furthermore, due to a single optical axis of the light emitted from the optical member 20, it is possible to suppress a decrease of the quantity of light on the light emitting surface of the optical member 20 and to reduce portions in the light emitting surface which requires surface grinding to prevent an occurrence of an aberration in comparison with the configuration in which there are a plurality of axes of emitted light, whereby the grinding processes can be simplified and a manufacturing time be reduced according to it.

Furthermore, with at least one of the light emitted from the light source 2 and the light emitted from the light source 9 being reflected by the optical member 22 a plurality of times so as to be guided to a predetermined optical path, the optical member 22 can be downsized and a length of the optical path from the optical member 22 can be decreased in comparison with a configuration in which the light is guided without reflection, and therefore it is possible to actualize a smaller and thinner optical pickup. As described in this embodiment, in the configuration in which the light from the light source 2 is emitted almost in parallel with the light from the light source 9, an optimization of an arrangement position in the optical member 20 and the number of reflection times makes the most ideal relationship between a distance from the light source 2 to the light emitting surface of the optical member 20 and a distance from the light source 9 to the light emitting surface, and therefore the optical characteristics in this optical pickup can be favorable without so much difference between the height of the light source 2 and that of the light source 9 from the substrate portion 20a. Accordingly, the size of the package can be reduced and therefore it can contribute to downsizing of an optical pickup.

Still further, with different diameters of the light emitted from the optical member 20 between luminous flux from the light source 2 and luminous flux from the light source 9, a diameter of the light incident on the condenser 17 can be changed and therefore a convergence position of the light from the light source 2 can be different from that of the light from the light source 9. In other words, with a diameter of the light which is incident on the condenser being differentiated between individual light sources, it becomes possible to condense light to the record mediums having different record area positions by using a single condenser so that the information can be recorded or reproduced. In addition, the same effects can be obtained by using different diffusion angles of the light incident on the condenser, and a further remarkable difference can be obtained in the convergence position with a combination of different apertures for incident light and diffusion angles.

An explanation will now be made for an operation of an optical pickup having the configuration described above.

If the record medium is the high-density optical disk 18, light is emitted from the light source 2 for recording or reproduction. In this condition, the light emitted from the light source 2 is reduced in its diffusion angle by the diffusion angle converting means 23, in other words, an extent of the light is reduced.

This diffusion angle converting means 23 is effective to transmit more of the light emitted from the light source 2 toward the high-density optical disk 18, and therefore it becomes possible to obtain efficiently a quantity of panel light on the high-density optical disk 18 which is particularly required by a large amount for recording data. Accordingly, it is effective to provide an optical pickup which can be favorably used for both of recording and reproduction.

In addition, this configuration makes it possible to decrease the light which may be included into portions other than a predetermined optical path of the optical member 22, which reduces components of stray light in the optical member 22, and therefore it is also possible to prevent stray light from being incident on the light receiving means 21 or the like to degrade signal components.

The light whose extent is reduced by the diffusion angle converting means 23 is transmitted through the filter 24 almost completely, also transmitted through the polarizing separation film 25 which is arranged behind it almost completely, and then incident on the color (chromatic) aberration correcting (compensating) means 501. The color (chromatic) aberration correcting (compensating) means 501 is set so as not to apply a color (chromatic) aberration correction effect to the light emitted from the light source 2 almost at all, and therefore the incident light is transmitted through the color (chromatic) aberration correcting (compensating) means 501 without any application of the effect of the color (chromatic) aberration correcting (compensating) means 501 almost at all, and then it is incident on the quarter-wavelength plate 26.

When passing through the quarter-wavelength plate 26, the light which has been a linear polarization until then is converted to a circular polarization, and then if there is a collimator lens, it passes through the collimator lens 16 and is converted to parallel light before it is incident on the condenser 17, and otherwise, it is directly incident on the condenser 17, and then the light is converged to the high-density optical disk 18.

Returning light which has been reflected by the high-density optical disk 18 is incident on the quarter-wavelength plate 26 again, and then it is converted from the circular polarization to the linear polarization which crosses at right angles to the polarization direction in which the light is emitted from the light source 2 when passing through the plate 26 and incident on the polarizing separation film 25. At this point, since the polarization direction is different from that of the forward path, the light is reflected by the polarizing separation film 25 and incident on the diffusion angle converting means 31 via the reflection means 29 and 30. The light incident on the diffusion angle converting means 31 is reflected without being diffracted almost at all, luminous flux having a predetermined shape is formed in a given position on the light receiving means 21 by the signal formation means 32, and an RF signal and both of focusing and tracking signals are generated based on the light incident on the light receiving means 21, so as to reproduce information and to perform an optimum control of the optical pickup.

If the record medium is the low-density optical disk 19, light is emitted from the light source 9 for recording or reproduction. In this condition, in relation to the light emitted from the light source 9, the direction of an extent of the light is changed from the diffusion direction to the convergence direction, in other words, the light is converted from diffused to converged light by the diffusion angle converting means 27.

The light converted to the converged light by the diffusion angle converting means 27 is divided to a plurality of beams by the means for forming a plurality of beams 28 to be reflected and incident on the filter 24. Then, the light is reflected by the filter 24 almost completely, is transmitted through the polarizing separation film 25 behind it almost completely, and then is incident on the quarter-wavelength plate 26.

When passing through the quarter-wavelength plate 26, the light which has been a linear polarization until then is converted to a circular polarization, and then if there is a collimator lens, it passes through the collimator lens 16 so as to have a smaller diffusion angle before it is incident on the condenser 17, and otherwise, it is directly incident on the condenser 17, and then the light is converged to the low-density optical disk 19. At this point, the diameter of the light incident on the condenser 17 becomes smaller than that of the light from the light source 2.

Then, returning light which has been reflected by the high-density optical disk 19 is incident on the quarter-wavelength plate 26 again, and then it is converted from the circular polarization to the linear polarization which crosses at right angles to the polarization direction in which the light is emitted from the light source 9 when passing through the plate 26 and incident on the polarizing separation film 25. At this point, since the polarization direction is different from that of the forward path, the light is reflected by the polarizing separation film 25 and incident on the diffusion angle converting means 31 via the reflection means 29 and 30. The light incident on the diffusion angle converting means 31 is reflected with being diffracted to plus one-dimensional light almost completely, and the light which has been diffusion light before being incident is converted to converged light to be incident on the signal formation means 32.

Luminous flux having a predetermined shape is formed in a given position on the light receiving means 21 by the signal formation means 32, and an RF signal and both of focusing and tracking signals are generated based on the light incident on the light receiving means 21, so as to reproduce information and to perform an optimum control of the optical pickup.

If a plurality of light sources are arranged in different positions in the same package as described above, the light emitted from respective light sources often generates a wavefront aberration significantly different each other. To cope with this, an optimization is made for distances between the luminous point 2a of the light source 2 and the collimator lens and between the luminous point 9a of the light source 9 and the collimator lens. It will now be explained below.

Figure 11:
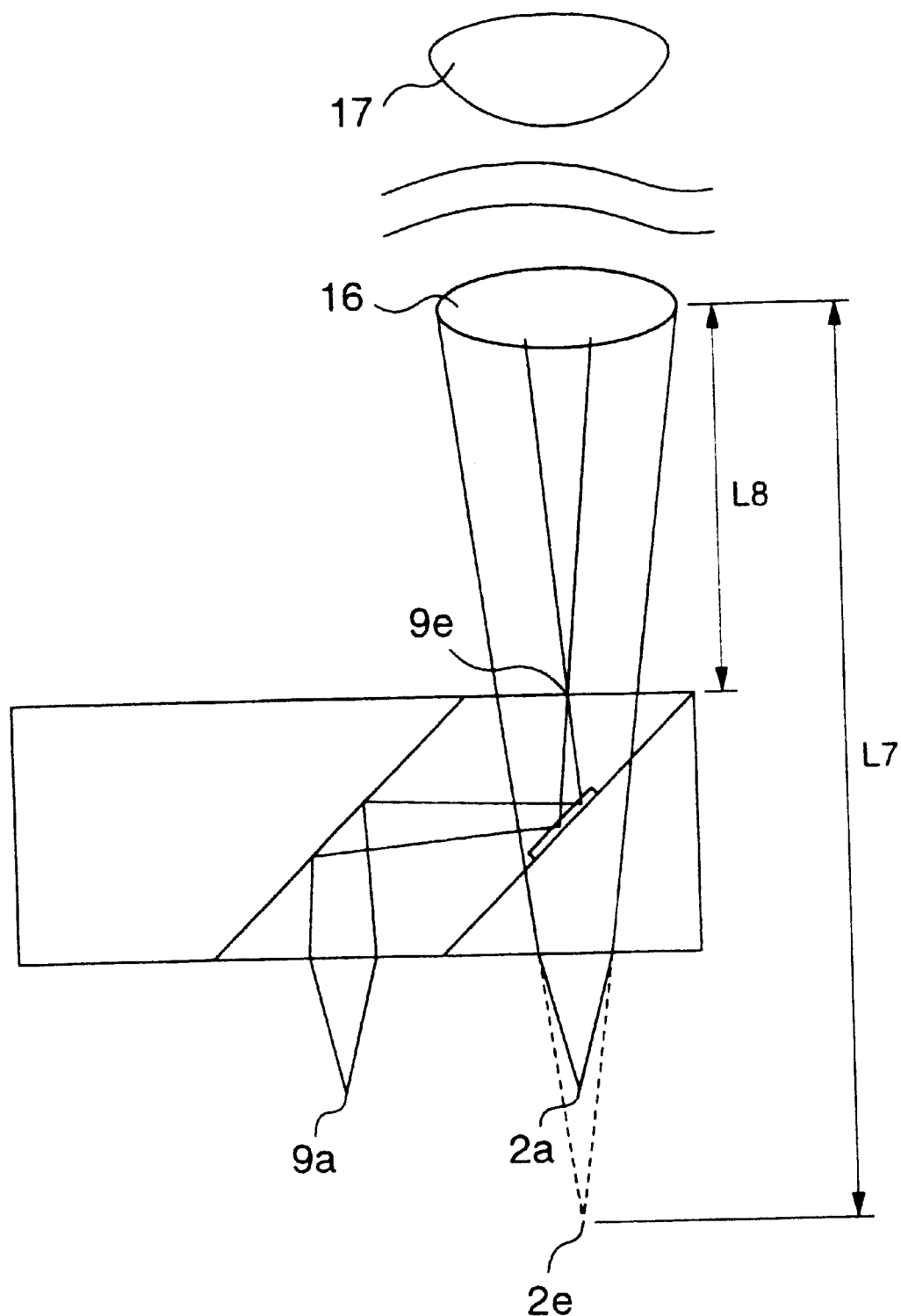
FIG. 11 is a diagram illustrating a relationship between a luminous point in an infinite optical system and a collimating lens of the second embodiment according to the present invention.
Figure 12:
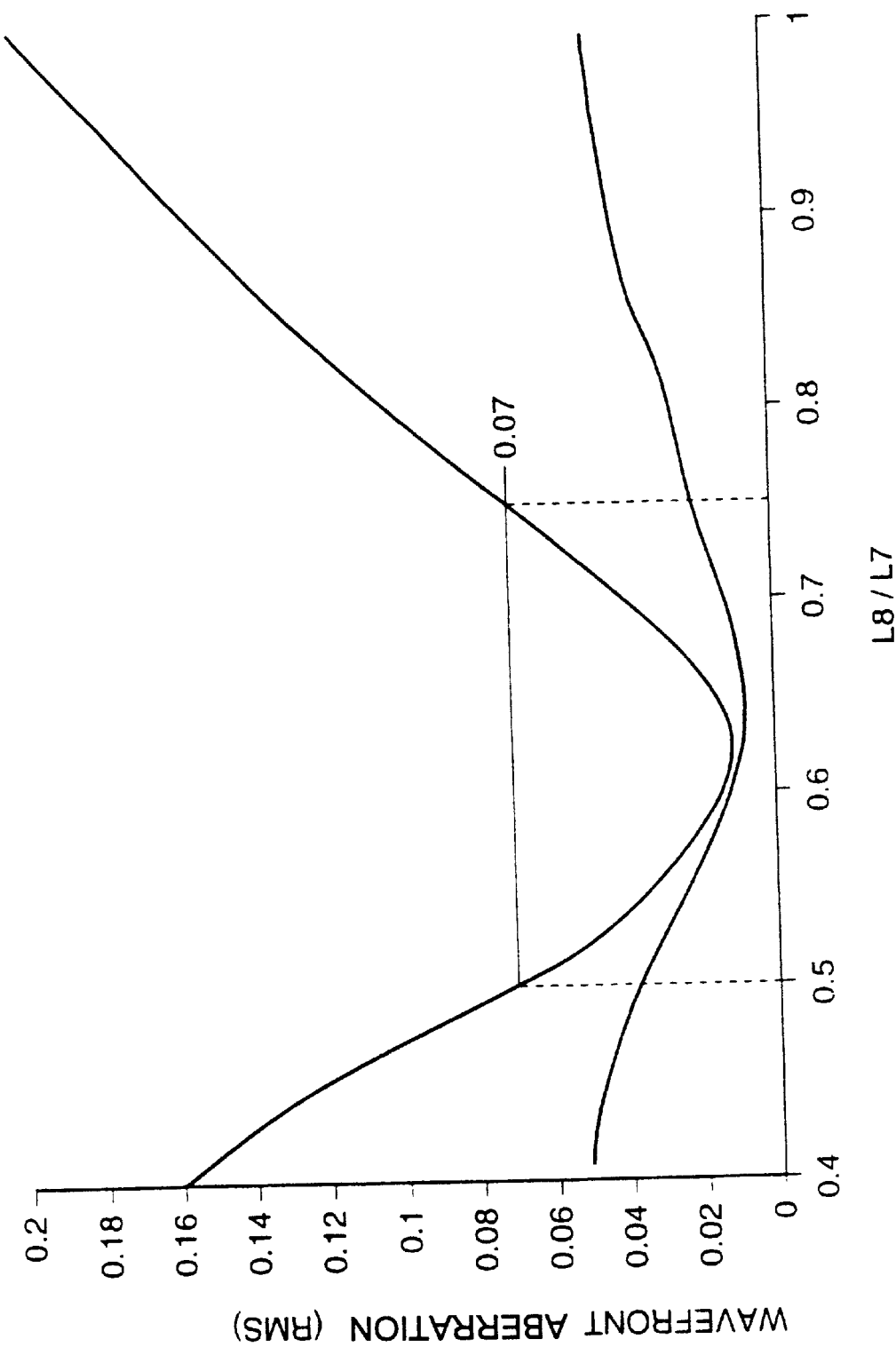
FIG. 12 is a diagram illustrating a relationship between a wavefront aberration amount in light and a distance ratio depending on a presence or absence of a shift of a condenser of the second embodiment according to the present invention.

Referring to FIG. 11, there is shown a diagram of a relationship between a luminous point in an infinite optical system and a collimator lens of the second embodiment according to the present invention. In FIG. 11, reference numeral L7 indicates an effective focal length between the collimator lens 16 and a virtual luminous point 2e, and reference numeral L8 indicates an effective focal length between the collimator lens 16 and a virtual luminous point 9e. Additionally, referring to FIG. 12, there is shown a relationship between a wavefront aberration amount in light and a distance ratio depending on a presence or absence of a shift of the condenser of the second embodiment according to the present invention. In other words, when a ratio of L7 to L8 is changed, a wavefront aberration amount which is generated at an incidence on the condenser is compared between a case in which the condenser 17 shifts by 500 $\mu$m in a tracking direction (indicated by a thick line) and a case in which it does not shift in the tracking direction (indicated by a thin line). In general, a condenser under reproduction on an optical disk has a possibility of shifting by a maximum of 500 $\mu$m in a tracking direction. In addition, taking into consideration that it is assumed that approx. 0.07$\lambda$ (where $\lambda$ indicates a wavelength of light) or lower of a wavefront aberration amount as an RMS value is allowed to converge light which has been incident on the condenser into the optical disk effectively, and assuming that the wavefront aberration amount is 0.07$\lambda$ or lower at the maximum shift amount (500 $\mu$m) of the condenser 17 for the light from the luminous point 9a in which the aberration amount is relatively large and the incidence conditions to the condenser 17 are severe, light from both of the luminous points will converge on the optical disk independent of the shift amount of the condenser 17 after it is incident on the condenser 17. To satisfy this condition, apparently as shown in FIG. 12, the ratio of L7 to L8 (L8÷L7=H, it is described hereinafter as, H) is preferably within a range of 0.50<H<0.75.

Further, if the wavefront aberration amount is 0.04$\lambda$ or lower as an RMS value under the same conditions, the light incident on the condenser 17 is converged very precisely on the optical disk independently of a shift amount of the condenser 17 whether the incident light is emitted from either luminous point 2a or 9a. To satisfy this condition, apparently as shown in FIG. 12, the ratio of L7 to L8 (H) is preferably within a range of 0.53<H<0.70 since it is effective to improve signal characteristics.

With an arrangement of the optical system so that the value of H is within the above range, the wavefront aberrations in every luminous flux can be theoretical threshold or lower values in an optical pickup having a plurality of types of luminous flux in a single optical system, and therefore every luminous flux can be condensed on the optical disk by using a single condenser 17.

Accordingly, only one condenser 17 is needed for condensing, so that the number of condensers can be decreased and it is not required to arrange any switching means for condensers, whereby it becomes possible to downsize an optical pickup, to increase the productivity due to a decrease of the number of the components, and further to improve the reliability of the optical pickup and to increase the operation speed due to omission of a complicated mechanism.

Although an infinite optical system having the collimator lens 16 is used in this embodiment, a finite optical system may be used, too. If it is used, a space is not needed for arranging the collimator lens in comparison with the configuration in which the infinite optical system is used, and therefore a size of the entire optical pickup can be reduced.

[Third embodiment]

A third embodiment of the present invention will be described below with reference to the accompanying drawings.

Figure 13:
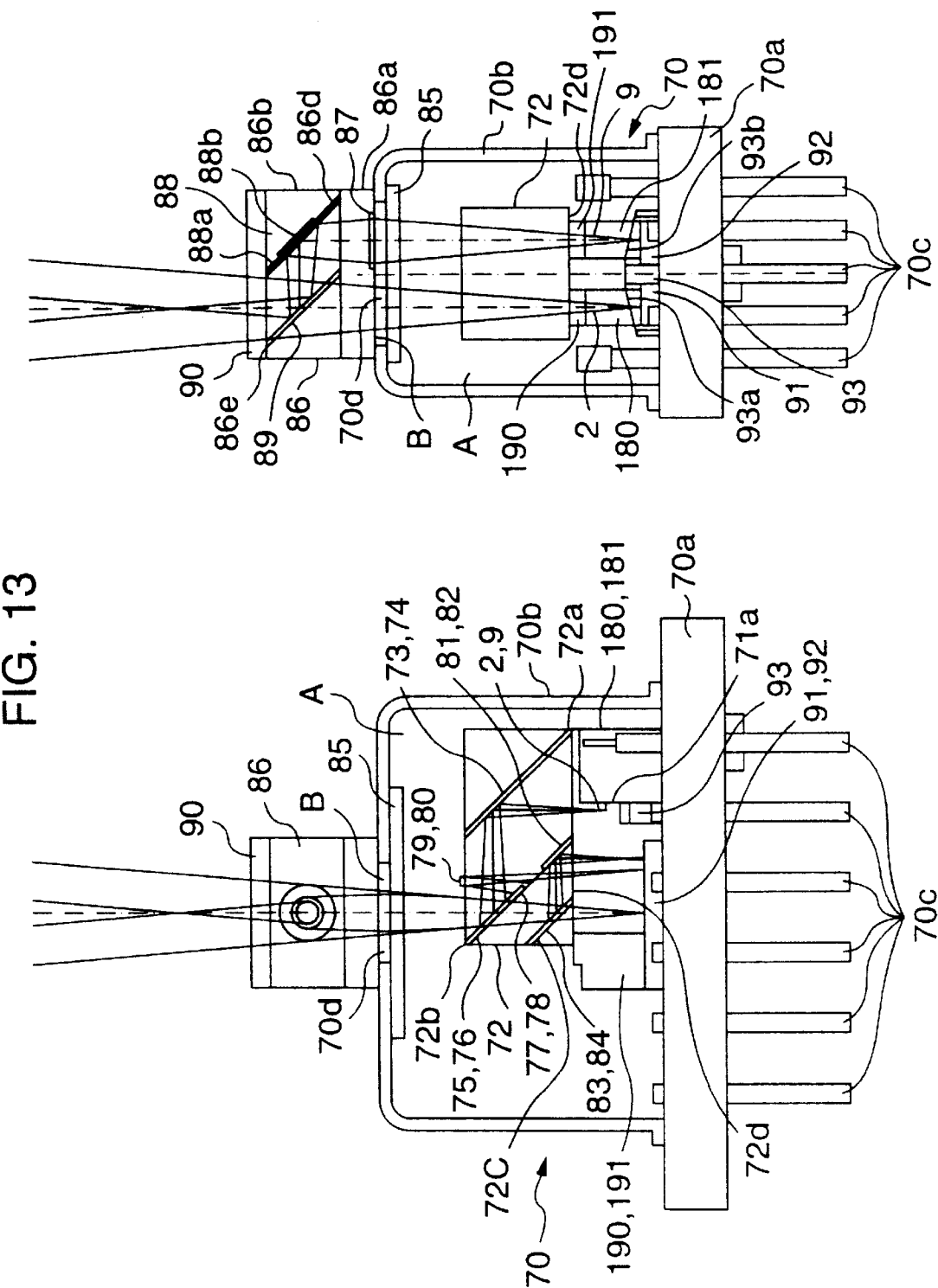
FIG. 13 is a cross section of an integrated optical head of a third embodiment according to the present invention.
Figure 14:
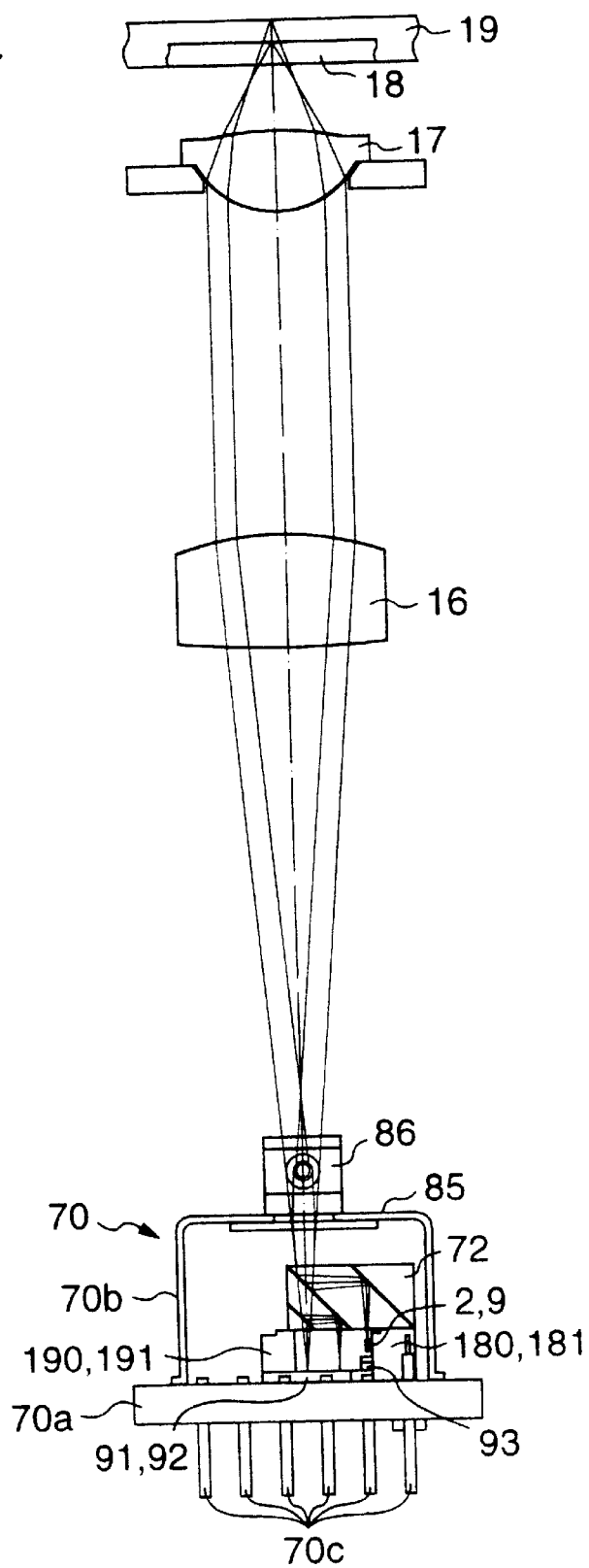
FIG. 14 is a cross section of an optical system of the third embodiment according to the present invention.

Referring to FIG. 13, there is shown a cross section of an integrated optical head of the third embodiment according to the present invention, and referring to FIG. 14, there is shown a cross section of an optical system of the third embodiment according to the present invention. The orthogonal cross section in FIG. 14 illustrates an optical path with a straight line.

In FIGS. 13 and 14, a package 70 comprises a light source 2 for emitting light for a high-density optical disk 18 and a light source 9 for emitting light for a low-density optical disk 19, a substrate portion 70a on which are mounted a light receiving means 91 for receiving light reflected by the high-density optical disk 18, a light receiving means 92 for receiving light reflected by the low-density optical disk 19 and the like, and a sidewall portion 70b arranged so as to enclose these members.

The package 70 has almost the same configuration as for the package 20 described in the second embodiment, and therefore explanation thereof is omitted here.

In addition, the light sources 2 and 9 contained in the package 70 are the same as those for the second embodiment, and their explanation is omitted here, too.

Next, a first optical member 72 is used to guide light emitted from the light sources 2 and 9 to a predetermined optical path and to guide returning light which has been reflected by the optical disk to a predetermined optical path.

The first optical member 72 comprises a first inclined plane 72a, a second inclined plane 72b, and a third inclined plane 72c, preferably having a configuration in which particularly a light incident surface is almost in parallel with a light emitting surface and incident light or emitted light is incident almost perpendicularly on the surfaces of these planes. With this configuration, it is possible to suppress an occurrence of a non-point aberration to the incident light, so as to prevent a degradation of optical characteristics of transmitted light.

Furthermore, various optical elements are formed on the first inclined plane 72a, the second inclined plane 72b, and the third inclined plane 72c.

An explanation will now be made for various optical elements existing in the first optical member 72.

First, on the first inclined plane 72a, reflection films 73 and 74 are formed. The reflection film 73 is used to reflect light emitted from the light source 2 in a given direction and the reflection film 74 is used to reflect light emitted from the light source 9 in a given direction. As materials of the reflection films 73 and 74, preferably there is used a metal material having high reflectance such as Ag, Au, and Cu or a plurality of dielectric materials having various refractive indices in a plurality of alternate layers.

Although the reflection film 73 and the reflection film 74 are individually arranged in this embodiment, they can be formed in a single large reflection film almost all over the first inclined plane 72a. If this configuration is used, it is possible to omit a process of forming reflection films by using masks and to decrease the masks for forming the reflection films, and therefore the productivity can be increased and the manufacturing cost can also be reduced.

On the second inclined plane 72b, polarizing separation films 75 and 76 are formed. Light emitted from the light source 2 and reflected by the reflection film 73 is incident on the polarizing separation film 75, and light emitted from the light source 9 and reflected by the reflection film 74 is incident on the polarizing separation film 76. These polarizing separation films 75 and 76 transmit light having specific polarization directions and reflect light having other polarization directions.

These polarizing separation films 75 and 76 are preferably made of a plurality of dielectric materials having refractive indices different from each other in a plurality of alternate layers since more precise PS separation can be performed. Particularly in this embodiment, the polarizing separation films transmit S polarization components emitted from the light sources 2 and 9 and reflect P polarization components.

The film thickness of the polarizing separation films 75 and 76 is preferably set according to a wavelength of incident light. It decreases an incompleteness of a polarizing separation caused by a difference between wavelengths of incident light so as to perform more precise PS separation.

These polarizing separation films 75 and 76 are effective to guide light to the record media without decreasing a quantity of transmitted light almost at all, and therefore it is possible to increase an efficiency of utilizing light and to obtain a predetermined quantity of panel light on the light sources 2 and 9 at small outputs so as to obtain longer lives of the light sources 2 and 9.

Although the polarizing separation films 75 and 76 are individually arranged in this embodiment, if there is only a small difference between wavelengths of incident light, they can be formed in a single large polarizing separation film almost all over the top of the second inclined plane 72b. If this configuration is used, it is possible to omit a process of forming polarizing separation films by using masks and to decrease the masks for forming the polarizing separation films, and therefore the productivity can be increased and the manufacturing cost can also be reduced.

Although the polarizing separation films are used as separation means between the emitted light and returning light in this embodiment, instead of them, a half mirror or other separation means may be used according to a required quantity of panel light.

Next, an explanation will be made for other optical members arranged on the second inclined plane 72b.

Reference numerals 77 and 78 indicate holograms for light of a monitor, and the hologram 77 reflects to diffract a part of the light emitted from the light source 2 and reflected by the reflection film 73 in a given direction. The light reflected to be diffracted by this hologram 77 is guided to a reflection section 79 mounted on the top of the first optical member 72, and then incident on a monitor light receiving section on a light receiving means 91. Afterward, it drives a power supply control circuit of the light source 2 based on an electric signal from the monitor light receiving section, adjusts the power to be applied to the light source 2, and then controls the quantity of light emitted from the light source 2 so as to always be an optimum value.

The hologram 78 reflects to diffract a part of the light emitted from the light source 9 and reflected by the reflection film 74 in a given direction. The light reflected to be diffracted by this hologram 78 is guided to a reflection section 80 mounted on the top of the first optical member 72, and then incident on the monitor light receiving section on a light receiving means 92. Afterward, it drives a power supply control circuit of the light source 9 based on an electric signal from the monitor light receiving section, adjusts the power to be applied to the light source 9, and then controls the quantity of light emitted from the light source 9 so as to always be an optimum value.

Furthermore, reflection films 81 and 82 are put on a portion nearest to the second inclined plane 72b.

The reflection film 81 is used to reflect incident light which has been reflected by an optical path dividing means 83 and to guide it to a predetermined position, and the reflection film 82 is used to reflect incident light which has been reflected by an optical path dividing means 84 and to guide it to a predetermined position. The reflection films 81 and 82 are preferably made of a metal material having high reflectance such as Ag, Au, and Cu or of a plurality of dielectric materials having various refractive indices.

Lastly, the optical path dividing means 83 and 84 are formed on the third inclined plane 72c.

The optical path dividing means 83 transmits or reflects returning light which has been emitted from the light source 2 and reflected by the high-density optical disk 18, and the optical path dividing means 84 transmits or reflects returning light which has been emitted from the light source 9 and reflected by the low-density optical disk 19. It is preferable here to use a half mirror so that the quantity of transmitted light is almost equal to that of reflected light in both of the optical path dividing means 83 and the optical path dividing means 84.

Next, the second optical member 86 will be described below.

The second optical member 86 is arranged so as to close the opening 70d put on the sidewall portion 70b of the package 70, with being bonded to the sidewall portion 70b of the package 70 by means of UV light hardening resin, epoxy resin, or bonding glass. The second optical member 86 comprises a first substrate 86a and a second substrate 86b. These substrates are sequentially described below.

First, the first substrate 86a is made of a material having favorable transparency such as glass or resin having a parallel plane shape, with a diffusion angle converting means 87 formed in a region through which the light from the light source 9 at the end surface in the side of the shield member 85. The diffusion angle converting means 87, which is so as to match the optical axis of the light emitted from the light source 9 on an end surface of the first substrate 86a in the side of the light source 9, is used to make negative a diffusion angle of the light incident from the light source 9, in other words, to convert the optical path of the light emitted from the luminous point 9a of the light source 9 to light having an optical path which is as if it were emitted from a position nearer to the low-density optical disk 19 in comparison with a visual position, and practically it shifts the luminous point in an approaching direction to the low-density optical disk 19. It apparently shifts the luminous point of the light source 9 from the true luminous point 9a to an apparent luminous point 9e, and therefore shortens the optical path from the light source 9 to the record medium.

The diffusion angle converting means 87 is preferably formed almost perpendicularly to the optical axis of the light emitted from the light source 9. In general, preferably an optical axis of incident light precisely matches a central axis of the diffusion angle converting means 87. Some deviation, however, occurs frequently between them. To cope with this, the diffusion angle converting means 87 is formed almost perpendicularly to the optical axis of the light emitted from the light source 9, whereby it is possible to maximize a range of an amount of deviation between which the optical axis of incident light and the central axis of the diffusion angle converting means 87 is permitted, in other words, to maximize a tolerance of an amount of deviation to which a degradation of the optical characteristics can be limited. Therefore, it is possible to lower a required precision for positioning between the optical axis of incident light and the central axis of the diffusion angle converting means 87, whereby the positioning can be easily performed and time for the positioning can be reduced, too. In addition, to the contrary, if a deviation occurs between the optical axis of the light and the central axis of the diffusion angle converting means 87, a degradation of the optical characteristics can be reduced. This leads to preventing a degradation of the optical characteristics caused by a deviation of a component with deterioration with age of bonding material such as resin used for the bonding though it has been precisely positioned initially, and therefore it is possible to achieve a very reliable optical pickup having less degradation of optical characteristics for a long period.

In addition, with the diffusion angle converting means 87 formed on the end surface closer to the light source 9 of the second optical member 86, the diffusion angle converting means 87 exposed onto the surface of the second optical member 86 can be contained in the package 70, and therefore it is possible to suppress a degradation of the diffusion angle converting means 87 caused by an absorption of moisture or oxidation in dielectric, glass, resin, or other materials of the diffusion angle converting means 87. Accordingly, a diffusion angle can be precisely controlled for a longer period, and therefore the reliability of an optical pickup can be improved so as to actualize an optical pickup maintaining superior optical characteristics for a long period.

From a viewpoint of a function as the diffusion angle converting means 87, it is preferably made of a diffraction grating, particularly a hologram since it is effective to transmit light very efficiently. Particularly as a hologram, it is preferable to use one having a cross section in a shape of a staircase of four or more steps or having a serrated cross section since the light can be used very efficiently and the quantity of light be prevented from being decreased.

Furthermore, the diffusion angle converting means 87 is preferably in contact with a material having a lower refractive index than that of the second optical member 86 on which it is placed. Particularly, if the diffusion angle converting means 87 is made of a hologram, a degree of the conversion of a diffusion angle in the diffusion angle converting means 87 is increased as a pitch of each slot of the hologram is decreased. At a fixed pitch, as a greater difference is generated between the refractive index of the optical member on which the diffusion angle converting means 87 is mounted and that of the material which the diffusion angle converting means 87 is contacted, the degree of the conversion of the diffusion angle is increased.

The minimum pitch, however, is limited due to a process limitation, and currently it seems to be limited to approximately 1 μm as a profitable line. If the pitch is increased, the diffusion angle converting means 87 can be manufactured more easily, and therefore it is possible to increase the productivity, to simplify a manufacturing device used for manufacturing, to reduce a work time, and to decrease the manufacturing cost. Furthermore, it can be precisely manufactured, so as to obtain favorable optical characteristics.

From this viewpoint, it is apparent that a greater difference between the above refractive indices is more favorable. Particularly, as described in this embodiment, the light emitted from the light source 9 is brought into convergence once and the light diffused afterward is brought into incidence on the condenser 17 in this configuration, and to obtain a 1 μm or greater pitch of the hologram composing the diffusion angle converting means 87, only a 0.35 or greater difference is needed between the refractive index of the material of the optical member and that of the material in contact with the diffusion angle converting means 87, and further as described later, to limit a ratio of a distance between the light source 2 and the collimator lens 16 to a distance between the light source 9 and the collimator lens 16 to a predetermined value or lower and to maintain the pitch of the hologram at 1 μm or greater, only 0.5 or greater difference is needed between the refractive index of the material of the second optical member 86 and the refractive index of the material in contact with the diffusion angle converting means 87. As a substance satisfying these conditions, air is used in this embodiment. The air is capable of being distributed uniformly among fine pitches of the diffusion angle converting means 87 unlike a solid body such as resin or liquid and its refractive index is extremely small such as, for example, approximately 1, and therefore it is effective to prevent a degradation of the optical characteristics caused by a deviation of the distribution with satisfying the conditions. Particularly in a type of the air, an inactive gas is preferable since it is effective to prevent a degradation of various optical elements mounted on the optical member caused by an oxidation. Further, an amount of deterioration with age in the optical member 86 on which the diffusion angle converting means 87 is mounted can be set to the same value as that of the optical member 72 contained in the package 70, and therefore a life of the optical pickup can be lengthened.

Next, the configuration of the diffusion angle converting means will be described with reference to the drawings.

Figure 15:
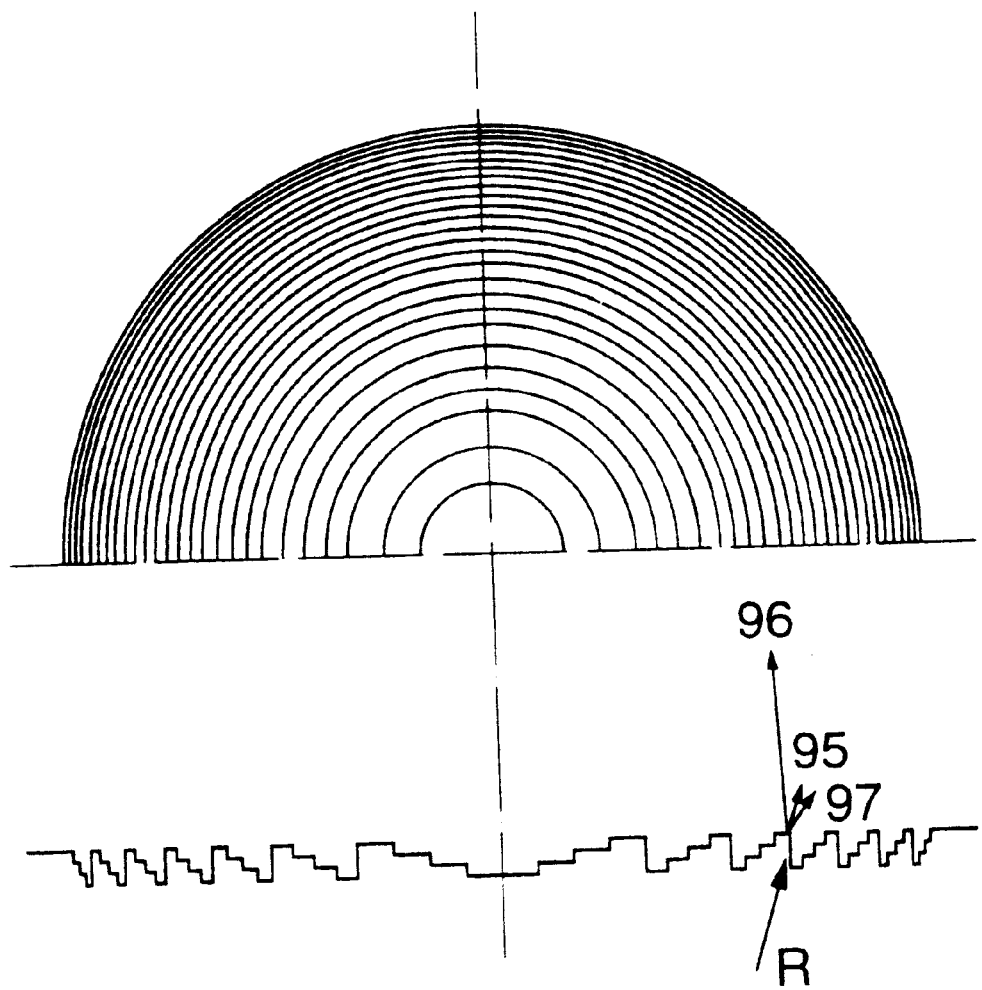
FIG. 15 is a cross section of a diffusion angle conversion means of the third embodiment according to the present invention.

Referring to FIG. 15, there is shown a cross section of the diffusion angle converting means of the third embodiment according to the present invention. In the diffusion angle converting means 87, patterns of concentric circles each having an uneven cross section with the pitch decreased as approaching to the peripheral portion. The patterns are formed in dry-etching or the like. If light R is incident on the hologram pattern, zero-dimensional light 95 transmitted without diffraction, plus one-dimensional diffraction light 96 depending on a pitch, and minus one-dimensional light 97 are generated. In this embodiment, to suppress the zero-dimensional light 95 and the minus one-dimensional light 96 and to intensify the plus one-dimensional light 97, the patterns have a multi-stage shaped cross section in a diffraction direction. This multi-stage can be formed by preparing a plurality of mask patterns and repeating a resist exposure and dry-etching. This pattern is effective to suppress an occurrence of the zero-dimensional light 95 and the minus one-dimensional light 96, and therefore the quantity of panel light and the quantity of light required for detecting signals can be gained so as to use the light source 9 at a low output.

In this condition, the diffusion angle converting means 87 is guided from the light source 9 and luminous flux emitted on the low-density optical disk 19 is made of a pattern larger than an aperture formed in the diffusion angle converting means 87. On the diffusion angle converting means 87, both of the emitted light and the returning light are incident. Particularly, the backward light passes through an optical path different from that of the emitted light when the condenser 17 is shifted. If the diffusion angle converting means 87 is designed so as to match the aperture for the emitted light, an eclipse may occur, by which the quantity of light incident on the light receiving means 92 is decreased, and therefore signals may be inhibited to be reproduced or precise servo signals may not be generated. To avoid these disadvantages, the aperture is enlarged to a region where the returning light may be incident so as to prevent an occurrence of the eclipse.

Next, the second substrate 86b, which is arranged on the top of the first substrate 86a and bonded to the first substrate 86a by means of bonding material such as optical hardening resin, epoxy resin, bonding glass or the like, is used to guide light emitted from the light source 2 or the light source 9 and guided via the first optical member 72 and the first substrate 86a of the second optical member 86 to a given optical path and to guide the returning light reflected by the optical disk to a given optical path.

In the second substrate 86b, it is preferable that particularly a surface on which light is incident and a surface from which light is emitted are almost perpendicular to the optical axis of the light and the respective surfaces are almost in parallel with each other. In this configuration, it is possible to suppress an occurrence of a non-point aberration in incident light, so as to prevent a degradation of optical characteristics of transmitted light.

Furthermore, the first inclined plane 86d and the second inclined plane 86c are almost in parallel with each other, each having an inclination in a direction different from that of the inclined plane formed on the first optical member 72.

On the first inclined plane 86d and the second inclined plane 86e, various optical elements are formed.

First, on the first inclined plane 86d, means for forming a plurality of beams 88 is arranged.

The means for forming a plurality of beams 88 includes a polarizing separation film 88a which reflects light along the polarization direction or transmits light and a beam separating section 88b which reflects incident light with separating it into a plurality of luminous flux, and the light emitted from the light source 9 and transmitted through the diffusion angle converting means 87 is transmitted through the polarizing separation film 88a almost completely and then incident on the beam separating section 88b. Then, the incident light is separated into a plurality of luminous flux by the beam separating section 88b and then reflected.

The beam separating section 88b is preferably made of a diffraction grating since it is effective to form a plurality of luminous flux efficiently. In this embodiment, it has a configuration in which three types of luminous flux are mainly formed; zero-dimensional light and plus and minus one-dimensional light generated in the diffraction grating.

In this embodiment, the beam separating section 88b also serves as a diaphragm to the light from the light source 9. Further in this embodiment, light from both of the light sources 2 and 9 is caused to be incident on a single condenser 17, and an incidence pupil of the condenser 17 is adjusted so that the light from the light source 2 is focused on a record area of the high-density optical disk 18. Accordingly, in this condition, the condenser 17 is adjusted in its shape and material so that the light from the light source is condensed on the record area of the high-density optical disk 18.

By means of this condenser 17, to cause the light from the light source 9 to focus on the record area of the low-density optical disk 19, a diameter of the light from the light source 9 incident on the condenser 17 is adjusted so as to be smaller than a diameter of the light from the light source 2 in this embodiment. In general, a lens has more intensive condensing application in the peripheral portion than in the central portion. Accordingly, if light is expanded at incidence, it focuses on a nearer position; if the light is not expanded so much at incidence, it focuses on a farther position. In this embodiment, since the record area of the low-density optical disk 19 is placed in a farther position than the record area of the high-density optical disk 18, it becomes possible to condense the light from the light source 9 on the record area of the low-density optical disk 19 by the condenser 17 which is designed with being adjusted to the light from light source 2 by optimizing the incidence aperture to the condenser 17 for the light from the light source 9.

This incidence aperture is adjusted by the beam separating section 88b. In other words, the size of the beam separating section 88b is adjusted so that the light reflected by the beam separating section 88b has a predetermined diameter on the condenser 17.

With the beam separating section 88b having this diaphragm function, a diameter of the light emitted from the light source 9 can be precisely adjusted, and therefore a diameter of the light incident on the condenser 17 can be set to a predetermined size, whereby the light from the light source 9 can be condensed on the record area of the low-density optical disk 19 by the condenser 17. Furthermore, in comparison with a configuration in which the diaphragm is arranged individually, the number of the components can be decreased and it is possible to omit time and labor of positioning between the diaphragm and the light source 9, and therefore the productivity of an optical pickup can be increased.

Further, with the diaphragm arranged in this position, light which is not reflected by the beam separating section 88*b* in the light emitted from the light source 9 directly passes through the first inclined plane 86*d* and then it is discharged to the outside of the optical member 86, and therefore it is possible to prevent the light which has not been reflected from becoming stray light in the package 70.

Still further, while the emitted light toward the low-density optical disk 19 is transmitted through the polarizing separation film 88*a* and then incident on the beam separating section 88*b*, the returning light reflected by the low-density optical disk 19 is reflected by the polarizing separation film 88*a*, and therefore almost no light is incident on the beam separating section 88*b* in this configuration. With the beam separating portion 88*b* of the means for forming a plurality of beams 88 having the diaphragm function in this configuration, for example, even if an optical axis of returning light is deviated from a given position due to a shift of the condenser 17, almost no light is incident on the beam separating portion 88*b* having the diaphragm function, whereby it is possible to prevent problems such as a decrease of the quantity of light incident on the light receiving means caused by an interruption of the light intrinsically to be incident on the light receiving means by the diaphragm or an unbalanced distribution of the quantity of light. Therefore, favorably not only more precise RF signals can be obtained, but also focusing or tracking servo signals can be generated more precisely.

In addition, since the diaphragm can be placed in a position which is in both of the optical path of the emitted light and that of the returning light, an efficiency of utilizing a space in the optical pickup can be improved. In other words, it is unnecessary to have another optical path for returning light so as not to pass through the diaphragm, and therefore further downsizing of an optical pickup can be actualized favorably.

Furthermore, this beam separating section 88*b* is placed on the optical path through which the light from the light source 9 passes, and the light from the light source 9 is incident on the section 88*b* while the light emitted from the light source 2 toward the high-density optical disk 18 is not incident on the section 88*b*, and therefore the diaphragm for the light from the light source 9 does not interrupt the light form the light source 2 nor give any bad influence. Therefore, particularly in an optical pickup having a configuration in which a plurality of light sources are contained in a single package and in which light from the plurality of the light sources is condensed to a predetermined position by a single condenser, the light from the plurality of the light sources can be caused to be incident on the condenser at a predetermined diameter without any bad influence upon each light from the plurality of the light sources favorably.

A plurality of luminous flux generated here is applied in a given position of a track of the low-density optical disk 19, and then the quantities of the returning light are compared with each other, so as to be applied to a tracking method commonly called a three-beam method for tracking on the low-density optical disk 19.

Unless the three-beam method is used as a tracking method, instead of an arrangement of the beam separating portion 88*b*, a diaphragm film simply having a diaphragm function is arranged, so as to have a function, not as a means for forming a plurality of beams, but as a diaphragm means.

On the second inclined plane 86*e*, is formed a filter 89 having a wavelength selectivity. The filer 89 transmits approximately 80% or more of the light guided from the light source 2 and reflects approx. 80% or more of the light guided from the light source 9.

With this filter 89 formed on the second inclined plane 86*e*, the light introduced from the light source 9 can be reflected without interrupting the light emitted from the light source 2 almost at all, and therefore the light emitted from the light sources 2 and 9 can be introduced to the record mediums at a high percentage. Therefore, it is possible to perform recording or reproduction to or from the record mediums without increasing the quantity of light emitted from the light sources 2 and 9, which leads to preventing a reduction of the lives of the light sources 2 and 9 caused by using the light sources 2 and 9 at a high output power. Furthermore, since the light sources 2 and 9 can be used at a low output power, the temperatures of the light sources 2 and 9 are hardly increased, and therefore oscillation wavelengths of the light sources 2 and 9 do not shift almost at all. Accordingly, it is possible to provide a high-performance optical pickup which is capable of focusing more precisely.

By means of the second substrate 86*b*, the light from the light source 2 and that of the light source 9 are guided to almost an identical optical axis.

The optical path from an incidence of the light from the light source 9 on the second optical member to an incidence of the light on the filter 89 after being reflected by the means for forming a plurality of beams 88 is formed so as to progress almost perpendicularly to the plane including the optical axis of the light passing through the first optical member 72.

Reference numeral 90 indicates a quarter-wavelength plate, and the quarter-wavelength plate 90 converts polarization directions of both of the light emitted from the light source 2 and transmitted through the filter 89 and the light emitted from the light source 9 and reflected by the filter 89 from a linear polarization to an elliptic polarization.

The quarter-wavelength plate 90 can be formed in a shape of a planar plate having a given thickness as shown in this embodiment or in a thin film.

A light receiving means 91 receives light transmitted through the optical path dividing means 83 and light reflected by the optical path dividing means 83 and then reflected by the reflection film 81, and a light receiving means 92 receives light transmitted through the optical path dividing means 84 and light reflected by the optical path dividing means 84 and then reflected by the reflection film 82. Both of them include a required number of various light receiving portions each having a required shape in a required position for generating RF signals, monitor signals, and tracking and focusing signals.

In this embodiment, the light receiving means 91 and the light receiving means 92 are arranged in almost an identical plane on the substrate portion 70*a* of the package 70, and further so that the longer direction of the substrate portion 70 is almost in parallel with the longer direction of the light receiving means 91 and the light receiving means 92.

In this manner, with the plurality of light receiving means formed almost in parallel with each other, it is favorably possible to minimize the space in which the light receiving means are arranged in an optical pickup in comparison with a configuration in which they are arranged in various positions so as to downsize the optical pickup efficiently. In addition, with an identical surface in the package used for arrangement of the plurality of light receiving means, only one surface is required to be chamfered to obtain precise parallelism, so as to simplify the chamfering work, whereby an optical pickup having favorable productivity can be achieved.

Although the light receiving means 91 and 92 are directly mounted on the substrate portion 70*a* in this embodiment, the light receiving means may be mounted, for example, via a member such as a light receiving means arrangement plate on the substrate portion 70*a*.

Next, a detailed description will be made for the arrangement of the light receiving sections in the light receiving means 91 and 92.

Referring to FIG. 16, there is shown an arrangement of the light receiving means of the third embodiment according to the present invention. In FIG. 16, the light receiving means 91, which receives light emitted from the light source 2 and then reflected by the high-density optical disk 18, comprises light receiving portions 91*a*, 91*b*, 91*c*, 91*d*, 91*e*, and 91*f*. The light receiving means 92, which receives light emitted from the light source 9 and then reflected by the low-density optical disk 19, comprises light receiving portions 92*g*, 92*h*, 92*i*, and 92*j*.

Reference numerals 91*m* and 92*m* indicate light receiving portions for monitoring; the light receiving portion 91*m* receives a part of the light guided from the light source 2 separated by the hologram 77 for monitor light, the light receiving portion 92*m* receives a part of the light guided from the light source 9 separated by the hologram 78 for monitor light. Light current generated according to a quantity of light received by the light receiving portions 91*m* and 92*m* is transmitted to a signal processing circuit including a light source driving circuit, in which the quantities of light emitted from the light sources 2 and 9 are kept to be a predetermined quantity of light to control the power supplied to the light sources 2 and 9.

Since these light receiving means 91 and 92 include a current-voltage converting circuit for converting light current generated in respective light receiving portion to voltage signals, a voltage comparator for a comparison to check that each positive electrode of the light source 2 and 9 exceeds a reference voltage, an adder for adding signals from respective light receiving portions, and an analog switch for switching respective light receiving portions based on output signals from the voltage comparator, all of which are formed in a semiconductor process, a configuration of a circuit in a rear stage can be simplified so as to reduce the number of times of connections to terminals or electrodes required for electric connections, and therefore it is possible to suppress a reduction of yield caused by a defective bonding to the minimum.

Next, an explanation will be made for a signal generation method in the light receiving means 91. The reflected light from the high-density optical disk 18 returns to the first optical member 72, the light transmitted through the optical path dividing means 83 reaches the light receiving means 91 before an image formation, and then an image is formed in a shape of a half moon on the light receiving portions 91*a*, 91*b*, and 91*e* as shown in FIG. 16. The light reflected by the optical path dividing means 83 forms an image before being reflected by the reflection film 81 and reaching the light receiving means 91, and then forms a reflected image having a shape of a half moon on the light receiving portions 91*c*, 91*d*, and 91*f*. The light current generated in respective light receiving portions is converted to voltage signals by the current-voltage converting circuit and then directly output simultaneously with being transmitted to the adder so as to form (Va+Vb+Vf) and (Vc+Vd+Ve). By taking a difference between these (Va+Vb+Vf) and (Vc+Vd+Ve), a focus error signal is generated. This focus error signal is generated in the so-called spot size detection (SSD) method.

Va, Vb, Vc, and Vd are transmitted to the signal processing circuit in the rear stage and then a track error signal is obtained by a comparison of a phase difference between (Va+Vc) and (Vb+Vd). This track error signal is generated in a so-called different phase detection (DPD) method. In addition, by taking a difference between (Va+Vd) and (Vb+Vc), a track error signal can be also obtained (a push-pull method). Which method is used depends on a type of a disk.

Then, a signal generation method in the light receiving means 92 will be described below. The reflected light from the low-density optical disk 19 returns to the first optical member 72, the light transmitted through the optical path dividing means 84 formed by the half mirror reaches the light receiving means 92 before an image formation and then forms a circular image in the light receiving portions 92*g* and 92*h* as shown in the drawing. The light reflected by the optical path dividing means 84 forms an image before being reflected by the reflection film 82 and reaching the light receiving means 92, and then forms a circular image reversed to the light transmitted through the optical path dividing means 84 on the light receiving portions 92*g* and 92*h*. The light from the light source 9 is previously divided into three beams by the means for forming a plurality of beams 88, and therefore it is divided by the optical path dividing means 84 so as to form circular images on the light receiving portions 92*i* and 92*j* in the same manner. Light current generated in respective light receiving portions is converted to voltage signals by the current-voltage converting circuit. By taking a difference between the formed Vg and Vh, a focus error signal is generated in the spot size detection method in the same manner as for the high-density optical disk 18. By taking a difference between Vi and Vj, a track error signal (a three-beam method) is obtained.

With the light receiving portion in the light receiving means 91 having a different shape from that of the light receiving portion in the light receiving means 92 and the different generation methods applied to a generation of various signals in respective light receiving means in this manner, even if shapes of incident light are not identical, the light receiving portions can be arranged in positions appropriate to respective shapes of incident light, and therefore it is possible to generate more precise focusing and tracking signals or RF signals. Furthermore, more precise focusing and tracking control can be performed in an optical pickup which is capable of recording or reproduction to a plurality of record mediums, and therefore it is possible to reduce a period of time in which data cannot be read or written due to a deviation from a predetermined track and to reduce a period of time in which information cannot be recorded or reproduced due to unfocused light beam on the record mediums. Accordingly, a period of time for reading or writing data can be reduced so as to achieve an optical pickup having high access speed.

In addition, with a configuration in which a part of the forward emitting light emitted from light source 2 and then guided to the record medium is guided to the light receiving portion 91*m* for monitoring formed in the light receiving means 91 including the light receiving portions for receiving the RF signals or focusing or tracking signals and in which a part of the forward emitting light emitted from light source 9 and then guided to the record medium is guided to the light receiving portion 92m for monitoring formed in the light receiving means 92 including the light receiving portions for receiving the RF signals or focusing or tracking signals, the number of the light receiving elements can be decreased in comparison with a configuration in which the light receiving means for monitoring is mounted on each of the light receiving means 91 and the light receiving means 92, separately.

Further, with a light receiving portion for monitoring arranged in the light receiving means 91 and 92 including the light receiving portions for RF signals and for focusing and tracking signals, the light receiving portions for RF signals and for focusing and tracking signals and the light receiving portion for monitoring are formed in a predetermined positional relationship in a step of manufacturing the light receiving means 91 and 92, and therefore positioning between the light receiving portion for monitoring and the light sources 2 and 9 can be performed simultaneously with the positioning between the light receiving means 91 or 92 and the light source 2 or 9. Accordingly, the number of times of positioning in a production process can be decreased so as to improve easiness of connections with the terminals, and therefore it is possible to increase the productivity of an optical pickup and to save spaces in comparison with a configuration in which the light receiving portion for monitoring is mounted on a semiconductor substrate other than the light receiving portion for RF signals and the light receiving portion for the focusing and tracking signals, so as to actualize further downsizing of an optical pickup.

Furthermore, the light receiving means 91 and 92 are formed on an almost identical plane on the substrate portion 70a, and therefore the size of the optical pickup can be reduced in its thickness direction, whereby it is possible to make an optical pickup thinner.

Still further, with the light receiving portion for the monitor being installed in the optical head in which the light sources 2 and 9 and the light receiving means 91 and 92 are integrated, the light receiving portion for monitoring being installed in the sealed optical head in which an inactive gas is enclosed, it is possible to prevent disadvantages, for example, that the light receiving portion for monitoring is oxidized since it is put in contact with an air or that its characteristics are degraded since it absorbs moisture, and to omit a space for installing the light receiving portion for monitoring from the optical pickup, so that an optical pickup can be downsized.

This configuration only requires an installation into a carriage of the optical head in which positioning between respective members is completed, with adjustments of a flyer and a rotational direction, and therefore a positioning process at assembling the optical pickup can be greatly simplified, so that the productivity of the optical pickup can be significantly increased.

Although the light receiving portion for monitoring is installed in both of the light receiving means 91 and the light receiving means 92 in this embodiment, it may be installed only one of the light receiving means 91 and 92. If it is so, as shown in the second embodiment, the same light receiving portion is used for monitoring whether it is during an operation of the high-density optical disk 18 or during an operation of the low-density optical disk 19. In other words, only one light receiving portion is required for monitoring, so as to decrease the number of the components.

In addition, light receiving means other than the light receiving means 91 and 92 may be mounted on almost the same plane as for the light receiving means 91 and 92, so as to be used as light receiving means for monitoring.

Further, although two light receiving means 91 and 92 are arranged as the light receiving means in this embodiment, all the light receiving means can be put together to be mounted on a single semiconductor substrate. If this configuration is applied, it is possible to decrease not only the number of the components of the light receiving means, but also the number of the positioning of the light receiving means, so as to achieve an optical pickup having a favorable productivity.

Next, a raised member formed in the light receiving means will be described.

On the top of the light receiving means 91 and 92, raised members 190 and 191 are mounted. These raised members 190 and 191 each having a shape of an almost rectangular parallelepiped are bonded on the light receiving means 91 and 92. Preferably these raised members 190 and 191 are made of materials easy to handle and having a strength to some extent such as metal or resin.

With these raised members 190 and 191 being mounted, it is possible to grasp and move the raised members 190 and 191 along the substrate portion 70a in relative positioning of the light receiving means 91 and 92 to the light sources 2 and 9, and therefore fine positioning of the light receiving means 91 and 92 can be easily performed. Accordingly, it is possible to perform relative positioning between the light source 2 or 9 and the light receiving means 91 or 92 more precisely, and therefore it is possible to suppress a degradation of signal characteristics caused by a deviation from a fixed position, which leads to actualizing a high-performance and very reliable optical pickup.

In this embodiment, at least one of the raised portions 190 and 191 is used as a supporting member of the first optical member 72. Now, this point will be described below.

In this embodiment, at least a part of the top of the raised members 190 and 191 is formed so as to have a height from the top of the substrate portion 70a at the same level as for the optical member mounting area which is arranged in at least one of the light source mounting portions 180 and 181 so that the first optical member 72 can be mounted thereon. In other words, the first optical member 72 is supported by at least one of the light source mounting portions 180 and 181 and at least one of the raised members 190 and 191 in this configuration.

With this configuration, relative positioning between the light source 2 or 9 and the light receiving means 91 or 92 can be performed more precisely, while an installation error of the first optical member 72, particularly a parallelism to the substrate portion 70a can be improved, and therefore an installation precision of the first optical member 72 can be further increased. Particularly, the first optical member 72 and the optical axis of the light emitted from the light source 2 or 9 can be made almost perpendicular to each other precisely, and therefore the characteristics of the light incident on the first optical member 72 can be favorably maintained and the light emitted from the first optical member 72 can be made incident in a predetermined position of the second optical member 86 precisely. Accordingly, it is possible to actualize a very reliable optical pickup having favorable optical characteristics.

Figure 17:
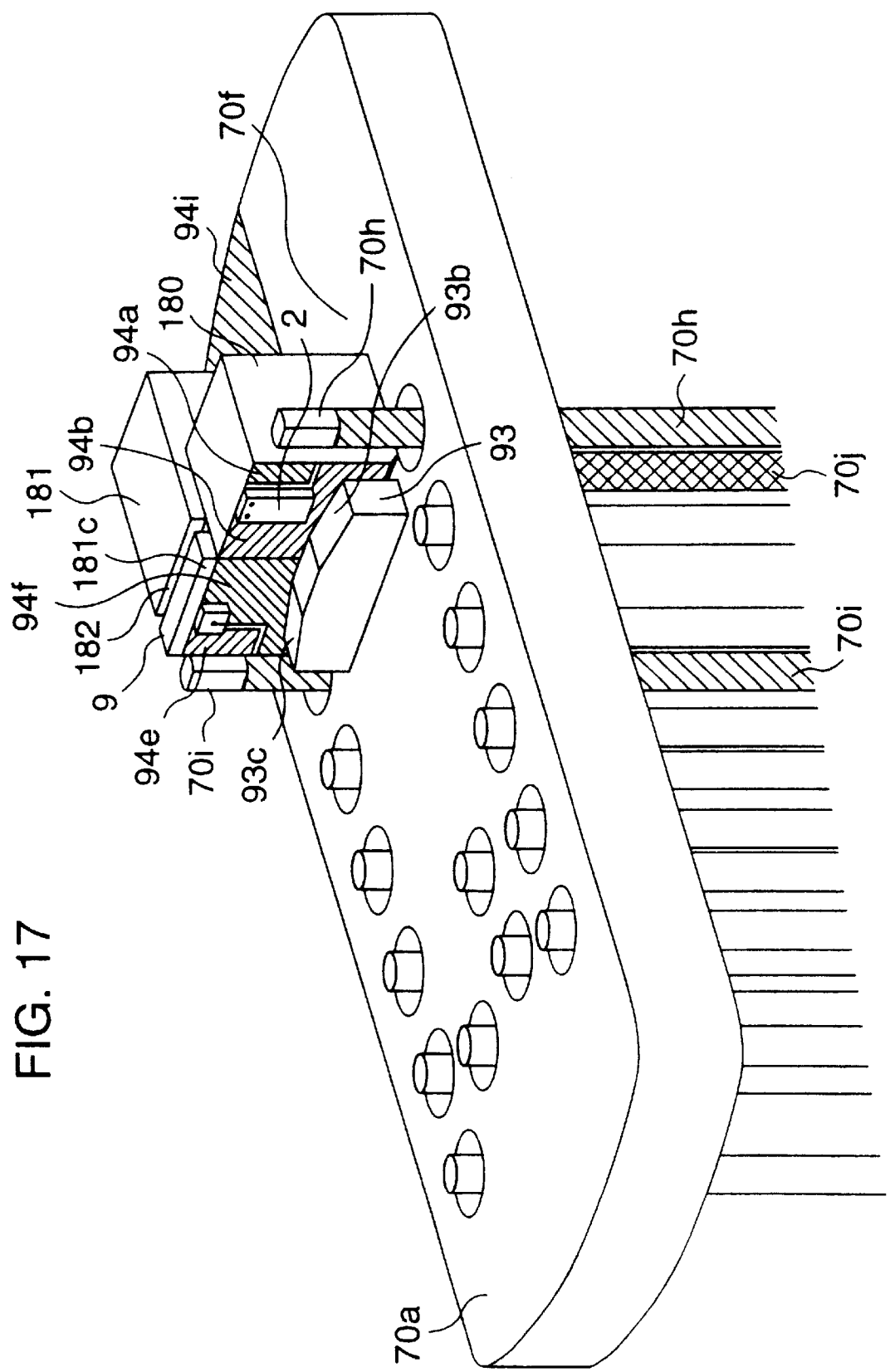
FIG. 17 is a perspective view of a peripheral portion of a light source mounting portion of the third embodiment according to the present invention.
Figure 18:
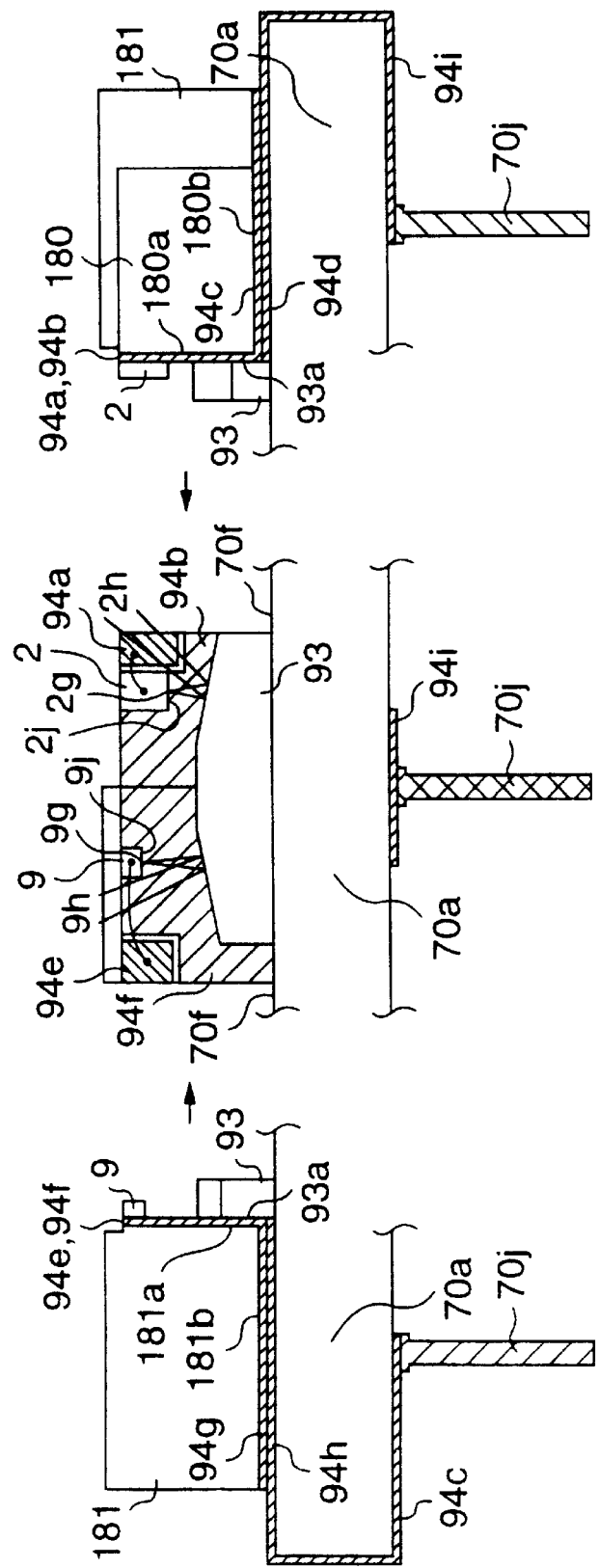
FIG. 18 is a cross section of the peripheral portion of the light source mounting portion of the third embodiment according to the present invention.

Next, the light source mounting portions 180 and 181 will be explained by using FIGS. 17 and 18. Referring to FIG. 17, there is shown a perspective view of a peripheral portion of the light source mounting portion of the third embodiment according to the present invention, and referring to FIG. 18, there is shown a cross section of the peripheral portion of the light source mounting portion of the third embodiment according to the present invention.

The top of the light source mounting portion 180 on which the light source 2 is mounted does not exist in the same plane as for the top of the light source mounting portion 181 on which the light source 9 is mounted. In other words, assuming that the light source mounting portions 180 and 181 exist in the same plane on the same substrate, the light source mounting portion 180 has a different height from that of the light source mounting portion 181. In this configuration, the first optical member 72 described later is mounted on the top of the higher light source mounting portion.

In this embodiment, the light source mounting portion 180 and the light source mounting portion 181 are mounted on the same substrate portion 70a, with the light source mounting portion 181 being formed higher than the light source mounting portion 180 and with the first optical member 72 being mounted on the top of the light source mounting portion 181, bonded each other.

With this configuration, only the top of the light source mounting portion 181 is required to be finished for bonding the first optical member 72, and therefore a process of surface grinding of the top of the light source mounting portion 180 can be omitted, so as to increase productivity.

In addition, in comparison with a configuration in which the first optical member 72 is mounted on each top of the light source mounting portions 180 and 181, it is possible to decrease the possibility of degrading the optical characteristics.

In other words, if the first optical member 72 is mounted on both of the tops of the light source mounting portions 180 and 181, the light source mounting portion 180 must have accurately the same height as for the light source mounting potion 181. If there were a minute difference between the height of the light source mounting portion 180 and that of the light source mounting portion 181, it causes a phenomenon that the first optical member 72 inclines at an angle according to the difference of the heights. This inclination of the first optical member 72 causes disadvantages, for example, that an aberration is generated in the light incident from the light source 2 or the light source 9, that optical characteristics to be originally given cannot be correctly provided, or that the light emitted from the first optical member 72 cannot be guided to a predetermined position.

To cope with these problems, in a configuration according to this embodiment, a mounting area for the first optical member 72 is one of the tops of the plurality of light source mounting portions, and therefore there is no inclination of the first optical member caused by a deviation of the heights between respective light source mounting portions, so that a predetermined workability of the first optical member 72 can be obtained by chamfering precisely the top of just one of the light source mounting portions. Accordingly, it is possible to achieve an optical pickup having superior performance without degradation of optical characteristics in a simple configuration.

Next, an arrangement of the light source mounting portions 180 and 181 on the substrate portion 70a will be explained with reference to the accompanying drawings.

The substrate portion 70a has a projection 93 and further the light source mounting portions 180 and 181 are put on a surface 70f of the substrate portion 70a. The mounting positions of the light source mounting portions 180 and 181 can be determined by bringing a side portion 93a of the projection 93 into contact with side portions 180a and 181a of the light source mounting portions 180 and 181 mounted on the surface 70f of the substrate portion 70a. In a lot of cases, the projection 93 has a shape of a rectangular parallelepiped. This projection 93 can be formed as a part of the substrate portion 70a or as a member separated from the substrate portion 70a.

Preferably, the side portion 93a of the projection 93 has the same angle of inclination in a contact position as for the side portions 180a and 181a of the light source mounting portions 180 and 181 so that they are precisely in contact with each other. Furthermore, preferably respective surfaces are processed so as to have an average surface degree of roughness of 10 $\mu$m or lower in grinding processing or the like since a precision of bonding between both sides can be improved. Similarly, the same processing is preferably applied to the surface 70f of the substrate portion 70 and the bottoms 180b and 181b of the light source mounting portions 180 and 181.

By using this configuration, it becomes possible to arrange components more easily and more precisely in predetermined positions of the light source mounting portions 180 and 181 on which the light sources 2 and 9 are mounted, whereby a high-performance optical pickup can be obtained with less degradation of the optical characteristics caused by a positional deviation of the light source 2 or 9.

As bonding material used for bonding the light source mounting portion 180 or 181 and the substrate portions 70a, preferably a metallic bonding material such as solder or optical hardening resin which is hardened by UV light or visible light is used since each of them has bonding power greater than a requested value so as to simplify a bonding process. Particularly, if a metallic bonding material is used, it is preferable to take measures so as to have favorable bonding effects, for example, by previously applying metallic plating to the surface 70f of the substrate portion 70a, the side 93a of the projection 93, the bottoms 180b and 181b of the light source mounting portions 180 and 181, and the sides 180a and 181a. The bonding material can be applied only to the side of the light source mounting portions 180 and 181 or only to the side of the substrate portion 70a (the projection 93), or it can be applied to both sides.

In addition, an angular portion made by the bottom 180b or 181b of the light source mounting portion 180 or 181 and the side 180a or 181a put in contact with the projection 93 preferably has a predetermined radius (R) or has a corner whose sharp edge is removed.

By using this configuration, it becomes possible to bond the light source mounting portions 180 and 181 to the substrate portion 70a in accurate positions even if the surface 70f of the substrate portion 70a and the side 180a of the projection 93 do not cross at right angles, and therefore the optical pickup has favorable recording or reproduction characteristics without any deviation from a predetermined optical axis of the light emitted from the light source 2 or 9 which is mounted on the light source mounting portions 180 and 181.

Furthermore, the light sources 2 and 9 mounted on the light source mounting portions 180 and 181 are favorably formed so as to face the projection 93 in the same manner as for the second embodiment, in other words, so as to form the projection 93 in an extending direction of the backward emitting light 2h from the light source 2 and the backward emitting light 9h from the light source 9.

In this embodiment, particularly it is preferable to form the light source mounting portion 181 at a higher position than the height of the light source mounting portion 180 and to put the first optical member 72 on the top of the light source mounting portion 181 with bonding. It will now be explained below.

In this embodiment, the light source 2 mounted on the light source mounting portion 180 is provided for recording or reproduction of the high-density optical disk, and the light source 9 mounted on the light source mounting portion 181 is provided for reproduction of the low-density optical disk.

Generally, a light source having a highly great output power (normally 25 nw or greater output) is used in recording on an optical disk, while reproduction on the optical disk does not need a light source having such great output power, but only requiring a light source of a several-mw class normally. Additionally in general, heat discharged from a light source is increased as the output power is increased.

In the configuration as shown in this embodiment in which the optical member is put on the top of the light source mounting portion, the heat discharged from this light source and transmitted via the light source mounting portion is easy to be a problem. Particularly the amount of the heat discharged from the light source 2 having a greater output is considerably high, and therefore there is a large difference between a temperature of the first optical member 72 at an active operation of the light source 2 and a temperature of the first optical member 72 at an inactive operation of the light source 2, which may cause disadvantages, for example, that the first optical member 72 cannot maintain the given optical characteristics due to a distortion of the first optical member 72 made of optical glass or that the first optical member 72 is broken since a bonded portion cracks due to a distortion on a bonded area between respective prisms of the first optical member 72 made of a plurality of laminated prisms.

To cope with this problem, in this embodiment, the light source mounting portion 181 on which the light source 9 is mounted is formed in a position higher than the light source mounting portion 180 on which the light source 2 is mounted with the first optical member 72 mounted on the top of the higher light source mounting portion 181 so as to prevent the heat generated by the light source 2 from being conducted to the first optical member 72 via the light source mounting portion 180 in order to suppress an occurrence of the above described disadvantages.

Even if a light source having a great output power is installed in the optical pickup, it is also effective to minimize the disadvantages caused by effects of the heat generated by the light source, so as to actualize a high-performance and very reliable optical pickup having stable optical characteristics.

As described above, the first optical member 72 is mounted on the top of the light source mounting portion 181. As bonding material used for bonding between the first optical member 72 and the light source mounting portion 181, it is preferable to use previously printed glass bonding material, epoxy resin, or optical hardening resin. Particularly, the optical hardening resin has favorable workability since it is not hardened until it is irradiated with light and has strong bonding power, and therefore it is optimum for bonding of the first optical member 72 which requires accurate positioning. In the optical hardening resin, it is more preferable to use visible light or UV light hardening resin to which light having high energy can be applied and which can be solidified in relatively short time since it is effective to increase the productivity due to a reduction of the work time.

In addition, a recess portion arranged in this embodiment is described below.

In an angular portion formed by the light source mounting area and the top of the light source mounting portion 181, a recess portion 182 is formed having a function of holding bonding material which overflows the bonded area between the first optical member 72 and the light source mounting potion 181 at bonding.

With this recess portion 182 formed on the top of the light source mounting portion 181, it is possible to prevent the bonding material which overflows at the bonding of the first optical member 72 to the light source mounting potion 181 from overflowing into a light incident area of the first optical member 72, so as to prevent degradation of the optical characteristics caused by an overflow of the bonding material which has been a conventional problem. Accordingly, it is possible to actualize an optical pickup having favorable optical characteristics.

Furthermore, it is preferable to have a distribution that the bonding material applied to the top of the light source mounting portion 181 and to the bottom of the first optical member 72 is applied less in the side of the light source and more in the opposite side, assuming that the applied area is divided into two portions which are both sides of the recess portion 182. The bonding in this manner is effective to apply the bonding material enough to maintain a sufficient bonding power while minimizing the overflow of the bonding material, and therefore the reliability of the optical pickup can be enhanced in addition to the improvement of the optical characteristics of the optical pickup.

This configuration exerts a great effect when the optical member must be arranged at a position close to the light source. In other words, as shown in this embodiment, if the light source mounting potion serves as an area in which both of the optical member and the light source are mounted, the light from the light source passes almost touching the bonded area between the light source mounting portion and the first optical member taking into consideration an extent of the light emitted from the light source since the light source is generally very thin. Therefore, such an overflow of the bonding material in this area degrades the optical characteristics significantly.

Still further, the light which originally cannot be guided to the disk existing outside the predetermined optical path is not reflected nor scattered by the overflow of the bonding material, and therefore this configuration is effective to decrease a possibility significantly that this kind of light is included into the predetermined optical path to be stray light.

Although the recess portion 182 has a slot almost in parallel with the side 181*c* at an end to the side 181*c* of the top of the light source mounting portion 181 in this embodiment, the angular portion made by the side 181*c* and the top of the light source mounting portion 181 can be cut out in a rectangular shape or be tapered.

In addition, although the recess portion is arranged in one of the light source mounting portions in this embodiment, it is preferable to arrange recess portions in both of the light source mounting portions if they have the same height.

Next, a method of supplying power to the light sources 2 and 9 will be described below.

On the surface 180*a* of the light source mounting portion 180, the electrode 94*a* and the electrode 94*b* are arranged apart from each other.

The electrode 94*a* is connected to a power supply terminal 70*h* for supplying power to the light source 2 in a wire bonding or other method and also to a surface in the anode side of the light source 2 in the wire bonding or other method so as to supply power to the light source 2.

In addition, the electrode 94*b* is arranged apart from the electrode 94*a*. The light source 2 is mounted on the top of it so that the electrode 94*b* is in contact with the surface in the cathode side of the light source 2 so as to serve as a ground of the light source 2.

On the area opposing to the substrate portion 70*a* of the light source mounting portion 180, the electrode 94*c* is formed. The electrode 94*c* is connected to the electrode 94*b*, and the light source mounting portion 181 is put in contact with an electrode 94d formed on the substrate 70a when it is installed in the substrate portion 70a.

In the side of the area 181a of the light source mounting portion 181, the electrode 94c and an electrode 94f are formed, and further in the side of the area opposing to the substrate portion 70a of the light source mounting portion 181, an electrode 94g is formed.

An electrode 94e is connected to a power supply terminal 70i for supplying power to the light source 9 in a wire bonding or other method and also to a surface in the anode side of the light source 9 in the wire bonding or other method so as to supply power to the light source 9.

In addition, the electrode 94f is arranged apart from the electrode 94c and electrically connected with the electrode 94g, and the light source 9 is mounted on it. The electrode 94f is in contact with the surface in the cathode side of the light source 9 so as to serve as a ground of the light source 9.

On the area opposing to the substrate portion 70a of the light source mounting portion 181, the electrode 94h is formed. The electrode 94h is connected to the electrode 94g, and the light source mounting portion 181 is put in contact with an electrode 94d formed on the substrate 70a when it is installed in the substrate portion 70a.

The electrode 94d can be monolithically integrated with the electrode 94h.

Then, how to ground the optical pickup will be explained below. In this embodiment, the substrate portion 70a is made of a metallic, resin, ceramic or other insulating material, having a shape of a plate. Particularly, the metallic or ceramic material is preferable since they have favorable heat dissipation characteristics so as to dissipate the heat transmitted from the light sources efficiently.

Now an embodiment will be described below in which the substrate portion 70a is made of an insulating material. In this embodiment, the substrate portion 70a has a hole through which the terminal 70c passes to be arranged and the electrode 94i to be a ground for the light sources 2 and 9. This electrode 94i is electrically connected to the electrode 94d and 94h. Then, the electrode 94i passes from the surface (front) in the side of the area in which the light source mounting portion of the substrate portion 70a is mounted, through the side of the substrate portion 70a, to the surface (bottom) in the opposite side of the area in which the light source mounting portion of the substrate portion 70a is mounted, and is connected to a ground terminal 70j at the bottom.

Although the light sources 2 and 9 are connected to the ground terminal 70j via the electrode 94d which passes around the substrate portion 70a in this embodiment, a hole for the ground terminal 70j may be arranged on the substrate portion 70a in the same manner as for the second embodiment, so that the ground terminal 70j passes through the substrate portion 70a and then the terminal passing through the hole may be connected to the electrode mounted on the substrate portion or the light source mounting portion in a wire bonding or soldering method.

If the substrate portion 70a is made of a metallic material, with the entire substrate portion 70a used as a ground, the ground terminal 70j connected to the bottom of the substrate portion 70a may be connected to the electrode 94i of the substrate portion 70a via the substrate portion 70a.

In either case, the ground terminal 70j is arranged in the front of the substrate portion 70a through the hole, and it may be electrically connected with the electrode 94i.

As described above, with electrodes for a ground of the plurality of light sources arranged in common, only one ground terminal 70j is required so as to decrease the number of the terminals. It is effective to relieve the problems such as an increase of the number of terminals which has conventionally occurred in the optical head containing a plurality of light sources in a single package and restrictions on an arrangement of terminals in a package substrate, so as to increase a degree of freedom in designing an optical head in which a plurality of light sources are arranged in a single package.

Further, if a single light source mounting portion corresponds to a single light source with each electrode for a ground arranged in the light source mounting portions individually as described in this embodiment, this configuration is favorable since ground terminals need not be arranged for respective ground electrodes separated from each other, in other words, by the number of the light source mounting portions, whereby the number of the ground terminals can be decreased effectively.

Still further, with the configuration in which the light sources 2 and 9 directly are put on the electrodes and the electrodes are in contact with the ground terminal, it does not need to have a process of connecting the electrodes to the light sources by means of connection means for wire bonding, and therefore the number of manufacturing processes of the optical head can be decreased so as to improve the productivity of the optical head.

Next, it is preferable to seal the inside space enclosed by the package 70, in other words, the space in which the light sources 2 and 9 and the light receiving means are arranged. This configuration is effective to prevent impurities such as dust or moisture from being included into the inside of the package, whereby the performances of the light sources 2 and 9 and the light receiving means can be maintained and it is possible to prevent a degradation of the optical characteristics of the emitted light.

In this embodiment, the package 70 is sealed by the second optical member 86. In other words, the bottom of the first substrate 86a of the second optical member 86 is bonded to the outer surface of the sidewall portion 70b of the package 70 so as to close the opening 70d arranged on the package 70. As bonding materials for this connection, optical hardening resin, epoxy resin, or bonding glass is often used.

It is preferable to enclose an inactive gas such as N2 gas, a dry air, or Ar gas in the sealed space since it is effective to prevent a degradation of various optical characteristics caused by moisture condensation on the surfaces of the first optical member 72 in the package 70 or a degradation of the characteristics caused by an oxidation of the light sources or the light receiving means.

Similarly, the configuration, in which the second optical member is bonded to the sidewall portion 70b of the package 70 by using the bonding material so as to seal the package 70, does not need a cover glass which has been conventionally used only in order to close this portion and it can be omitted here, and therefore the configuration of the optical pickup can be simplified so as to decrease the number of components. In addition, although the manufacturing of an optical pickup conventionally requires two processes in total, a process in which optical members are bonded with positioning and a process in which a cover member for closing a package is bonded, it is possible to reduce the manufacturing processes of the optical pickup from the above two processes to the former single process, and therefore the manufacturing process of the optical pickup can be simplified so as to increase the productivity of the optical pickup.

In addition, since the second optical member 86 is exposed to the outside of the package 70, the package can be downsized in comparison with a configuration in which it is contained in the package and the number of the inclined planes in the optical member can be significantly decreased in comparison with a configuration in which required optical elements are formed in a single optical member, and therefore the size of the optical pickup can be significantly reduced particularly in the width direction, whereby it is possible to further downsize an optical pickup so as to increase an efficiency of utilizing a space of the optical pickup.

Furthermore, almost all of the required optical systems are mounted in a single head with the optical member separated into two parts, whereby the pickup assembly process can be significantly simplified so as to achieve a user-friendly optical pickup.

In the second optical member 86, there is not arranged any optical elements in an area exposed to the outside, and therefore it is possible to prevent an occurrence of disadvantages, for example, that given performances cannot be maintained since the optical elements are exposed to the surrounding air and absorbs moisture or that the characteristics are degraded due to dust on the optical elements.

At this point, the inside pressure of the package 70 is preferably negative. It is effective to make the bonding effects favorable between the second optical member 86 and the package 70 since a force is applied in a direction in which the second optical member 86 bonded to the sidewall portion 70*b* of the package 70 is pulled from the outside of the package toward the inside of the package 70.

Next, an embodiment having further favorable configuration will be described.

In this configuration, the package 70 is not closed only by the second optical member 86 from the outside, but the shield member 86 and the second optical member 86 are used to close the opening 70*d* of the package 70. In other words, the shield member 85 is put so as to close the opening 70*d* on the sidewall portion 70*b* of the package 70 from the inside of the package 70, and the second optical member 86 is put so as to close the opening 70*d* on the sidewall portion 70*b* of the package 70 from the outside of the package 70, so as to seal the inside space of the package 70 by using these two members.

Advantages of this configuration will be explained below. The shield member 85 bonded from the inside is pressed to the sidewall portion 70*b* including the bonding material if the inside pressure of the package 70 is positive, and therefore it is possible to decrease a possibility that a leak will occur. If the inside pressure of the package 70 is negative, however, a pressure is applied in such a direction that the shield member is distant from the sidewall portion 70*b*, and therefore it increases a possibility that a leak will occur due to defective bonding.

To the contrary, the second optical member 86 bonded from the outside is pressed to the sidewall portion 70*b* including the bonding material if the inside pressure of the package 70 is negative as opposite to the shield member 85, which is effective to decrease a possibility that a leak will occur, but if the inside pressure of the package 70 is positive, the pressure is applied in such a direction that the second optical member 86 is distant from the sidewall portion 70*b*, which increases a possibility that a leak will occur due to defective bonding.

In other words, with the shield member 85 and the second optical member 86 arranged so that the sidewall portion 70*b* of the package 70 is put between them, a pressure is applied in such a direction that at least one of the shield member 85 and the second optical member 86 is pressed to the sidewall portion 70*b* whether the inside pressure of the package 70 is positive or negative, and therefore it becomes possible to reduce occurrences of a leak caused by a difference of atmospheric pressure or defective bonding.

With this configuration, the air-tightness of the inside of the package 70 can be improved, whereby it becomes possible to prevent an occurrence of disadvantages caused by a condition that any of the light sources, the light receiving elements, or the optical members arranged inside the package 70 is put in contact with the air or includes moisture, which leads to achieving a very reliable optical pickup.

For the material of the shield member 85, it is preferable to use a material having favorable transparency such as resin or glass which does not decrease an efficiency of utilizing light. In addition, a thinner shield member is preferable to an extent that it does not cause any problem of its strength since it is effective to minimize an expansion of a diameter of the light.

Furthermore, the bonding power of the shield member 85 to the sidewall portion 70*b* is preferably different from that of the second optical member 86 to the sidewall portion 70*b*. Particularly, with the bonding power of the shield member 85 directly facing the inside of the package 70 to the sidewall portion being greater than that of the second optical member 86, a leak between the second optical member 86 and the sidewall portion 70*b* is inhibited to reach the inside of the package 70 even if such a leak may occur. It is effective to largely decrease a possibility of an occurrence of a leak into the inside of the package 70. As a means for realizing this configuration, there may be provided a method of using a bonding material having a greater bonding power for the bonding between the shield member 85 and the sidewall portion 70*b* in comparison with that of the bonding material used for the bonding between the second optical member 86 and the sidewall portion 70*b*.

Still further, preferably a difference of a pressure is as small as possible between a space A enclosed by the package 70 and the shield member 85 and a space B enclosed by the sidewall portion 70*b*, the shield member 85, and the second optical member 86. A pressure is always applied to the shield member 85 between the space A and the space B due to a difference of a pressure between the space A and the space B. If a vibration caused by hand carriage or car mounting of the product is entered into the shield member 85 in this condition, the shield member 85 significantly vibrates or is deflected and it may change minutely an angle of incidence formed by an incident light and the shield member 85, and it may further lead to a degradation of optical characteristics. Additionally, the difference of the pressures may cause deformation of the shield member 85, by which an aberration will be generated so as to degrade the optical characteristics.

From this viewpoint, the difference of the pressure (P) is preferably as small as possible between the space A and the space B. In this embodiment, unlike the first embodiment, specifically P is preferably 0.25 (atm) or lower since the opening is relatively large out of necessity for a plurality of optical paths in the opening.

In this manner, it is possible to prevent a degradation of the optical characteristics caused by a difference of the pressure between the space A and the space B.

Next, an operation of the optical pickup having these configurations will be explained.

If the record medium is the high-density optical disk 18, light is emitted from the light source 2 for recording or reproducing information. In this case, the light emitted from the light source 2 is first reflected by the reflection film 73 formed on the first inclined plane 72a on the first optical member 72 and then incident on the polarizing separation film 75 formed on the second inclined plane 72b. This polarizing separation film 75 reflects a linear polarization emitted from the light source 2 and transmits light in a polarization direction which crosses at right angles with it, and therefore the light emitted from the light source 2 is reflected.

Afterward, the light emitted from the first optical member 72 is transmitted through the shield member 85, transmitted through the first substrate 86a of the second optical member 86, and further transmitted through the filter 89 formed on the second inclined plane 86e of the second substrate 86b of the second optical member 86, and then emitted from the second optical member 86 and incident on the quarter-wavelength plate 90. The light incident on the quarter-wavelength plate 90 is converted from the linear polarization to an elliptic polarization in its polarization direction and then emitted from the quarter-wavelength plate 90.

Afterward, if there is a collimator lens, the light emitted from the light source 2 passes through the collimator lens 16 and is converted to almost parallel light before it is incident on the condenser 17, and otherwise, it is directly incident on the condenser 17, and then the light is converged to the high-density optical disk 18.

Returning light which has been reflected by the high-density optical disk 18 is incident on the quarter-wavelength plate 90 again. This light has a rotational direction of the elliptic polarization which is opposite to that of the incidence when it is reflected by the high-density optical disk 18, and therefore when passing through the quarter-wavelength plate 90, it is converted from the elliptic polarization to the linear polarization which crosses at almost right angles with the polarization direction of the light emitted from the light source 2. In other words, assuming that the light is emitted from the light source 2 in an S polarization, it is incident on the optical member in a P polarization.

The light which has passed through the quarter-wavelength plate 90 is incident on the second optical member 86, transmitted through the filter 89 on the second inclined plane 86e of the second substrate 86b almost completely, emitted from the second optical member 86, further transmitted through the shield member 85, and incident on the first optical member 72.

Then the light is incident on the polarizing separation film 75 on the second inclined plane 72b of the first optical member 72. The incident light is directed so as to cross at right angles with the emitted light in its polarization direction, and therefore the light is transmitted through the polarizing separation film 75 almost completely and then incident on the optical path dividing means 83 on the third inclined plane 72c of the first optical member 72. This optical path dividing means 83 transmits almost a half of the incident light and reflects another half of the incident light.

After that, the light transmitted by the optical path dividing means 83 is directly formed in a luminous flux having a predetermined shape in the light receiving portion arranged in a predetermined position of the light receiving means 91 under the first optical member 72, so as to be provided for generating signals according to purposes.

The light reflected by the optical path dividing means 83 is reflected by the reflection film 81 on the second inclined plane 72b of the first optical member 72 and then formed in luminous flux having a predetermined shape in the predetermined light receiving portion in the light receiving means 91, so as to be provided for generating signals according to purposes.

If the record medium is the low-density optical disk 19, light is emitted from the light source 9 for recording or reproducing information. In this case, the light emitted from the light source 9 is first reflected by the reflection film 74 formed on the first inclined plane 72a of the first optical member 72 and then incident on the polarizing separation film 76 formed on the second inclined plane 72b. This polarizing separation film 76 reflects a linear polarization emitted from the light source 9 and transmits light in a polarization direction which crosses at right angles with it, and therefore the light emitted from the light source 9 is reflected.

Afterward, the light emitted from the first optical member 72 is incident on the diffusion angle converting means 87 which is formed on the lower end surface of the first substrate 86a of the second optical member 86. By this diffusion angle converting means 87, the diffusion angle of the light emitted from the light source 9 is converted so that the diffused light is converted to converged light and then emitted from the second substrate 86b, further the light is incident on the means for forming a plurality of beams 88 on the first inclined plane 86d of the second substrate 86b of the second optical member 86, transmitted through the polarizing separation film 88a, separated to a single main beam and two side beams when being reflected by the beam separating portion 88b, and then incident on the filter 89 on the second inclined plane 86e. This filter 89 has functions to reflect light emitted from the light source 9 and to transmit light emitted from the light source 2, and therefore the light incident on the filter 89 from the means for forming a plurality of beams 88 is reflected almost completely and then emitted from the second optical member 86.

Afterward, the light emitted from the light source 9 is incident on the quarter-wavelength plate 90. The light incident on the quarter-wavelength plate 90 is converted from the linear polarization to an elliptic polarization in its polarization direction and then emitted from the quarter-wavelength plate 90.

Subsequently, if there is a collimator lens, the light emitted from the light source 9 passes through the collimater lens 16 and is converted to light having a smaller diffusion angle before it is incident on the condenser 17, and otherwise, it is directly incident on the condenser 17, and then the light is converged to the high-density optical disk 18.

Returning light which has been reflected by the low-density optical disk 19 is incident on the quarter-wavelength plate 90 again. This light has a rotational direction of the elliptic polarization which is opposite to that of the incidence when it is reflected by the low-density optical disk 19, and therefore when passing through the quarter-wavelength plate 90, it is converted from the elliptic polarization to the linear polarization which crosses at almost right angles with the polarization direction of the light emitted from the light source 9. In other words, assuming that the light is emitted from the light source 9 in an S polarization, it is incident on the optical member in a P polarization.

The light which has passed through the quarter-wavelength plate 90 is incident on the second optical member 86, reflected by the filter 89 on the second inclined plane 86e of the second substrate 86b almost completely, and then incident on the means for forming a plurality of beams 88 on the first inclined plane 86d. In this case, the incident light is directed so as to cross at almost right angles with the emitted light in its polarization direction, and therefore the incident light is reflected by the polarizing separation film 88a without being incident on the beam separating portion 88b almost at all, emitted from the second substrate 86b, and then incident on the diffusion angle converting means 87 on the first substrate 86a.

The light incident as a diffused light on the diffusion angle converting means 87 is converted to converged light with a conversion of the diffusion angle, and then emitted from the second optical member 86, further transmitted through the shield member 85, and then incident on the first optical member 72.

Then the light is incident on the polarizing separation film 76 on the second inclined plane 72b of the first optical member 72. The incident light is directed so as to cross at right angles with the emitted light in its polarization direction, and therefore the light is transmitted through the polarizing separation film 76 almost completely and then incident on the optical path dividing means 84 on the third inclined plane 72c. This optical path dividing means 84 transmits almost half of the incident light and reflects another half of the incident light.

After that, the light transmitted by the optical path dividing means 84 is directly formed into a luminous flux having a predetermined shape in the light receiving portion arranged in a predetermined position of the light receiving means 92 under the fourth optical member, so as to be provided for generating signals according to purposes.

The light reflected by the optical path dividing means 84 is reflected by the reflection film 82 on the second inclined plane 72b and then formed into luminous flux having a predetermined shape in the predetermined light receiving portion in the light receiving means 92, so as to be provided for generating signals according to purposes.

As set forth hereinabove, also when a plurality of light sources are arranged in an identical package, the light emitted from respective light sources has a great wavefront aberration in the same manner as for the second embodiment in many cases, and accordingly an optimization is performed for a distance between the luminous point 2a or 9a of the light source 2 or 9 and the lens. The concept is, however, the same as for the second embodiment, and therefore the explanation is omitted here.

What is claimed is:

1. An optical pickup device for recording information onto and/or reading out information from an optical recording medium that is positioned at a recording medium positioning area of an optical recording and/or reproducing apparatus, said device comprising:

a first light beam source for emitting a first light beam to impinge upon and be reflected by a recording medium positioned at the recording medium positioning area, a second light beam source for emitting a second light beam to impinge upon and be reflected by a recording medium positioned at the recording medium positioning area, a light beam detector for receiving at least one of the first and second light beams after being reflected by a recording medium at the recording medium positioning area so that the information is read from the at least one of the first and second light beams after being reflected, a light beam diameter changing rate adjusting member to adjust a changing rate of a diameter of either of the first and second light beams, wherein the light beam diameter changing rate adjusting member has an exposed surface through which the either of the first and second light beams passes, and a refractive index of a substance contacting the exposed surface is smaller than that of the light beam diameter changing rate adjusting member.

2. An optical pickup device according to claim 1, wherein a difference in refractive index between the substance and the light beam diameter changing rate adjusting member is not less than 0.35 to 0.5.

3. An optical pickup device according to claim 1, wherein said optical pickup device further comprises an objective element for condensing the first and second light beams at separate times.

4. An optical pickup device for recording information onto and/or reading out information from an optical recording medium that is positioned at a recording medium positioning area of an optical recording and/or reproducing apparatus, said device comprising:

a first light beam source for emitting a first light beam to impinge upon and be reflected by a recording medium positioned at the recording medium positioning area, a second light beam source for emitting a second light beam to impinge upon and be reflected by a recording medium positioned at the recording medium positioning area, a light beam detector for receiving at least one of the first and second light beams after being reflected by a recording medium at the recording medium positioning area so that the information is read from the at least one of the first and second light beams after being reflected, a container housing therein the first and second light beam sources and the light beam detector and including an aperture through which the first and second light beams proceed at separate times, and a light beam guide member mounted on an outer surface of the container and covering the aperture to guide the first and second light beams such that the first and second light beams proceed, at separate times, toward the recording medium positioning area and the at least one of the first and second light beams, after being reflected, is received by the light beam detector.

5. An optical pickup device according to claim 4, wherein the container is hermetically sealed by the light beam guide member.

6. An optical pickup device according to claim 2, further comprising an electrically grounded member to which both of the first and second light sources are electrically connected.

7. An optical pickup device according to claim 6, wherein the electrically grounded member is mounted on the container.

8. An optical pickup device according to claim 2, wherein the light beam detector detects either of the first and second light beams on a common plane.

9. An optical pickup device according to claim 8, wherein a position on the common plane detecting the first light beam is different from another position on the common plane detecting the second light beam.

10. An optical pickup device according to claim 8, wherein the common plane is arranged in the container.

11. An optical pickup device according to claim 2, further comprising a first light beam source base on which the first light beam source is mounted, and a second light beam source base on which the second light beam source is mounted, wherein a power of the first light beam is larger than that of the second light beam, and a heat energy absorption value of the first light beam source base is larger than that of the second light beam source base.

12. An optical pickup device according to claim 11, wherein a volume of the first light beam source base is larger than that of the second light beam source base.

13. An optical pickup device according to claim 11, wherein a surface area of the first light beam source base is larger than that of the second light beam source base.

14. An optical pickup device according to claim 11, wherein a heat energy transmission rate from the first light beam source base is larger than a heat energy transmission rate from the second light beam source base.

15. An optical pickup device according to claim 11, wherein a radiant heat energy rate from the first light beam source base is larger than a radiant heat energy rate from the second light beam source base.

16. An optical pickup device according to claim 2, further comprising a first light beam source base on which the first light beam source is mounted, and a second light beam source base on which the second light beam source is mounted, wherein a power of the first light beam is larger than that of the second light beam, and a distance is formed at least partially between surfaces of the first and second light beam source bases opposed to each other.

17. An optical pickup device according to claim 16, wherein a contact area is formed partially between the surfaces of the first and second light beam source bases opposed to each other.

18. An optical pickup device according to claim 2, further comprising an objective for focusing either of the first and second light beams, and a chromatic aberration compensating member arranged between at least one of the first and second light beam sources and the objective to perform a chromatic aberration compensation for the light beam from the at least one of the first and second light beam sources.

19. An optical pickup device according to claim 18, wherein the chromatic aberration compensating member is a hologram.

20. An optical pickup device according to claim 18, wherein the chromatic aberration compensating member arranged between one of the first and second light beam sources and the objective.

21. An optical pickup device according to claim 18, wherein a chromatic aberration compensating degree for the first light beam is different from a chromatic aberration compensating degree for the second light beam.

22. An optical pickup device according to claim 4, further comprising an objective element for focusing the light beams on the recording medium positioning area, and a chromatic aberration compensating member arranged between the light sources and the objective element to perform a chromatic aberration compensation for the light beams from the light sources.

23. An optical pickup device according to claim 4, wherein said optical pickup device further comprises an objective element for condensing the first and second light beams at separate times.

24. An optical pickup device for recording information onto and/or reading out information from an optical recording medium that is positioned at a recording medium positioning area of an optical recording and/or reproducing apparatus, said device comprising:

a first light beam source for emitting a first light beam to impinge upon and be reflected by a recording medium positioned at the recording medium positioning area, a second light beam source for emitting a second light beam to impinge upon and be reflected by a recording medium positioned at the recording medium positioning area, a light beam detector for receiving at least one of the first and second light beams after being reflected by a recording medium at the recording medium positioning area so that the information is read from the at least one of the first and second light beams after being reflected, a first light beam source base on which the first light beam source is mounted, a second light beam source base on which the second light beam source is mounted, and an optical treating member for receiving either of the first and second light beams so that at least one of a light beam diameter, a proceeding course, a light beam diameter changing rate, a polarization and a chromatic aberration of the either of the first and second light beams is changed, and the optical treating member is mounting on one of the first and second light beam source bases and is prevented from being supported on another one of the first and second light beam source bases.

25. An optical pickup device according to claim 24, wherein said optical pickup device further comprises an objective element for condensing the first and second light beams at separate times.

26. An optical pickup device for recording information onto and/or reading out information from an optical recording medium, said device comprising:

a light beam source for emitting a light beam for impinging upon and being reflected by an optical recording medium, a light beam detector for receiving the light beam after being reflected by the recording medium so that the information is read from the light beam after being reflected, a container housing therein the light beam source and the light beam detector and including an aperture through which the light beam proceeds toward the recording medium and proceeds to the light beam detector after being reflected by the recording medium, and a light beam guide member mounted on an outer surface of the container and covering the aperture to guide the light beam in such a manner that the light beam proceeds toward the recording medium and is received by the light beam detector after being reflected by the recording medium, wherein the light beam guide member includes an inclined surface and an optical element positioned on the inclined surface to change a proceeding direction of the light beam.

27. An optical pickup device according to claim 26, further comprising a shield member arranged on the container and covering the aperture at an opposite side to the light beam guide member.

28. An optical pickup device according to claim 27, wherein a difference between a gaseous pressure in the aperture and a gaseous pressure surrounding the light beam source and the light beam detector is not more than 0.3 atm.

29. An optical pickup device according to claim 26, further comprising an objective element for focusing the light beam on the recording medium, and a chromatic aberration compensating member arranged between the light source and the objective element to perform a chromatic aberration compensation for the light beam from the light source.

30. An optical pickup device for recording information onto and/or reading out information from an optical recording medium that is positioned at a recording medium positioning area of an optical recording and/or reproducing apparatus, said device comprising:

a first light beam source for emitting a first light beam to impinge upon and be reflected by a recording medium positioned at the recording medium positioning area, a second light beam source for emitting a second light beam to impinge upon and be reflected by a recording medium positioned at the recording medium positioning area, a light beam detector for receiving at least one of the first and second light beams after being reflected by a recording medium at the recording medium positioning area so that the information is read from the at least one of the first and second light beams after being reflected, a first light beam source base on which the first light beam source is mounted, a second light beam source base on which the second light beam source is mounted, and an optical treating member for receiving either of the first and second light beams so that at least one of a light beam diameter, a proceeding course, a light beam diameter changing rate, a polarization and a chromatic aberration of the either of the first and second light beams is changed, a power of the first light beam is larger than that of the second light beam, wherein the optical treating member is mounted on the second light beam source base.

31. An optical pickup device according to claim 30, wherein the optical treating member is prevented from being supported on the first light beam source base.

32. An optical pickup device according to claim 30, wherein said optical pickup device further comprises an objective element for condensing the first and second light beams at separate times.

33. An optical pickup device for recording information onto and/or reading out information from an optical recording medium, said device comprising:

a light beam source for emitting a first light beam to impinge upon and be reflected by the optical recording medium, a light beam source base on which the light beam source is mounted, a light beam detector arranged to receive the light beam after being reflected by the recording medium so that the information is read from the light beam after being reflected, and a light beam guide member for guiding the light beam in such a manner that the light beam proceeds toward the recording medium and is received by the light beam detector after being reflected by the recording medium, wherein the light beam guide member and the light beam source base have respective contact surfaces through which the light beam guide member and the light beam source base are fixed to each other, the contact surface of at least one of the light beam guide member and the light beam source base is divided into at least two contact surface areas, and the at least one of the light beam guide member and the light beam source base has a recess between said at least two contact surface areas.

34. An optical pickup device according to claim 33, the light beam source has the recess.

35. An optical pickup device for recording information onto and/or reading out information from an optical recording medium that is positioned at a recording medium positioning area of an optical recording and/or reproducing apparatus, said device comprising:

a first light beam source for emitting a first light beam to impinge upon and be reflected by an optical recording medium positioned at the recording medium positioning area, a second light beam source for emitting a second light beam to impinge upon and be reflected by an optical recording medium positioned at the recording medium positioning area, a light beam detector for receiving at least one of the first and second light beams after being reflected by the optical recording medium at the recording medium positioning area so that the information is read from the at least one of the first and second light beams after being reflected by the optical recording medium, a container housing the first and second light beam sources and the light beam detector and including an aperture through which the first and second light beams proceed, at separate times, toward the optical recording medium and to the light beam detector after being reflected by the optical recording medium, and a light beam guide member (i) including an inclined surface and an optical element disposed on the inclined surface to change a proceeding direction of either of the first and second light beams, (ii) mounted onto an outer surface of the container, and (ii) covering the aperture to guide the first and second light beams, in such a manner that the either of the first and second light beams proceed, at separate times, toward the optical recording medium and the at least one of the first and second light beams after being reflected by the optical recording medium is received by the light beam detector.

36. An optical pickup device according to claim 35, further comprising an objective element disposed between the light beam guide member and the recording medium positioning area to focus the either of the first and second light beams.

37. An optical pickup device according to claim 35, further comprising an objective element for focusing the light beams on the recording medium positioning area, and a chromatic aberration compensating member arranged between the light sources and the objective element to perform a chromatic aberration compensation for the light beams from the light sources.

38. An optical pickup device according to claim 35, wherein said optical pickup device further comprises an objective element for condensing the first and second light beams at separate times.

39. An optical pickup device for recording information onto and/or reading out information from an optical recording medium that is positioned at a recording medium positioning area of an optical recording and/or reproducing apparatus, said device comprising:

a first light beam source for emitting a first light beam to impinge upon and be reflected by the optical recording medium, and a second light beam source for emitting a second light beam to impinge upon and be reflected by the recording medium, an objective element for focusing the first and second light beams on the recording medium, and a ratio of (i) a length along a light beam axis of the second light beam between the second light beam source and the objective and (ii) a length along a light beam axis of the first light beam between the first light beam source and the objective is between 0.50 and 0.75.

40. An optical pickup device according to claim 39, wherein a wavelength of the second light beam is longer than that of the first light beam.

41. An optical pickup device according to claim 39, further comprising a chromatic aberration compensating member arranged between at least one of the first and second light beam sources and the objective to perform a chromatic aberration compensation for the light beam from the at least one of the first and second light beam sources.

42. An optical pickup device according to claim 39, further comprising a light beam guide arranged between at least one of the first and second light beam sources and the objective to receive at least one of the first and second light beams so that the light beam guide guides the at least one of the first and second light beams in such a manner that either of the first and second light beams proceeds along a substantially-common-single light beam axis extending toward the recording medium positioning area.

43. An optical pickup device according to claim 39, wherein the first light beam proceeds substantially straight from the first light beam source to the objective element, and the second light beam is bent at least once between the first light beam source and the objective element.

44. An optical pickup device for recording information onto and/or reading out information from an optical recording medium that is positioned at a recording medium positioning area of an optical recording and/or reproducing apparatus, said device comprising:

a first light beam source for emitting a first light beam to impinge upon and be reflected by the optical recording medium, and a second light beam source for emitting a second light beam to impinge upon and be reflected by the recording medium, wherein the optical pickup device further comprises a collimator element for forming parallel rays of the first and second light beams, and a ratio of (i) a length along a light beam axis of the second light beam between the second light beam source and the collimator element and (ii) a length along a light beam axis of the first light beam between the first light beam source and the collimator element is between 0.50 and 0.75.

45. An optical pickup device according to claim 44, wherein a wavelength of the second light beam is longer than that of the first light beam.

46. An optical pickup device according to claim 44, further comprising a chromatic aberration compensating member arranged between at least one of the first and second light beam sources and the collimator element to perform a chromatic aberration compensation for the light beam from the at least one of the first and second light beam sources.

47. An optical pickup device according to claim 44, further comprising a light beam guide arranged between at least one of the first and second light beam sources and the collimator element to receive at least one of the first and second light beams so that the light beam guide guides the at least one of the first and second light beams in such a manner that either of the first and second light beams proceeds along a substantially-common-single light beam axis extending toward the recording medium positioning area.

48. An optical pickup device according to claim 44, wherein the first light beam proceeds substantially straight from the first light beam source to the collimator element, and the second light beam is bent at least once between the first light beam source and the collimator element.

* * * * *